(12) United States Patent
Kojima et al.

(10) Patent No.: US 6,879,958 B1
(45) Date of Patent: Apr. 12, 2005

(54) COMMUNICATION APPARATUS, COMMUNICATION METHOD AND PROGRAM STORAGE MEDIUM

(75) Inventors: Kiyonobu Kojima, Tokyo (JP); Yasuhiko Kato, Tokyo (JP); Syuji Yonekura, Kanagawa (JP); Satoshi Fujimura, Kanagawa (JP); Takashi Sasai, Chiba (JP); Naoki Fujisawa, Kanagawa (JP); Junji Ooi, Kanagawa (JP)

(73) Assignee: Sony Corporation, Tokyo (JP)

( * ) Notice: Subject to any disclaimer, the term of this patent is extended or adjusted under 35 U.S.C. 154(b) by 611 days.

(21) Appl. No.: 09/648,863

(22) Filed: Aug. 25, 2000

(30) Foreign Application Priority Data

Sep. 3, 1999  (JP) .......................................... P11-250674

(51) Int. Cl.$^7$ ............................................. G10L 21/00
(52) U.S. Cl. ........................ 704/275; 704/270; 704/276
(58) Field of Search ................................ 704/270, 275, 704/276, 270.1

(56) References Cited

U.S. PATENT DOCUMENTS

| | | | | |
|---|---|---|---|---|
| 5,086,391 | A | * | 2/1992 | Chambers ................. 340/573.1 |
| 5,615,296 | A | | 3/1997 | Stanford et al. |
| 5,852,801 | A | * | 12/1998 | Hon et al. ................... 704/244 |
| 5,960,395 | A | * | 9/1999 | Tzirkel-Hancock ......... 704/241 |
| 6,182,046 | B1 | * | 1/2001 | Ortega et al. ............... 704/275 |
| 6,243,675 | B1 | * | 6/2001 | Ito ............................. 704/232 |
| 6,295,391 | B1 | * | 9/2001 | Rudd et al. .................. 382/313 |
| 6,519,479 | B1 | * | 2/2003 | Garudadri et al. .......... 455/563 |
| 6,574,599 | B1 | * | 6/2003 | Lim et al. .................... 704/270 |
| 6,757,657 | B1 | * | 6/2004 | Kojima et al. .............. 704/275 |

OTHER PUBLICATIONS

Derwent Publications, AN 2000–220401, XP–002203674, KR 99 015 749, Mar. 5, 1999 (a complete copy will be filed later).

P. J. Wyard, et al., BT Technology Journal, vol. 14, No. 1, XP–000554648, pp. 187–205, "Spoken Language Systems—Beyond Prompt and Response", Jan. 1996.

Y. Muthusamy, et al., Acoustics, Speech, and Signal Processing, IEEE International Conference of Phoenix, XP–010327911, pp. 2259–2262, "Speech–Enabled Information Retrieval in the Automobile Environment", Mar. 15, 1999.

S. Raptis, et al., Proceedings IEEE 4$^{th}$ Workshop Interactive Voice Technology for Telecommunications Applications, XP–002203673, pp. 151–154, "A Speech Agent for Remote E–Mail Access", 1998.

* cited by examiner

*Primary Examiner*—David Ometz
*Assistant Examiner*—Michael N. Opsasnick
(74) *Attorney, Agent, or Firm*—Oblon, Spivak, McClelland, Maier & Neustadt, P.C.

(57) ABSTRACT

The invention provides a communication apparatus, a communication method and a program storage medium. The communication apparatus includes a word-generating means for recognizing a voice and generating a first word and a second word, which correspond to the voice, a word-collating means for collating the first word generated by the word-generating means with pieces of information on a communication destination-stored in advance and outputting a specific piece of information on a communication destination corresponding to the first word, a program-activating means for confirming the fact that the second word generated by the word-generating means is a predetermined word and activating a communication program corresponding to the predetermined word, and a communication-destination-setting means for adopting the specific piece of information on a communication destination output by the word-collating means as information on a communication destination of the communication program activated by the program-activating means. In the communication apparatus, data for identifying a communication partner can be set with ease.

9 Claims, 55 Drawing Sheets

FIG.10

```
[Grammar]
Type = cfg

[ ⟨Start⟩ ]
⟨Start⟩ = ⟨Global⟩
⟨Start⟩ = ⟨SVCommand⟩

[ ⟨SVCommand⟩ ]
102 = HELP
104 = PREVIOUS
104 = PREVIOUS PICTURE
105 = NEXT
105 = NEXT PICTURE
0x7fffffff= ⟨SendMail⟩

[ ⟨SendMail⟩ ]
⟨SendMail⟩ = SEND A MAIL TO  ⟨Email⟩
⟨SendMail⟩ = MAIL

[ ⟨Email⟩ ]
⟨Email⟩ = " daddy@test.company.co.jp.   PAPA

[ ⟨Global⟩ ]
⟨Global⟩ = ⟨ChangeWin⟩
⟨Global⟩ = ⟨VoiceCommand⟩

[ ⟨ChangeWin⟩ ]
6001 = STILL-PICTURE PHOTOGRAPHING PROGRAM
6002 = ELECTRONIC-PET PROGRAM
6004 = STILL-PICTURE VIEWING PROGRAM

[ ⟨VoiceCommand⟩ ]
1= ⟨VCmd⟩

[ ⟨VCmd⟩ ]
⟨VCmd⟩ = " C:¥¥shougi.exe"  SHOGI GAME
```

FIG.20

| MAIL ADDRESS | PERSON NAME | PLACE NAME | METROPOLIS OR DISTRICT NAME | URL |
|---|---|---|---|---|
| 221 | 222 | 223 | 224 | 225 |

226

| POPULAR NAME | CATALOGED WORDS | MEMO |
|---|---|---|
| PAPA | PAPA | |
| KAORICHAN KAORIN | KAORICHAN | |
| TONARI NO ONEESAN | TONARI NO ONEESAN | |

SAY THE POPULAR NAME IN THE LIST — 272

BEING TESTED — 271

[OK] KAORICHAN — 273

F I G. 35
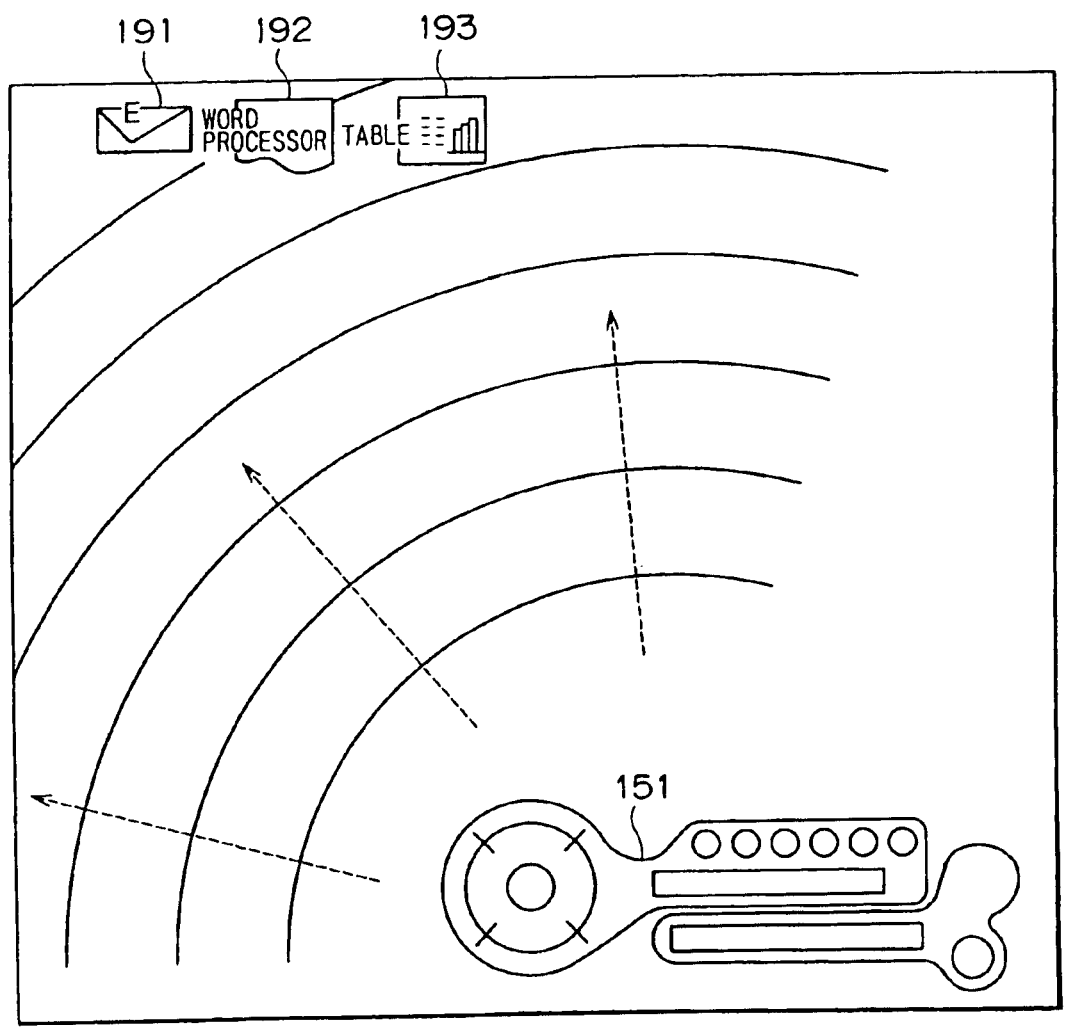

COMMUNICATION APPARATUS, COMMUNICATION METHOD AND PROGRAM STORAGE MEDIUM

BACKGROUND OF THE INVENTION

The present invention relates to a communication apparatus, a communication method and a program storage medium. More particularly, the present invention relates to a communication apparatus, a communication method and a program storage medium which are used for recognizing a voice.

Information processing apparatuses including some personal computers are capable of transmitting electronic mails (hereinafter, referred to as "e-mail") to predetermined partners by way of the Internet.

Each time an e-mail is transmitted, however, an address, which is data for identifying a communication partner, must be set on a predetermined screen, making the operation cumbersome.

SUMMARY OF THE INVENTION

It is thus an object of the present invention addressing the problem described above to provide a facility for allowing data used for identifying a communication partner to be set with ease.

According to a first aspect of the present invention, there is provided a communication apparatus including a word-generating means for recognizing a voice and generating a first word and a second word, which correspond to the voice, a word-collating means for collating the first word generated by the word-generating means with pieces of information on a communication destination stored in advance and outputting a specific piece of information on a communication destination corresponding to the first word, a program-activating means for confirming the fact that the second word generated by the word-generating means is a predetermined word and activating a communication program corresponding to the predetermined word, and a communication destination setting means for adopting the specific piece of information on a communication destination output by the word-collating means as information on a communication destination of the communication program activated by the program-activating means.

According to a second aspect of the present invention, there is provided a communication method including a word-generating step of recognizing a voice and generating a first word and a second word, which correspond to the voice, a word-collating step of collating the first word generated at the word-generating step with pieces of information on communication destinations stored in advance and outputting a specific piece of information on a communication destination corresponding to the first word, a program-activating step of confirming the fact that the second word generated at the word-generating step is a predetermined word and activating a communication program corresponding to the predetermined word, and a communication destination setting step of adopting the specific piece of information on a communication destination output at the word-collating step as information on a communication destination of the communication program activated at the program-activating step.

According to a third aspect of the present invention, there is provided a program storage medium for storing a program to be executed by a communication apparatus wherein the program includes a word-generating step of recognizing a voice and generating a first word and a second word, which correspond to the voice, a word-collating step of collating the first word generated at the word-generating step with pieces of information on communication destinations stored in advance and outputting a specific piece of information on a communication destination corresponding to the first word, a program-activating step of confirming the fact that the second word generated at the word-generating step is a predetermined word and activating a communication program corresponding to the predetermined word, and a communication-destination-setting step of adopting the specific piece of information on a communication destination output at the word-collating step as information on a communication destination of the communication program activated at the program-activating step.

In the communication apparatus, the communication method and the program storage medium, a voice is recognized and a first word and a second word corresponding to the voice are generated, the first word is collated with pieces of information on a communication destination stored in advance, a specific piece of information on a communication destination corresponding to the first word is output, the fact that the second word is a predetermined word is confirmed, a communication program corresponding to the predetermined word is activated, the output information on a communication destination is adopted as information on a communication destination of the communication program. As a result, data for identifying a communication partner can be set with ease.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 10 is an explanatory diagram showing a SAPI;

FIG. 20 is a diagram showing a cataloged-word test dialog which is displayed on the LCD panel;

FIG. 35 is diagram showing a shape like a ripple spreading from the voice-commander window over the entire screen on the LCD panel;

DESCRIPTION OF THE PREFERRED EMBODIMENTS

A preferred embodiment implementing an information processing apparatus provided by the present invention is described by referring to accompanying diagrams.

Figure 1:
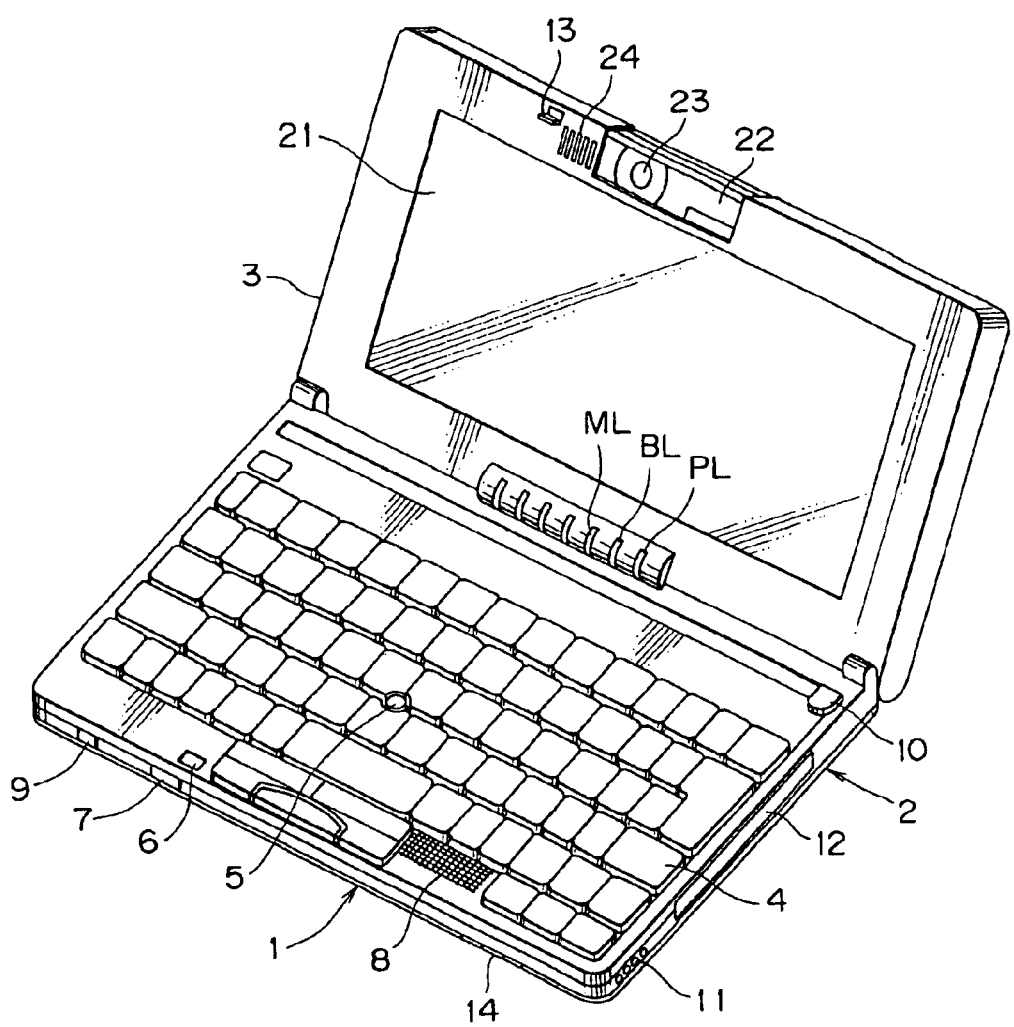
FIG. 1 is a diagram showing an external perspective view of a personal computer.
Figure 2:
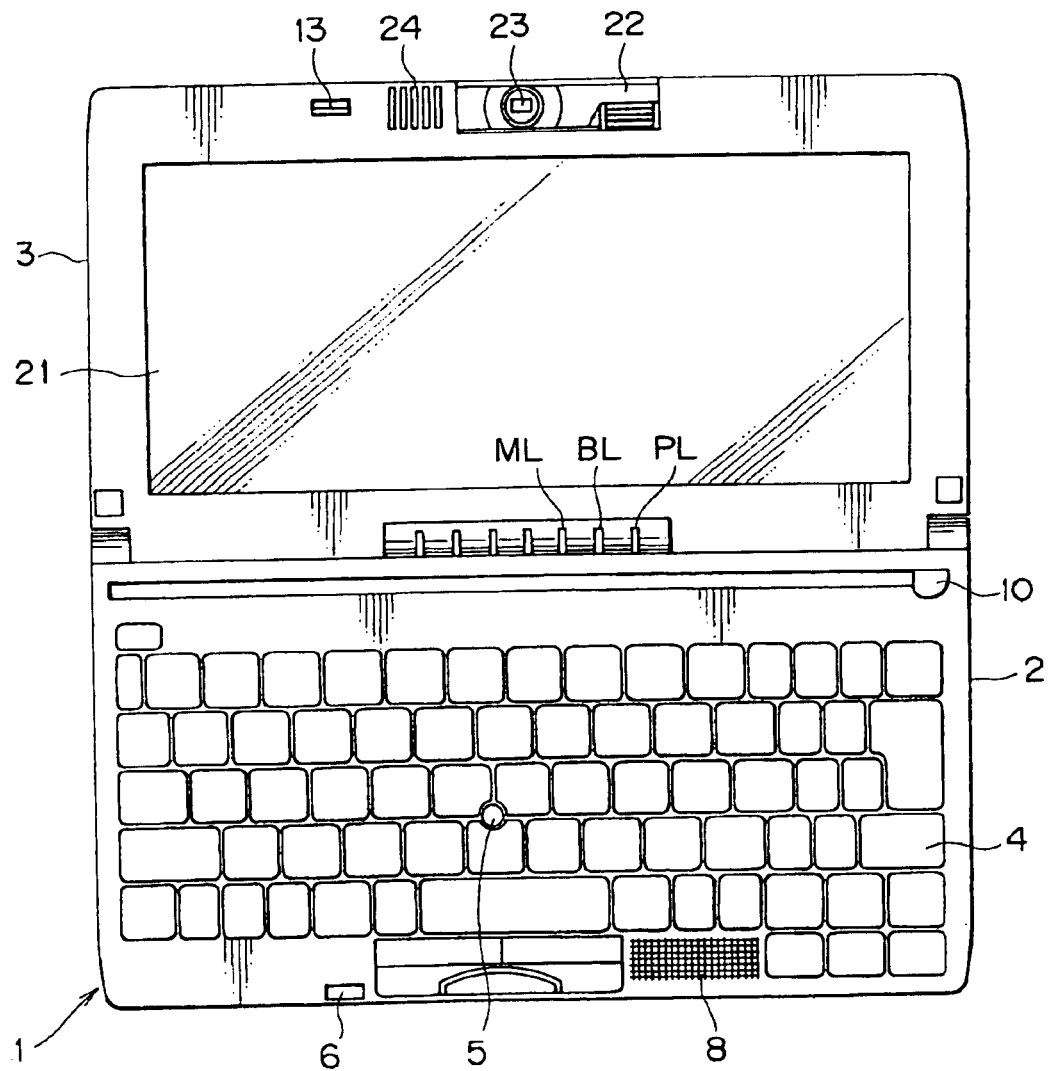
FIG. 2 is a diagram showing the top view of the personal computer.
Figure 3:
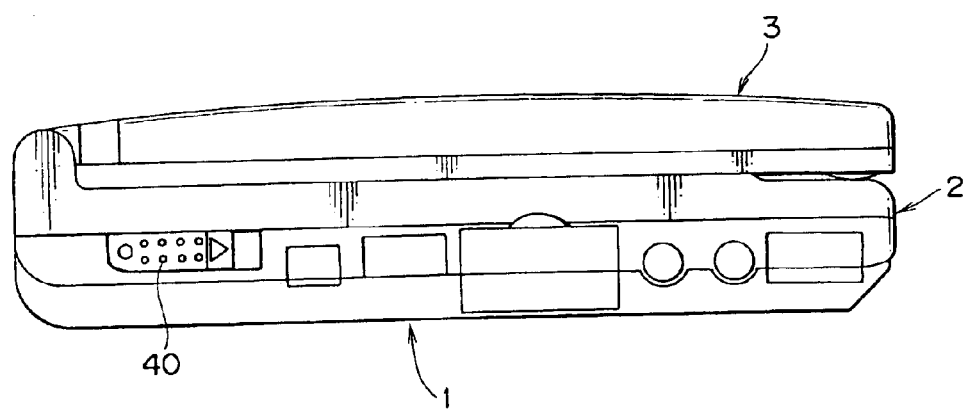
FIG. 3 is a diagram showing the left-side view of the personal computer.
Figure 4:
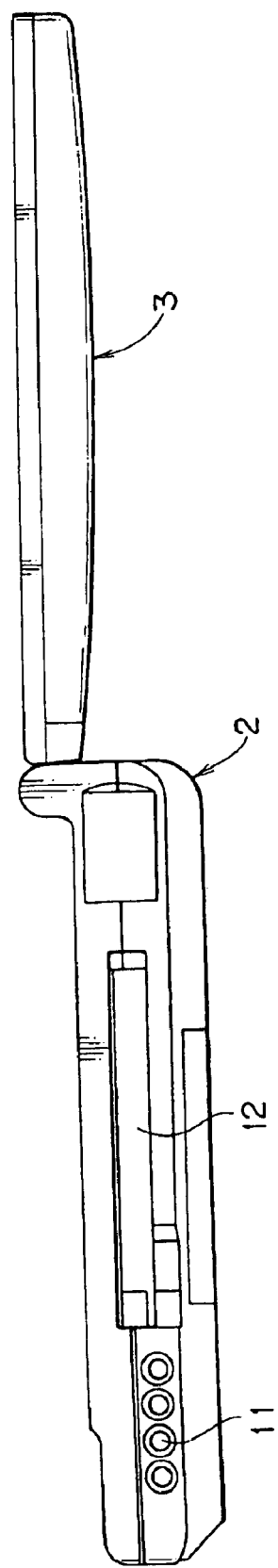
FIG. 4 is a diagram showing the right-side view of the personal computer.
Figure 5:
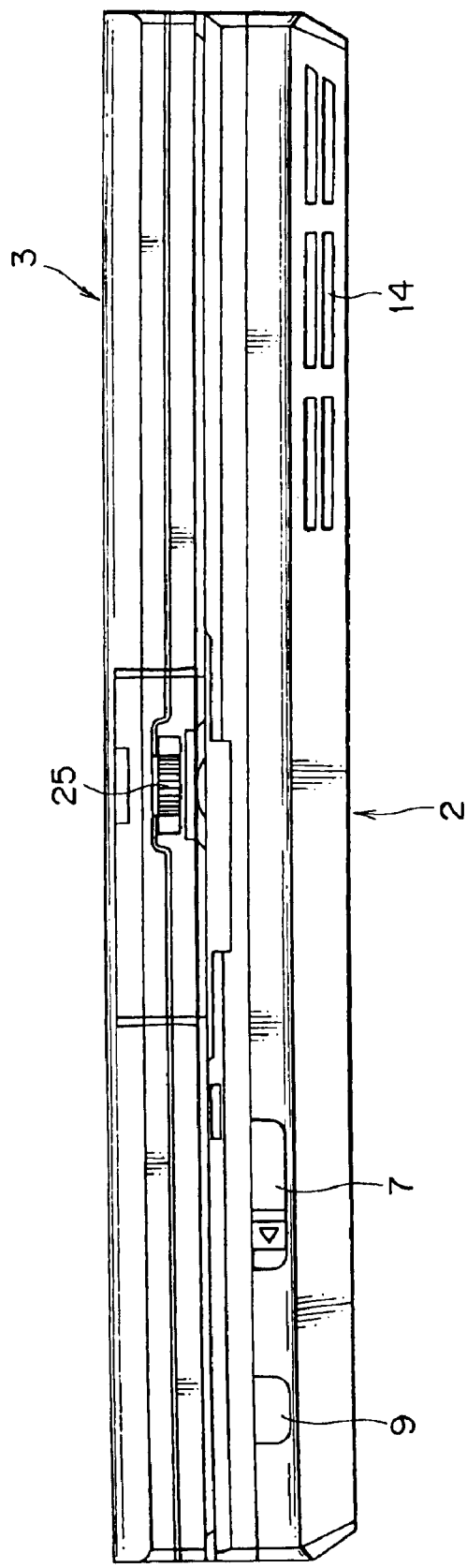
FIG. 5 is a diagram showing the front view of the personal computer.
Figure 6:
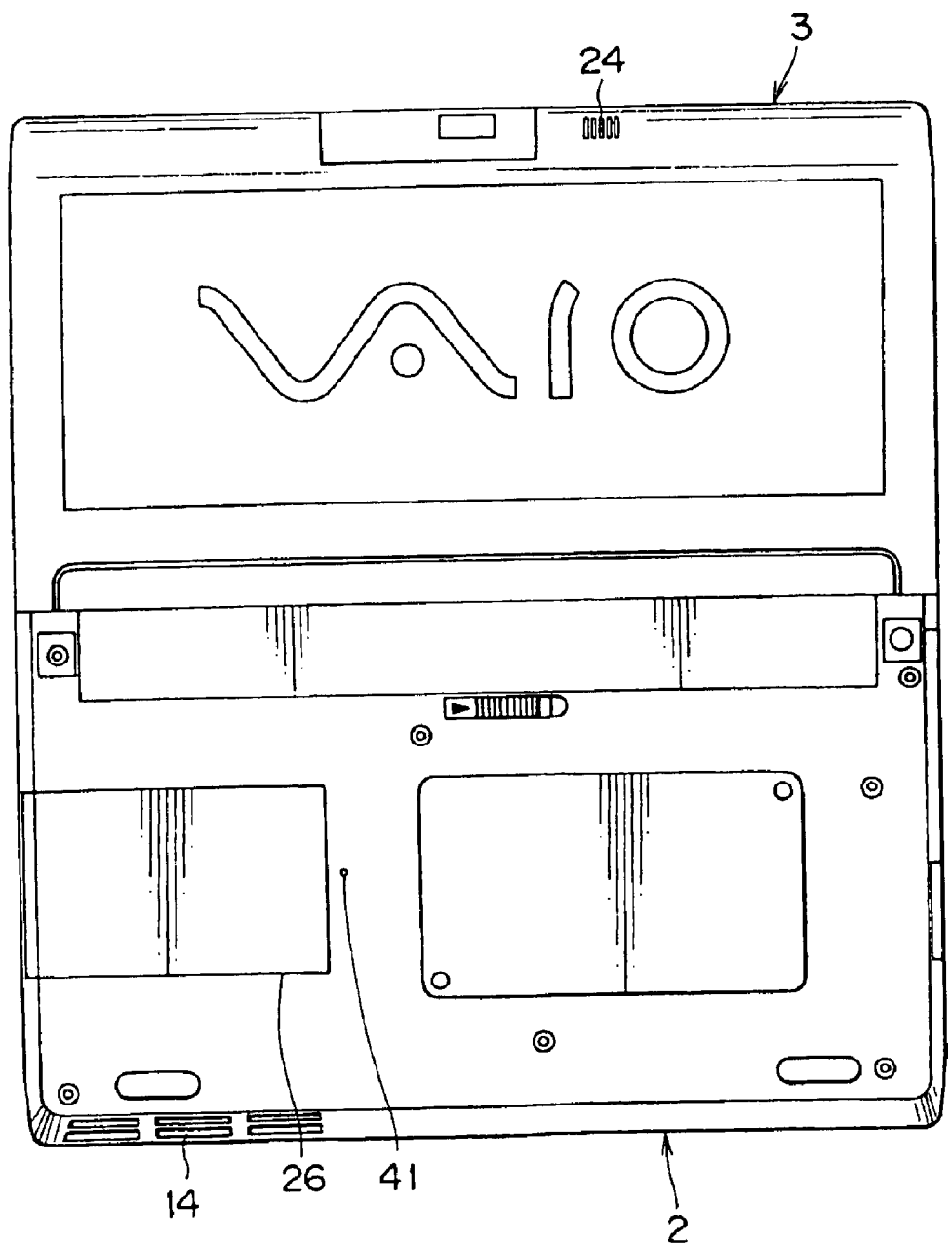
FIG. 6 is a diagram showing the bottom view of the personal computer.

FIGS. 1 to 6 are diagrams showing a typical configuration of a portable personal computer 1 to which the present invention is applied. The personal computer 1 is a mini-note-type personal computer. Basically, the personal computer 1 comprises a main body 2 and a display unit 3 which can be put in a posture of closing or opening the main body 2 with a high degree of freedom. To be more specific, FIG. 1 is a diagram showing an external perspective view of a state in which the display unit 3 is put in a posture of opening the main body 2. FIG. 2 is a diagram showing a top view. FIG. 3 is a diagram showing a left-side view of a state in which the display unit 3 is put in a posture of closing the main body 2. FIG. 4 is a diagram showing a right-side view of a state in which the display unit 3 is put in a posture of opening the main body 2 to form an angle of 180 degrees with the main body 2. FIG. 5 is a diagram showing a front view of the state shown in FIG. 3. FIG. 6 is a diagram showing a bottom view of the state shown in FIG. 4.

On the top surface of the main body 2, a keyboard 4 and a stick-type pointing device 5 are provided. The keyboard 4 is operated to enter a variety of characters and symbols. The stick-type pointing device 5 is operated to move a mouse cursor. In addition, a speaker 8 and a shutter button 10 are also provided on the top surface of the main body 2. The speaker 8 outputs a sound. The shutter button 10 is operated when taking a picture by means of a CCD video camera 23 provided on the display unit 3.

On the upper end of the display unit 3, a nail 13 is provided. In a state with the display unit 3 put in a posture of closing the main body 2 as shown in FIG. 3, the nail 13 is engaged with a hole 6 which is provided on the main body 2 at a position corresponding to the nail 13. On the front surface of the main body 2, a slide bar 7 is provided. The slide bar 7 can be sled in a direction parallel to the front surface. The slide bar 7 holds the nail 13 engaged with the hole 6 in a locked state. However, the slide bar 7 allows the nail 13 to be released from the locked state. With the nail 13 released from the locked state, the display unit 3 can be rotated with respect to the main body 2. A microphone 24 is attached at a location adjacent to the nail 13. The microphone 24 is also capable of picking up a sound from the back surface as shown in FIG. 6.

A programmable power key (PPK) 9 is also provided on the front surface of the main body 2. As shown in FIG. 4, an exhaust hole 11 is provided on the right-side surface of the main body 2. On the lower part of the front surface of the main body 2, an intake hole 14 is provided as shown in FIG. 5. A slot 12 is further provided on the right side of the exhaust hole 11. The slot 12 is used for inserting a PCMCIA (Personal Computer Memory Card International Association) card which is a kind of PC card.

On the front surface of the display unit 3, an LCD (Liquid Crystal Display) panel 21 is provided. The LCD panel 21 is used for displaying a picture. On the upper end of the display unit 3, an image sensor 22 is provided in such a way that the image sensor 22 can be rotated with a high degree of freedom with respect to the display unit 3. That is to say, the image sensor 22 can be rotated to any direction within a range of 180 degrees between the exposure direction of the LCD panel 21 and a direction opposite to the exposure direction. The CCD video camera 23 is attached to the image sensor 22.

A power-supply lamp PL, a battery lamp BL, a message lamp ML and other LEDs each serving as a lamp are provided on the bottom side of the display unit 3, that is, on the main-body side of the display unit 3. It should be noted that reference numeral 40 shown in FIG. 3 denotes a power-supply switch provided on the left-side surface of the main body 2 and reference numeral 25 shown in FIG. 5 denotes an adjustment ring for adjusting the focus of the CCD video camera 23. In FIG. 6, reference numeral 26 denotes a cover for veiling an opening for installing an additional memory in the main body 2 and reference numeral 41 denotes a small hole for inserting a pin which is used for removing a lock nail of the cover 26.

Figure 7:
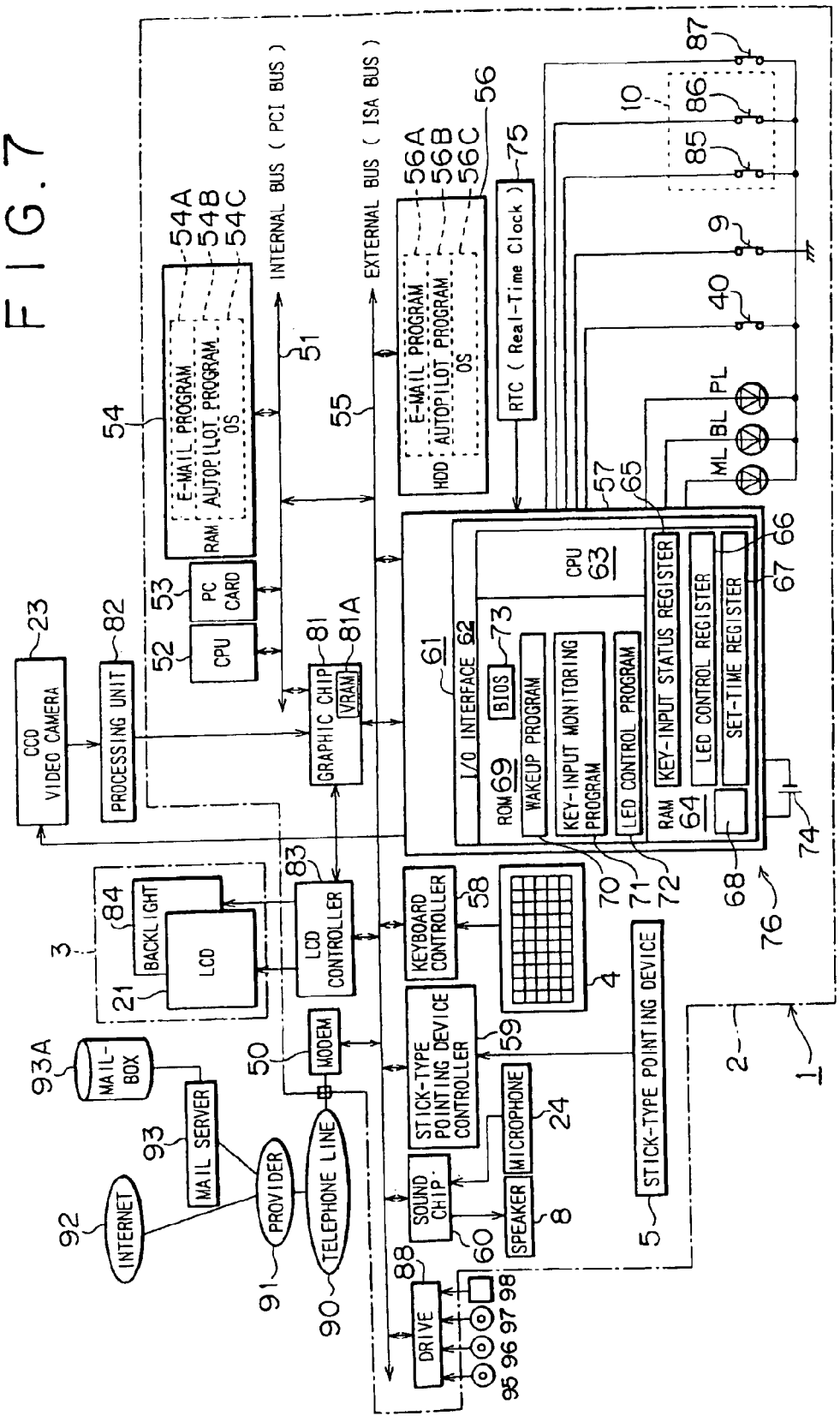
FIG. 7 is a block diagram showing the configuration of the personal computer.

FIG. 7 is a diagram showing the internal configuration of the personal computer 1. As shown in the figure, a CPU (Central Processing Unit) 52, a PC (personal computer) card 53 inserted if necessary, a RAM (Random Access Memory) 54 and a graphic chip 81 are connected to an internal bus 51. The internal bus 51 is connected to an external bus 55 which is connected to components such as a hard disc drive (HDD) 56, an I/O (Input/Output) controller 57, a keyboard controller 58, a stick-type pointing device controller 59, a sound chip 60, an LCD controller 83 and a modem 50.

The CPU 52 serves as a controller covering a number of functions. A PC card 53 is mounted to add an optional function provided by the PC card 53.

At the end of activation of the personal computer 1, an operation to load application programs and an OS (operating system) 54C from the HDD 56 into a RAM 54 and store them in the RAM 54 is completed. The application programs are an electronic mail program (hereinafter, referred to as "e-mail program") 54A and an autopilot program 54B.

The e-mail program 54A is a program for exchanging electronic mails (e-mails) with other computers through a network comprising communication lines such as telephone lines. The e-mail program 54A has a special function called an incoming-mail acquiring function. To be more specific, the incoming-mail acquiring function requests a mail server 93 to examine whether or not a mail addressed to the user of the personal computer 1 has arrived at a mail box 93A in the mail server 93. If such a mail exists in the mail box 93A, processing is carried out to acquire the mail.

The autopilot program 54B is a program for activating a plurality of pieces of processing or a plurality of programs prepared in advance in accordance with a predetermined order for execution.

The OS 54C is a basic program for controlling basic operations of a computer. A representative basic program is Windows 98 (a trademark).

On the other hand, in the hard disc drive (HDD) 56 connected to the external bus 55, the e-mail program 56A, the autopilot program 56B and the OS 56C are stored. The e-mail program 56A, the autopilot program 56B and the OS 56C are sequentially loaded one after another into the RAM 54 to be stored therein during the activation (boot-up) process.

The I/O controller 57 has a microcontroller 61 which includes an I/O interface 62. In addition to the I/O interface 62, the microcontroller 61 comprises a CPU 63, a RAM 64 and a ROM 69. The I/O interface 62, the CPU 63, the RAM 64 and the ROM 69 are connected to each other. The RAM 64 includes a key input status register 65, an LED (light emitting diode) control register 66, a set-time register 67 and a register 68. The set-time register 67 is used for storing a set time specified by the user. When the set time is reached, the operation of an activation sequence control unit 76 is started. The register 68 is used for storing information on relations. Each of the relations is a relation between a combination of operation keys set in advance and an application program to be activated. That is to say, when the user enters a combination of operation keys stored in the register 68, the application program associated with the combination such as the e-mail program 54A is activated.

An operation key flag is stored in the key input status register 65 when the programmable power key (PPK) 9 for a one-touch operation is pressed. The LED control register 66 is used for controlling an operation to turn on a message lamp ML for displaying the execution status of an application program such as the e-mail program 54A indicated by a relation stored in the register 68. As described above, any set time is stored in the set-time register 67.

It should be noted that, since the microcontroller 61 is connected to a battery 74 used as a backup power supply, pieces of information stored in the registers 65, 66 and 67 are retained as they are even if the power supply of the main body 2 is turned off.

The ROM 69 employed in the microcontroller 61 is used for storing a wakeup program 70, a key input monitor program 71 and an LED control program 72 in advance. The ROM 69 is typically implemented by an EEPROM (Electrically Erasable and Programmable Read-Only Memory). This EEPROM is also called a flash memory. In addition, the microcontroller 61 also has an RTC (Real-Time Clock) 75 for updating the present time all the time.

The wakeup program 70 stored in the ROM 69 examines time data received from the RTC 75 to determine whether or not the present time reaches a time set in the set-time register 67. If the present time reaches the time set in the set-time register 67, the wakeup program 70 activates typically predetermined processing or a predetermined program. The key input monitor program 71 is a program for always monitoring the PPK 9 to determine whether or not the user presses the PPK 9. The LED control program 72 is a program for controlling an operation to turn on the message lamp ML as described above.

A BIOS (Basic Input Output System) 73 is also stored in the ROM 69 in advance. The BIOS 73 invokes the OS 56C at the time the power supply is turned on. The BIOS 73 has functions including a function to exchange data between a variety of application programs and peripheral devices like the display unit 3, the keyboard 4 and the HDD 56 after the invocation of the OS 56C.

A keyboard controller 58 connected to the external bus 55 controls inputs from the keyboard 4. By the same token, a stick-type pointing device controller 59 controls the stick-type pointing device 5.

The sound chip 60 receives an input from the microphone 24 or supplies an audio signal to the embedded speaker 8.

The modem 50 allows the personal computer 1 to be connected to a communication means like a communication network 92 such as the Internet or a mail server 93 through a public telephone line 90 and an Internet service provider 91.

The graphic chip 81 connected to the internal bus 51 receives picture data. The picture data supplied to the graphic chip 81 is sensed by the CCD video camera 23 and processed by a processing unit 82. The graphic chip 81 stores the picture data input by the CCD video camera 23 and processed by the processing unit 82 into an embedded VRAM 81. Then, the graphic chip 81 reads out the picture data from the VRAM 81 with proper timings and supplies the data to an LCD controller 83. The LCD controller 83 supplies the picture data received from the graphic chip 81 to the LCD panel 21 to be displayed thereon. A backlight 84 radiates light to the LCD panel 21 from a position behind the LCD panel 21.

The power-supply switch 40 is operated to turn on or off the power supply. A semi-push switch 85 is turned on when the shutter button 10 is put in a semi-pressed state. On the other hand, a complete-push switch 86 is turned on when the shutter button 10 is put in a completely-pressed state. An inversion switch 87 is turned on when the image sensor 22 is rotated by 180 degrees, that is, when the CCD video camera 23 is rotated to a direction for image-sensing the opposite side of the LCD panel 21.

A drive 88 is connected to the external bus 55. A recording medium mounted on the drive 88 includes a magnetic disc 95 such as a floppy disc, an optical disc 96 such as a CD-ROM (Compact Disc-Read Only Memory or a DVD (Digital Versatile Disc), a magneto-optical disc 97 such as an MD (Mini Disc) or a semiconductor memory 98. The drive 88 reads out a program or data from the magnetic disc 95, the optical disc 96, the magneto-optical disc 97 or the semiconductor memory 98 and supplies the program or the data to the HDD 56 or the RAM 54 by way of the external bus 55 or the internal bus 51 respectively.

On the contrary, the drive 88 receives information such as a program or data from the modem 50 or the HDD 56 through the external bus 55 or from the RAM 54 through the internal bus 51 and stores the information-into the magnetic disc 351, the optical disc 352, the magneto-optical disc 353 or the semiconductor memory 354 mounted on the drive 88.

Figure 8:
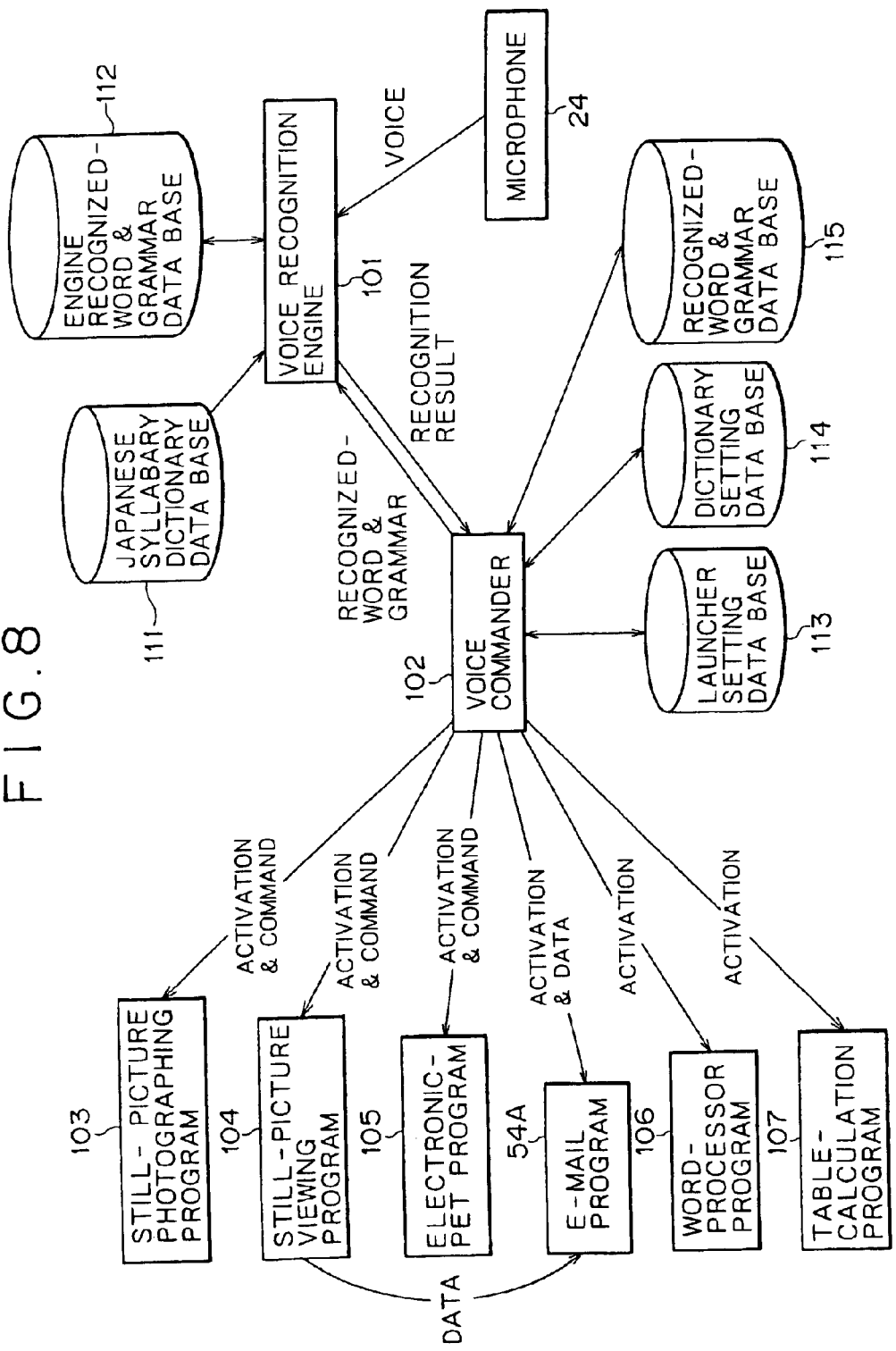
FIG. 8 is a diagram showing functional blocks of the personal computer.

FIG. 8 is a diagram showing functional blocks of programs which are executed when the personal computer 1 invokes a program related to voice recognition. On the basis of pronunciations of Kanji characters stored in advance in a Japanese syllabary dictionary data base 111 or on the basis of recognized words or a grammar stored in advance in an engine recognized-word & grammar data base 112, a voice recognition engine 101 inputs data corresponding to a voice entered by the user via the microphone 24 and generates data of a predetermined format such as a text corresponding to a voice uttered by the user, supplying the generated data to a voice commander 102.

On the contrary, the voice recognition engine 101 receives data such as a recognized word or a grammar from the voice commander 102 and stores the data into the Japanese syllabary dictionary data base 111 or the engine recognized-word & grammar data base 112.

Receiving data such as words or a text representing a predetermined speech made by the user from the voice recognition engine 101, the voice commander 102 activates a still-picture photographing program 103, a still-picture viewing program 104 or an electronic-pet program 105, or issues a predetermined command corresponding to a speech made by the user to the still-picture photographing program 103, the still-picture viewing program 104 or the electronic-pet program 105.

Receiving data such as words or a text representing another predetermined speech made by the user from the voice recognition engine 101, the voice commander 102 activates the e-mail program 54A, a word-processor program 106 or a table-calculation program 107 on the basis of activation settings stored in a user launcher setting data base 113, and supplies predetermined data such as a mail address to the e-mail program 54A.

In addition, the voice commander 102 has a graphical user interface and allows a variety of settings to be made by the user through the interface. The voice commander 102 classifies settings made by the user. The voice commander 102 stores a setting related to activation of application programs, namely, the e-mail program 54A, the word-processor program 106 and the table-calculation program 107 in the launcher setting data base 113. A pronunciation of a Kanji character and a setting such as a command for the still-picture photographing program 103, the still-picture viewing program 104 or the electronic-pet program 105 are stored in a dictionary setting data base 114. A setting related a voice-recognized word or a grammar is stored, in a recognized-word & grammar data base 115.

With a predetermined timing such as a timing to request the voice recognition engine 101 to recognize a voice, the voice commander 102 supplies data of a recognized words or a grammar stored in the recognized-word & grammar data base 115 to the voice recognition engine 101.

The voice recognition engine 101 uses the Japanese syllabary dictionary data base 111 and the engine recognized-word & grammar data base 112 of a particular user on the basis of data for identifying the user which is input when the OS 54C is activated. On the other hand, the voice commander 102 utilizes the launcher setting data base 113, the dictionary setting data base 114 and the recognized-word & grammar data base 115 on the basis of data for identifying a particular user which is input when the OS 54C is activated.

The Japanese syllabary dictionary data base 111, the engine recognized-word & grammar data base 112, the launcher setting data base 113, the dictionary setting data base 114 and the recognized-word & grammar data base 115 are generated for each user of the personal computer 1 and stored in the HDD 56.

The still-picture photographing program 103 stores a picture taken by the CCD video camera 23 in the HDD 56 as a file of still-picture data generated on the basis of a signal representing an operation carried out on typically the shutter button 10.

The still-picture viewing program 104 selects a file of still-picture data recorded by the still-picture photographing program 103 or requests the user to select such a file and displays a still picture of the selected file on the LCD panel 21.

The electronic-pet program 105 displays a virtual pet on the LCD panel 21 and issues a command to the virtual pet in accordance with an operation carried out by the user.

The word-processor program 106 is a program for editing a document comprising characters, figures and other data. The table-calculation program 107 carries out predetermined processing on numbers included in a table with a predetermined format, or executes a function such as processing to draw a graph representing numbers included in such a table.

Figure 9:
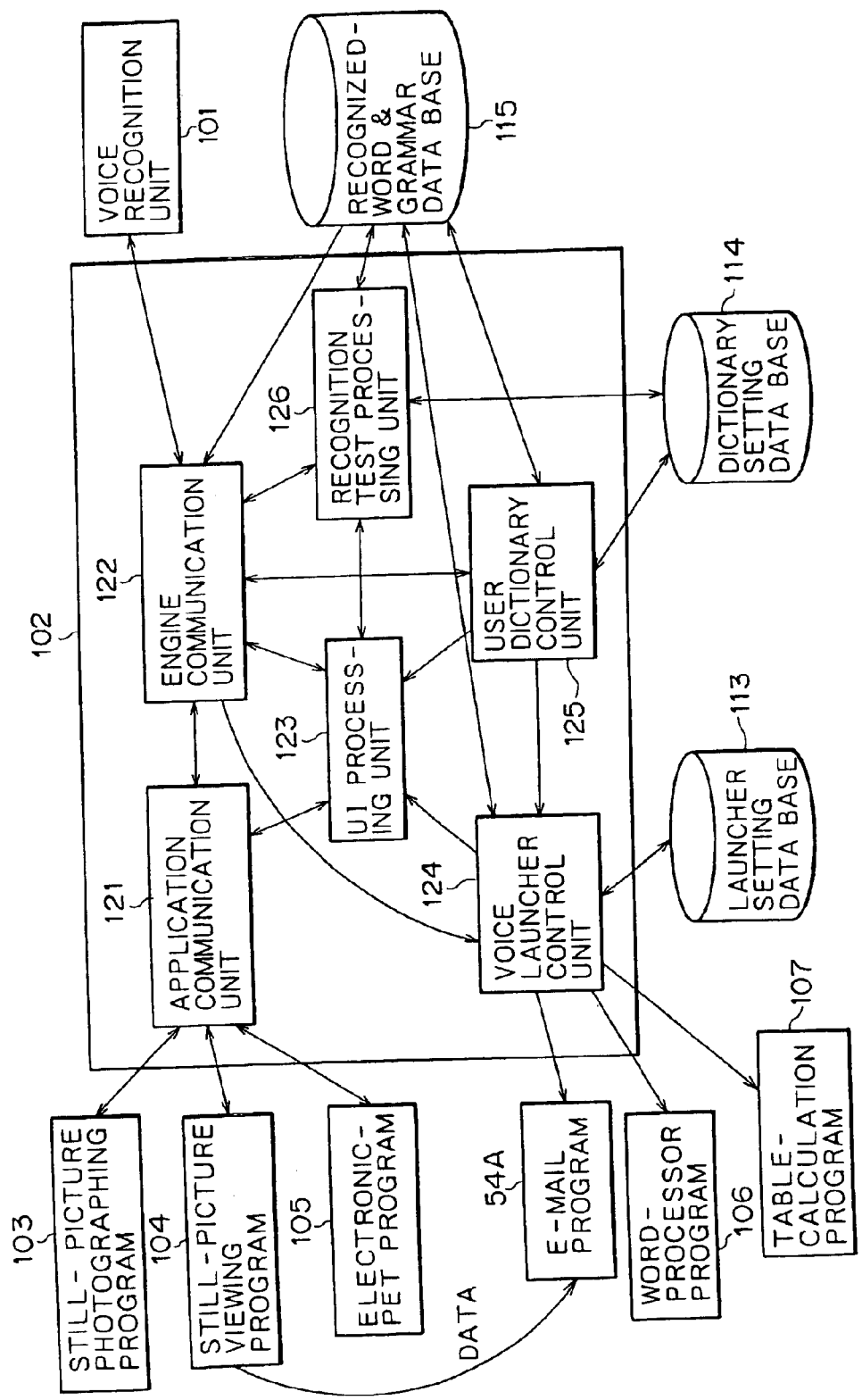
FIG. 9 is a diagram showing functional blocks of the personal computer.

FIG. 9 is an explanatory diagram showing functions of the voice commander 102 in detail. A UI (User Interface) processing unit 123 inputs data from an application communication unit 121, an engine communication unit 122, a voice launcher control unit 124, a user dictionary control unit 125 or a recognized-test processing unit 126. The UI processing unit 123 also inputs a predetermined signal from the keyboard 4 or the stick-type pointing device 5 and displays information such as the volume of a voice input through the microphone 24 and a result of voice recognition on a predetermined window. When a predetermined program is invoked, the UI processing unit 123 displays a predetermined picture on the LCD panel 21 on the basis of data input from the application communication unit 121 or the voice launcher control unit 124.

The UI processing unit 123 changes the status of its own on the basis of a signal representing an operation carried out on the keyboard 4 or the stick-type pointing device 5, and supplies predetermined data to the application communication unit 121, the engine communication unit 122, the voice launcher control unit 124, the user dictionary control unit 125 or the recognized-test processing unit 126.

In addition, the UI processing unit 123 forms a judgment as to whether or not to issue a command to the application communication unit 121 or the voice launcher control unit 124 or to activate a predetermined program. The formation of the judgment is based on the status of the still-picture photographing program 103, the still-picture viewing program 104 and the electronic-pet program 105 as well as data such as a predetermined text representing a predetermined speech made by the user. The UI processing unit 123 from the voice recognition engine 101 by way of the engine communication unit 122 receives the data. In accordance with the outcome of the judgment, the UI processing unit 123 may issue a command to the application communication unit 121 or the voice launcher control unit 124 or activate the predetermined program.

The application communication unit 121 activates the still-picture photographing program 103, the still-picture viewing program 104 or the electronic-pet program 105, communicating with the still-picture photographing program 103, the still-picture viewing program 104 or the electronic-pet program 105 after the activation. The application communication unit 121 then receives data representing the status of the still-picture photographing program 103, the still-picture viewing program 104 or the electronic-pet program 105 from the still-picture photographing program 103, the still-picture viewing program 104 and the electronic-pet program 105 respectively.

The application communication unit 121 passes on the data representing the status of the still-picture photographing program 103, the still-picture viewing program 104 or the electronic-pet program 105 to the engine communication unit 122 or the UI processing unit 123, and receives data such as a predetermined text representing a predetermined speech made by the user or data representing an operation carried out by the user on the keyboard 4 from the engine communication unit 122 or the UI processing unit 123.

On the basis of the status of the still-picture photographing program 103, the still-picture viewing program 104 and the electronic-pet program 105 as well as data such as a predetermined text representing a predetermined speech made by the user, the application communication unit 121 activates the still-picture photographing program 103, the still-picture viewing program 104 or the electronic-pet program 105, and issues a predetermined command to the still-picture photographing program 103, the still-picture viewing program 104 or the electronic-pet program 105. It should be noted that the data is received by the application communication unit 121 from the voice recognition engine 101 by way of the engine communication unit 122.

When the still-picture photographing program 103, the still-picture viewing program 104 and the electronic-pet program 105 are not focused on, that is, when the still-picture photographing program 103, the still-picture viewing program 104 and the electronic-pet program 105 are not activated, the voice commander 102 is not capable of executing a command for the still-picture photographing program 103, the still-picture viewing program 104 and the electronic-pet program 105.

When the still-picture photographing program 103, the still-picture viewing program 104 or the electronic-pet program 105 is focused on, that is, when the still-picture photographing program 103, the still-picture viewing program 104 or the electronic-pet program 105 has been activated, on the other hand, the voice commander 102 is active and, thus, capable of executing a command for the still-picture photographing program 103, the still-picture viewing program 104 or the electronic-pet program 105 respectively.

A command with the still-picture photographing program 103, the still-picture viewing program 104 or the electronic-pet program 105 used as a specific target is referred to as a local command.

It should be noted that the method of identifying a program to which the voice commander 102 issues a local command is not limited to the focus but can also be another state or an operation to refer to data.

By adopting a predetermined technique, the engine communication unit 122 reads out data representing a recognized word or data representing a grammar from the recognized-word & grammar data base 115 and supplies the data to the voice recognition engine 101. On the contrary, the engine communication unit 122 receives data such as a predetermined text representing a predetermined speech made by the user from the voice recognition engine 101.

By adopting typically a technique prescribed in a Microsoft Speech API (Trademark) which is abbreviated hereafter to a SAPI, the engine communication unit 122 supplies data representing a recognized word or data representing a grammar read out from the recognized-word & grammar data base 115 to the voice recognition engine 101. A typical SAPI prescription is shown in FIG. 10. In the typical data shown in FIG. 10, the object of voice recognition comprises <Global> and <SVCommand>. <Global> further comprises (ChangeWin) and (VoiceCommand) whereas <SVCommand> includes a mail command represented by <SendMail> in addition to commands such as "Help" and "Move forward". In the typical data shown in FIG. 10, the code number of the "Help" command is 102, and a word having a pronunciation of "papa" is associated with a character string of "daddy@test.company.co.jp".

The voice recognition engine 101 converts data received from the engine communication unit 122 into data conforming to a predetermined format and stores the data obtained as a result of the conversion into the Japanese syllabary dictionary data base 111 or the engine recognized-word & grammar data base 112. The voice recognition engine 101 also carries out processing based on data stored in the Japanese syllabary dictionary data base 111 or the engine recognized-word & grammar data base 112.

The voice recognition engine 101 supplies a code number such as 102 representing a predetermined speech made by the user, a recognized word or phrase such as "A mail for papa" and a string of characters associated with the recognized word such as "daddy@test.company.co.jp" to the engine communication unit 122.

Assume that the user outputs a voice of "A mail for papa" to the microphone 24. In this case, if the voice recognition engine 101 recognizes the voice correctly, the voice recognition engine 101 supplies a hexadecimal number of 7ffffff, a phrase of "A mail for papa" and a character string of "daddy@test.company.co.jp" to the engine communication unit 122.

The engine communication unit 122 forms a judgment as to whether or not to send the data received from the voice recognition engine 101 to the application communication unit 121, the UI processing unit 123, the voice launcher control unit 124, the user dictionary control unit 125 or the recognized-test processing unit 126. The formation of the judgment is based on the data itself. The engine communication unit 122 then converts the data received from the voice recognition engine 101 into data conforming to a predetermined format in accordance with the outcome of the judgment, and supplies the data obtained as a result of the conversion to a selected unit, namely, the application communication unit 121, the UI processing unit 123, the voice launcher control unit 124, the user dictionary control unit 125 or the recognized-test processing unit 126.

The voice launcher control unit 124 stores a setting entered by the user to a displayed graphical user interface in the launcher setting data base 113. The setting is related to the activation of an application program, namely, the e-mail program 54A, the word-processor program 106 or the table-calculation program 107. The voice launcher control unit 124 then updates a setting related to a voice-recognized word or a grammar stored in the recognized-word & grammar data base 115 on the basis of the setting stored in the launcher setting data-base 113.

When the voice launcher control unit 124 receives data related to a launcher from the engine communication unit 122, the voice launcher control unit 124 activates the e-mail program 54A, the word-processor program 106 or the table-calculation program 107 on the basis of a setting which is related to the activation of an application program and stored in the launcher setting data base 113, and supplies information such as a mail address to the e-mail program 54A.

The voice commander 102 is capable of executing a command to activate the e-mail program 54A, the word-processor program 106 or the table-calculation program 107 without regard to the state of the focus, that is, regardless of which program is active.

A command to activate, for example, the e-mail program 54A, the word-processor program 106 or the table-calculation program 107 that can be executed at any time without regard to the state of the focus as described above is referred to as a global command.

The user dictionary control unit 125 stores a setting entered by the user to a displayed graphical user interface in the dictionary setting data base 114. The setting is related to a recognized voice. The user dictionary control unit 125 then updates a setting related to a voice-recognized word or a grammar stored in the recognized-word & grammar data base 115 on the basis of the setting stored in the dictionary setting data base 114.

When the user dictionary control unit 125 is informed of a request made by the user for a test, the recognized-test processing unit 126 displays a graphical user interface and forms a judgment as to whether or not 1 of predetermined words which is selected from those stored in the dictionary setting data base 114 matches a word received from the voice recognition engine 101 through the engine communication unit 122. The word received from the voice recognition engine 101 is a result of recognition of a voice. The user dictionary control unit 125 then displays the outcome of the judgment.

In addition, when the user dictionary control unit 125 is informed of a request made by the user for a test, the recognized-test processing unit 126 displays a graphical user interface and forms a judgment as to whether or not 1 or more of predetermined words which are selected from those stored in the dictionary setting data base 114 include a word received from the voice recognition engine 101 through the engine communication unit 122. The word received from the voice recognition engine 101 is a result of recognition of a voice. The user dictionary control unit 125 then displays the outcome of the judgment.

Figure 11:
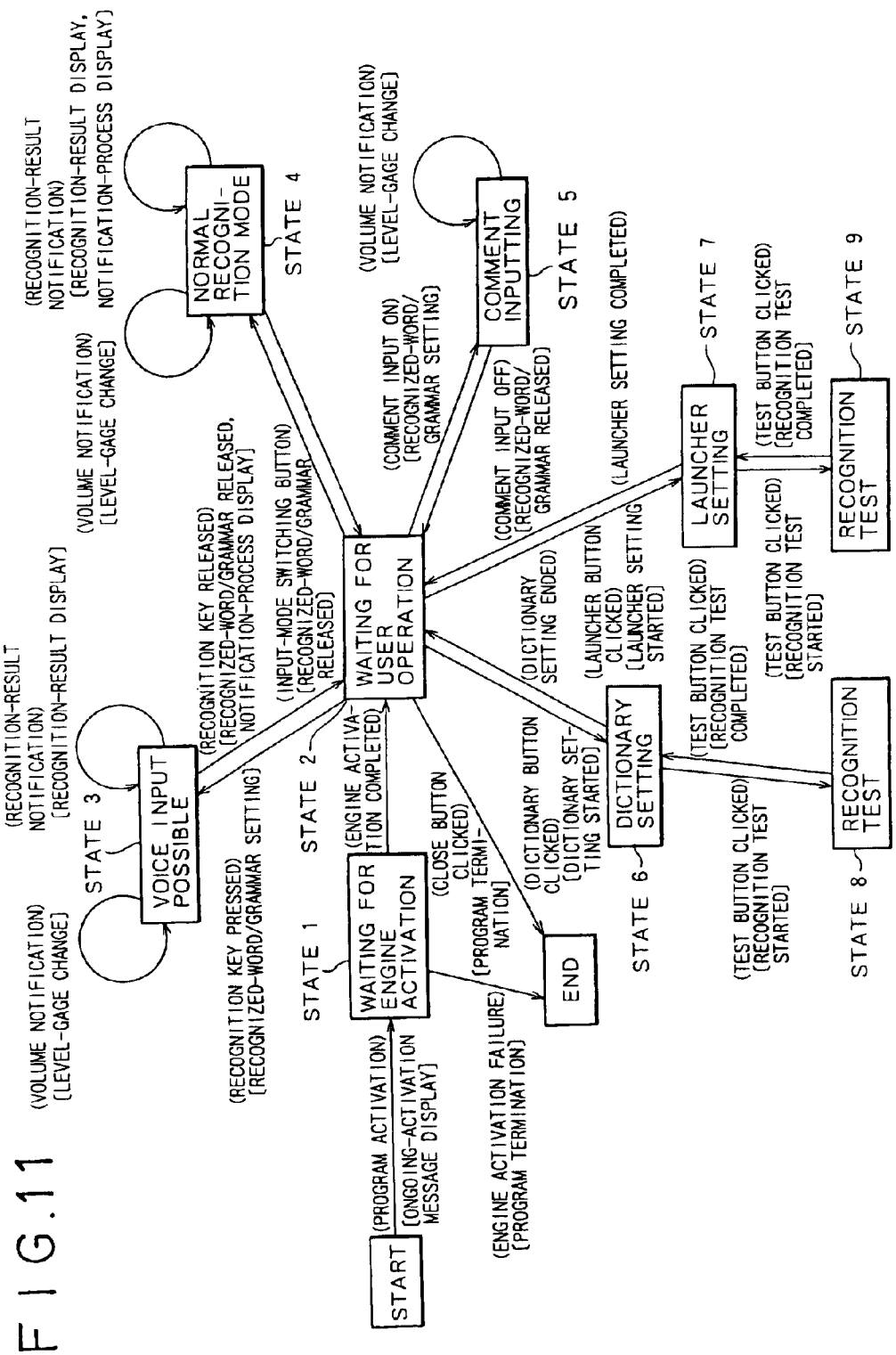
FIG. 11 is a diagram showing state transitions of a UI processing unit.

FIG. 11 is an explanatory diagram showing state transitions of the UI processing unit 123 according to predetermined inputs. In the figure, a phrase enclosed by parentheses ( ) is a condition for a state transition such as activation of a program or completion of engine activation. On the other hand, a phrase enclosed by brackets [ ] denotes processing carried out to accompany a state transition. Examples of such processing are an operation to display information indicating an on-going activation, a setting of a recognized word or a grammar, etc.

Figure 12:
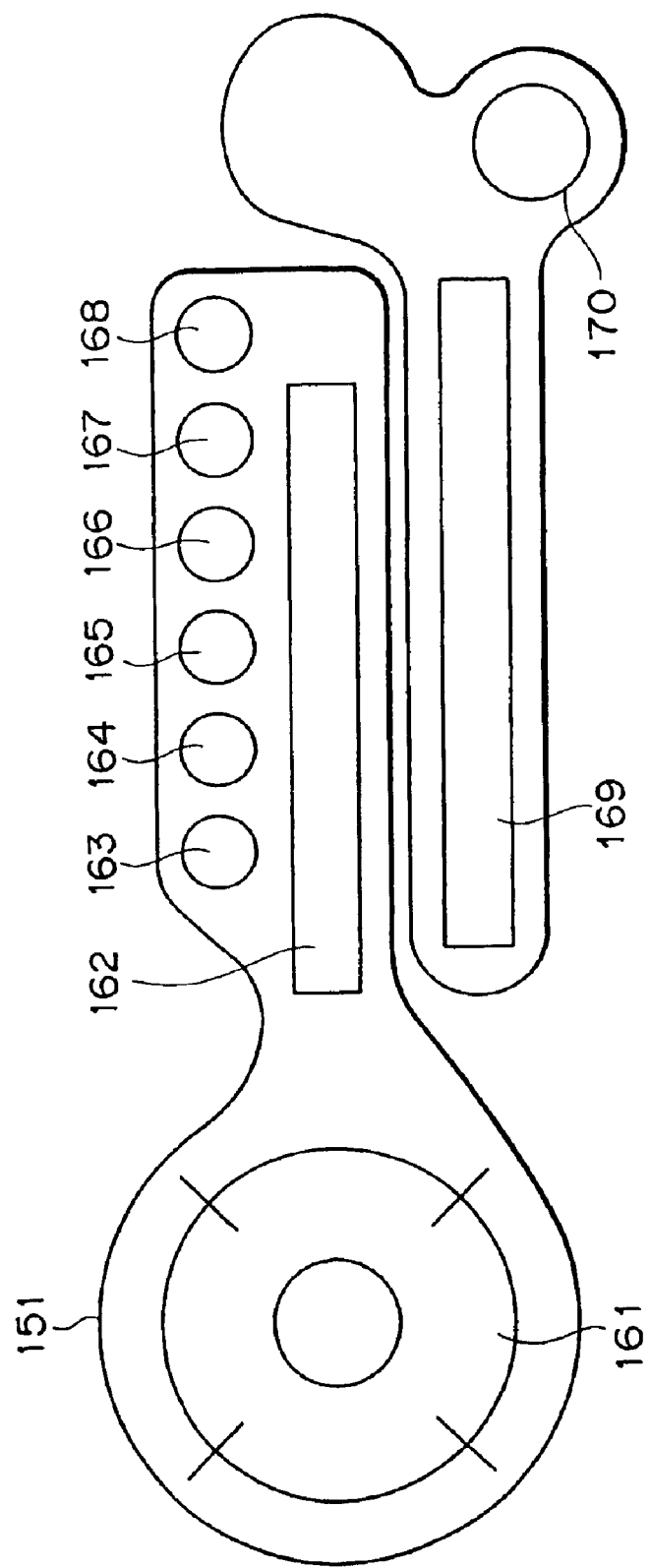
FIG. 12 is a diagram showing a voice-commander window.

When the voice commander 102 is activated, the UI processing unit 123 displays a picture showing an on-going activation on the LCD panel 21, displays a window of the voice commander 102 shown in FIG. 12 and transits to State 1 of waiting for the voice recognition engine 101 to be activated.

AS shown in FIG. 12, the voice-commander window 151 has a level gage 161, a recognition-result display area 162, a display switching button 163, a launcher setting button 164, a dictionary management button 165, a help button 166, a minimization button 167, a close button 168, a recognition-status display area 169 and a voice-input-mode switching button 170.

The level gage 161 displays the level of a voice entered by the user via the microphone 24. The level indicates the amplitude of a signal output by the microphone 124. The recognition-result display area 162 displays a word or a phrase representing a recognized voice supplied by the engine communication unit 122.

The display switching button 163 is operated to change the voice-commander window 151 to a small window not shown. The launcher setting button 164 is operated to make a setting related to the activation of the e-mail program 54A, the word-processor program 106 or the table-calculation program 107.

The dictionary management button 165 is operated to store a setting related to a recognized voice in the dictionary setting data base 114. The help button 166 is operated to display online help information on the LCD panel 21. The minimization button 167 is operated to erase the voice-commander window 151 from the LCD panel 21 and display its icon typically on a task tray. The close button 168 is operated to end the voice commander 102.

The recognition-status display area 169 displays the status of the voice recognition engine 101 or information indicating whether or not a local command can be used, that is, whether or not a predetermined program is active. The voice-input-mode switching button 170 is operated to switch a normal recognition mode to an ordinary recognition mode or vice versa.

If the activation of the voice recognition engine 101 ends in a failure in State 1, the processing carried out by the UI processing unit 123 is ended.

When the activation of the voice recognition engine 101 is completed successfully in State 1, on the other hand, the UI processing unit 123 transits to State 2.

When the close button 168 is clicked in State 2, the UI processing unit 123 ends the processing carried out by the voice commander 102. When a key assigned by the user to voice recognition is pressed in State 2, the UI processing unit 123 transits to State 3 in which a voice can be entered. An example of a key assigned to voice recognition is a control key of the keyboard 4. Such a key is referred to hereafter as a recognition key.

In a transition from State 2 to State 3, the UI processing unit 123 receives data from the application communication unit 121. The data indicates which of the still-picture viewing program 104, the electronic-pet program 105 and the still-picture photographing program 103 is active. The UI processing unit 123 then displays the name of the active program on the recognition-status display area 169 of the voice-commander window 151. If none of the still-picture photographing program 103, the still-picture viewing program 104 and the electronic-pet program 105 is active, on the other hand, the UI processing unit 123 displays information such as "Global Command" on the recognition-status display area 169 of the voice-commander window 151 to indicate that none of the still-picture photographing program 103, the still-picture viewing program 104 and the electronic-pet program 105 is active.

In State 3, a signal representing a voice entered by the user via the microphone 24 is supplied to the voice recognition engine 101, and data representing the level of the signal supplied to the voice recognition engine 101 is supplied to the UI processing unit 123 by way of the engine communication unit 122. In State 3, the UI processing unit 123 updates a display on the level gage 161 of the voice-commander window 151 in accordance with the data representing the level of the signal representing the voice.

In addition, in State 3, when the voice recognition engine 101 recognizes a voice, the UI processing unit 123 receives data such as a recognized word or a recognized phrase from the voice recognition engine 101 and displays the recognized word or phrase on the recognition-result display area 162 of the voice-commander window 151.

If the user keeps pressing the recognition key in State 3, the UI processing unit 123 carries out the processing in State 3 repeatedly.

When the user releases the recognition key in State 3, the UI processing unit 123 requests the application communication unit 121 or the voice launcher control unit 124 to carry out a predetermined operation such as activation of the e-mail program 54A corresponding to data supplied by the voice recognition engine 101 to the UI processing unit 123. The data is a code number, a recognized word or phrase and a string of characters related to the recognized word.

At the request made by the UI processing unit 123, the application communication unit 121 activates the still-picture photographing program 103, the still-picture viewing program 104 or the electronic-pet program 105, or issues a command to the still-picture photographing program 103, the still-picture viewing program 104 or the electronic-pet program 105.

At the request made by the UI processing unit 123, the voice launcher control unit 124 activates the e-mail program 54A, the word-processor program 106 or the table-calculation program 107, or supplies predetermined data such as a mail address to the e-mail program 54A.

When the application communication unit 121 or the voice launcher control unit 124 drives a predetermined program to finish a predetermined operation, the application communication unit 121 or the voice launcher control unit 124 informs the UI processing unit 123 of the completion. The UI processing unit 123 then displays a picture to be described more later on the LDC panel 21 in accordance with a program serving as an object of the finished operation. The picture enables the user to recognize the program which serves as the object of the finished operation.

Since the picture for recognizing the program serving as an object of the finished operation is displayed on the LCD panel 21, the user is capable of knowing the result of voice recognition and the operation carried out by the voice commander 102.

In a transition from State 3 to State 2, the UI processing unit 123 erases the display on the recognition-status display area 169.

When the voice-input-mode switching button 170 is clicked in State 2, the UI processing unit 123 transits to State 4 of a normal recognition mode.

In a transition from State 2 to State 4, the UI processing unit 123 receives data from the application communication unit 121. The data indicates which of the still-picture photographing program 103, the still-picture viewing program 104 and the electronic-pet program 105 is active. Then, the UI processing unit 123 displays the name of the active program in the recognition-status display area 169. If none of the still-picture photographing program 103, the still-picture viewing program 104 and the electronic-pet program 105 is active, on the other hand, the UI processing unit 123 displays information such as "Global Command" on the recognition-status display area 169 of the voice-commander window 151 to indicate that none of the still-picture photographing program 103, the still-picture viewing program 104 and the electronic-pet program 105 is active.

In State 4, a signal representing a voice entered by the user via the microphone 24 is supplied to the voice recognition engine 101, and data representing the level of the signal supplied to the voice recognition engine 101 is supplied to the UI processing unit 123 by way of the engine communication unit 122. In State 4, the processing unit 123 updates a display on the level gage 161 of the voice-commander window 151 in accordance with the data representing the level of the signal representing the voice.

In addition, in State 4, when the voice recognition engine 101 recognizes a voice, the UI processing unit 123 receives data such as a recognized word or a recognized phrase from the voice recognition engine 101 and displays the recognized word or phrase on the recognition-result display area 162 of the voice-commander window 151.

When the UI processing unit 123 receives a recognized word or a recognized phrase from the voice recognition engine 101 in State 4, the UI processing unit 123 requests the application communication unit 121 or the voice launcher control unit 124 to carry out a predetermined operation corresponding to data supplied by the voice recognition engine 101 to the UI processing unit 123. The data is a code number, a recognized word or phrase and a string of characters related to the recognized word.

At the request made by the UI processing unit 123, the application communication unit 121 activates the still-picture photographing program 103, the still-picture viewing program 104 or the electronic-pet program 105, or issues a command to the still-picture photographing program 103, the still-picture viewing program 104 or the electronic-pet program 105.

At the request made by the UI processing unit 123, the voice launcher control unit 124 activates the e-mail program 54A, the word-processor program 106 or the table-calculation program 107, or supplies predetermined data such as a mail address to the e-mail program 54A.

When the application communication unit 121 or the voice launcher control unit 124 drives a predetermined program to finish a predetermined operation, the application communication unit 121 or the voice launcher control unit 124 informs the UI processing unit 123 of the completion. The UI processing unit 123 then displays a picture to be described more later on the LDC panel 21 in accordance with a program serving as an object of the finished operation. The picture enables the user to recognize the program which serves as the object of the finished operation.

In State 4, when the voice recognition engine 101 recognizes a predetermined voice without regard to an operation carried out on the recognition key, the voice commander 102 activates the still-picture photographing program 103, the still-picture viewing program 104 or the electronic-pet program 105, or issues a predetermined command to the still-picture photographing program 103, the still-picture viewing program 104 or the electronic-pet program 105. As an alternative, the voice commander 102 activates the e-mail program 54A, the word-processor program 106 or the table-calculation program 107, or supplies predetermined data to the e-mail program 54A.

When the voice-input-mode switching button 170 is clicked in State 4, the UI processing unit 123 transits back to State 2.

In State 2, when an operation to take a still picture is added to the still-picture photographing program 103, that is, for example, when the shutter button 10 is pressed, the UI processing unit 123 transits to State 5 in which a comment to be stuck on the still picture is input.

In State 5, a signal representing a voice entered by the user via the microphone 24 is supplied to the voice recognition engine 101, and data representing the signal representing the voice entered by the user via the microphone 24 is supplied to the UI processing unit 123 by way of the engine communication unit 122. In State 5, the UI processing unit 123 updates a display on the level gage 161 of the voice-commander window 151 in accordance with the data representing the level of the signal representing the voice.

In addition, in State 5, when the voice recognition engine 101 recognizes a voice, the UI processing unit 123 receives data such as a recognized word or a recognized phrase from the voice recognition engine 101 and displays the recognized word or phrase on a predetermined dialog for a picture including the attached comment displayed on the LCD panel 21.

In State 5, the UI processing unit 123 supplies a recognized word or a recognized phrase received from the voice recognition engine 101 to the application communication unit 121. The application communication unit 121 passes on the recognized word or phrase to the still-picture photographing program 103 to be kept therein as a comment for a picture.

In state 5, when data showing an operation to finish processing to input a comment from the still-picture photographing program 103 through the application communication unit 121 is supplied to the UI processing co unit 123, the UI processing unit 123 transits to State 2. An example of the operation to finish processing to input a comment from the still-picture photographing program 103 is an operation to release the shutter button 10.

When the dictionary management button 165 on the voice-commander window 151 is clicked in State 2, the UI processing unit 123 transits to State 6 of setting a dictionary. In this state, the user dictionary control unit 125 is requested to carry out processing to set a dictionary.

In State 6, the user dictionary control unit 125 displays a dialog for setting a dictionary on the LCD panel 21, and updates settings stored in the dictionary setting data base 114 and the recognized-word & grammar data base 115 on the basis of an operation carried out for the dialog for setting a dictionary.

When a test button placed on the dialog for setting a dictionary is clicked in State 6, the UI processing unit 123 transits to State 8 of carrying out a voice recognition test. In State 8, the recognized-test processing unit 126 is requested to carry out processing of the voice recognition test.

The recognized-test processing unit 126 displays a dialog of the voice recognition test on the LCD panel 21. The recognized-test processing unit 126 then carries out the voice recognition test to form a judgment as to whether or not a word received from the voice recognition engine 101 through the engine communication unit 122 matches a word cataloged in the dictionary setting data base 114. The word received from the voice recognition engine 101 represents a recognized voice. Then, the recognized-test processing unit 126 displays a result of the judgment.

As an alternative, the recognized-test processing unit 126 displays a dialog of the voice recognition test on the LCD panel 21. The recognized-test processing unit 126 then carries out the voice recognition test to form a judgment as to whether or not a word received from the voice recognition engine 101 through the engine communication unit 122 is a part of a word cataloged in the dictionary setting data base 114. The word received from the voice recognition engine 101 represents a recognized voice. Then, the recognized-test processing unit 126 displays a result of the judgment.

When a test button placed on the dialog for a voice recognition test is clicked in State 8, the UI processing unit 123 transits to State 6.

When a close button placed on the dialog for setting a dictionary is clicked in State 6, the UI processing unit 123 transits to State 2.

If the launcher setting button 164 of the voice-commander window 151 is clicked in State 2, the UI processing unit 123 transits to a State 7 of setting activation of the table-calculation program 107, the word-processor program 106 or the e-mail program 54A of the voice launcher control unit 124 and requests the voice launcher control unit 124 to carry out processing to set activation of one of the programs.

In State 7, the voice launcher control unit 124 displays a dialog for launcher setting on the LCD panel 21 and updates a setting stored in the launcher setting data base 113 on the basis of an operation carried out for the dialog for the launcher setting.

If a test button placed on the dialog for launcher setting is clicked in State 7, the UI processing unit 123 transits to State 9 of carrying out a voice recognition test. In State 7, the recognized-test processing unit 126 is requested to carry out processing of the voice recognition test.

The recognized-test processing unit 126 displays a dialog of the voice recognition test on the LCD panel 21. The recognized-test processing unit 126 then carries out the voice recognition test to form a judgment as to whether or not a word or a phrase received from the voice recognition engine 101 through the engine communication unit 122 includes a word cataloged in the launcher setting data base 113 and the word or the phrase matches a set grammar. The word or the phrase received from the voice recognition engine 101 represents a recognized voice. Then, the recognized-test processing unit 126 displays a result of the judgment.

If a test button placed on the dialog for a voice recognition test is clicked in State 9, the UI processing unit 123 transits to State 7.

If a close button placed on the dialog for launcher setting is clicked in State 7, the UI processing unit 123 transits to State 2.

Figure 13:
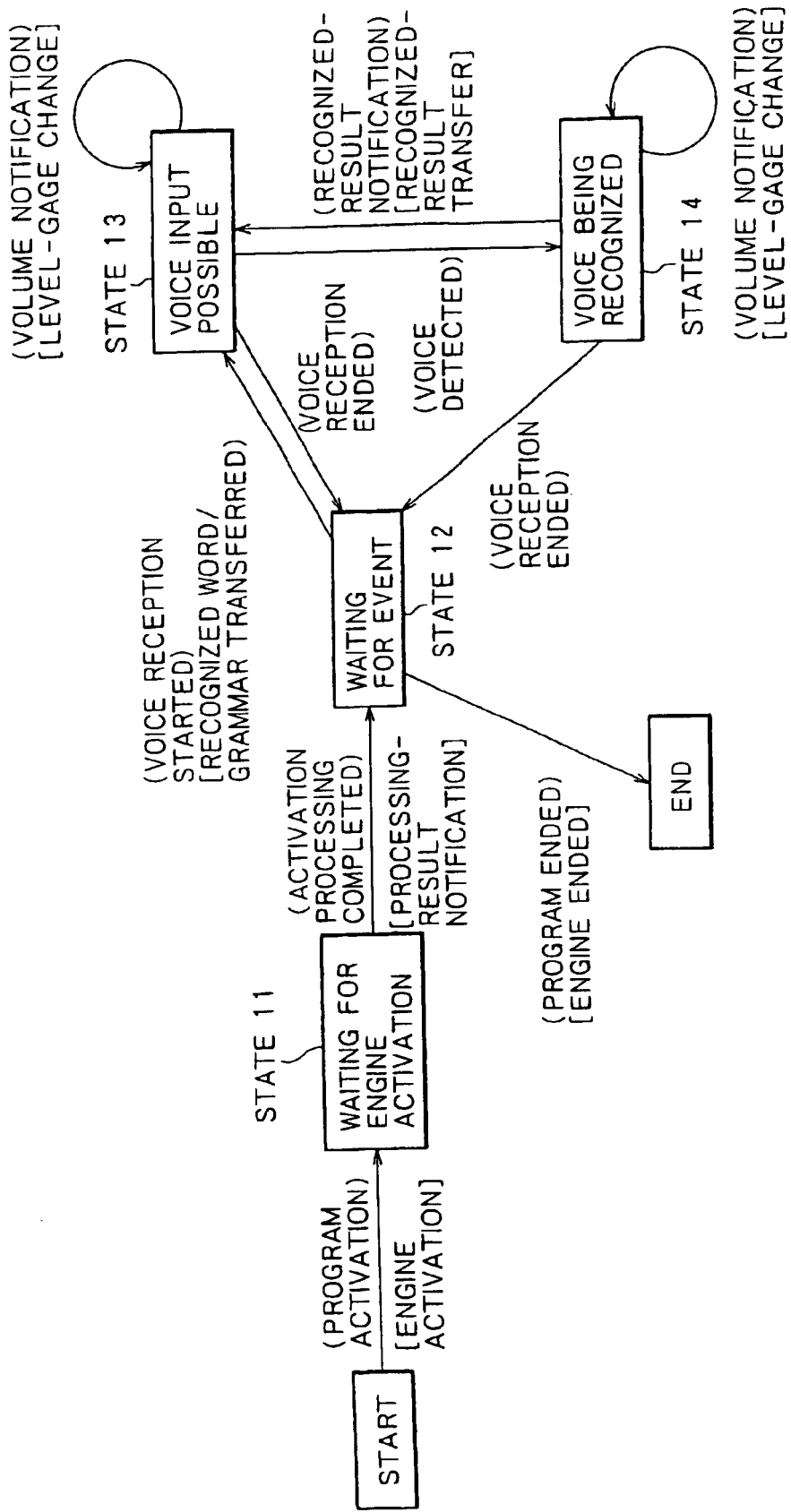
FIG. 13 is a diagram showing state transitions of an engine-communication unit.

FIG. 13 is an explanatory diagram showing state transitions of the engine communication unit 122 which correspond to predetermined inputs. In the figure, a phrase enclosed by parentheses ( ) is a condition for a state transition such as activation of a program or notification of an engine activation completion. On the other hand, a phrase enclosed by brackets [ ] denotes processing carried out to accompany a state transition. Examples of such processing are an operation to provide a notification of a processing result and a transfer of a recognition result.

When the voice commander 102 is activated, the engine communication unit 122 transits to State 11 of waiting for the voice recognition engine 101 to be activated. If initialization ends in a failure in State 11, the engine communication unit 122 notifies the UI processing unit 123 of the failure. Informed of the failure, the UI processing unit 123 terminates the operation of the voice commander 102. Thus, if the initialization ends in a failure, the processing carried out by the engine communication unit 122 is discontinued.

When the UI processing unit 123 is notified of the result of the activation of the voice recognition engine 101 in State 11, the engine communication unit 122 transits to State 12.

When the user presses a recognition key such as a control key, the UI processing unit 123 supplies data for the operation to press the key to the engine communication unit 122. Thus, when the engine communication unit 122 receives the data for the operation to press the recognition key in State 11, the engine communication unit 122 receives information indicating which of the still-picture photographing program 103, the still-picture viewing program 104 and the electronic-pet program 105 is active from the application communication unit 121, and reads out data showing a word or a grammar corresponding to the information from the recognized-word & grammar data base 115.

The engine communication unit 122 properly converts the data showing the word or the grammar corresponding to the active program or data representing typically a command of the still-picture photographing program 103, the still-picture viewing program 104 or the electronic-pet program 105 into data with a proper format, and supplies the data with the proper format to the voice recognition engine 101. Then, the engine communication unit 122 transits to State 13 of being ready to receive data representing a result of recognition from the voice recognition engine 101.

In State 13, the engine communication unit 122 receives data generated by the voice recognition engine 101 to represent the level of a signal from the voice recognition engine 101 and passes on the data to the UI processing unit 123. Received by the voice recognition engine 101, the signal represents a voice entered by the user via the microphone 24. The UI processing unit 123 updates a display on the level gage 161 of the voice-commander window 151 in accordance with the data representing the level of the signal representing the input voice.

When the user outputs a voice to the microphone 24, the voice recognition engine 101 detects the voice and supplies data indicating the detection of the voice to the engine communication unit 122. Receiving the data indicating the detection of the voice in State 13, the engine communication unit 122 passes on the data to the UI processing unit 123 and transits to State 14.

In State 14, the engine communication unit 122 receives data generated by the voice recognition engine 101 to represent the level of a signal from the voice recognition engine 101 and passes on the data to the UI processing unit 123. Received by the voice recognition engine 101, the signal represents a voice entered by the user via the microphone 24. The UI processing unit 123 then updates a display on the level gage 161 of the voice-commander window 151 in accordance with the data representing the level of the signal representing the input voice.

Receiving data representing typically a recognized word or phrase from the voice recognition engine 101 in State 14, the engine communication unit 122 passes on the data to the UI processing unit 123. The UI processing unit 123 then updates a display such as a picture or characters appearing on the LCD panel 21 on the basis of the data representing typically as a recognized word or a recognized phrase.

If the data coming from the voice recognition engine 101 and representing typically a recognized word or phrase is judged to be information indicating activation of the still-picture photographing program 103, the still-picture viewing program 104 or the electronic pet program 105 or if the data is judged to be a command issued to the still-picture photographing program 103, the still-picture viewing program 104 or the electronic-pet program 105 in State 14, the engine communication unit 122 passes on the data to the application communication unit 121.

If the data coming from the voice recognition engine 101 and representing typically a recognized word or phrase is judged to be information indicating activation of the e-mail program 54A, the word-processor program 106 or the table-calculation program 107 or if the data is judged to be data supplied to the e-mail program 54A in State 14, the engine communication unit 122 passes on the data representing typically a recognized word or phrase to the voice launcher control unit 124.

After passing on the data representing typically a recognized word or phrase to the application communication unit 121 or the voice launcher control unit 124, the engine communication unit 122 transits to State 12.

Figure 14:
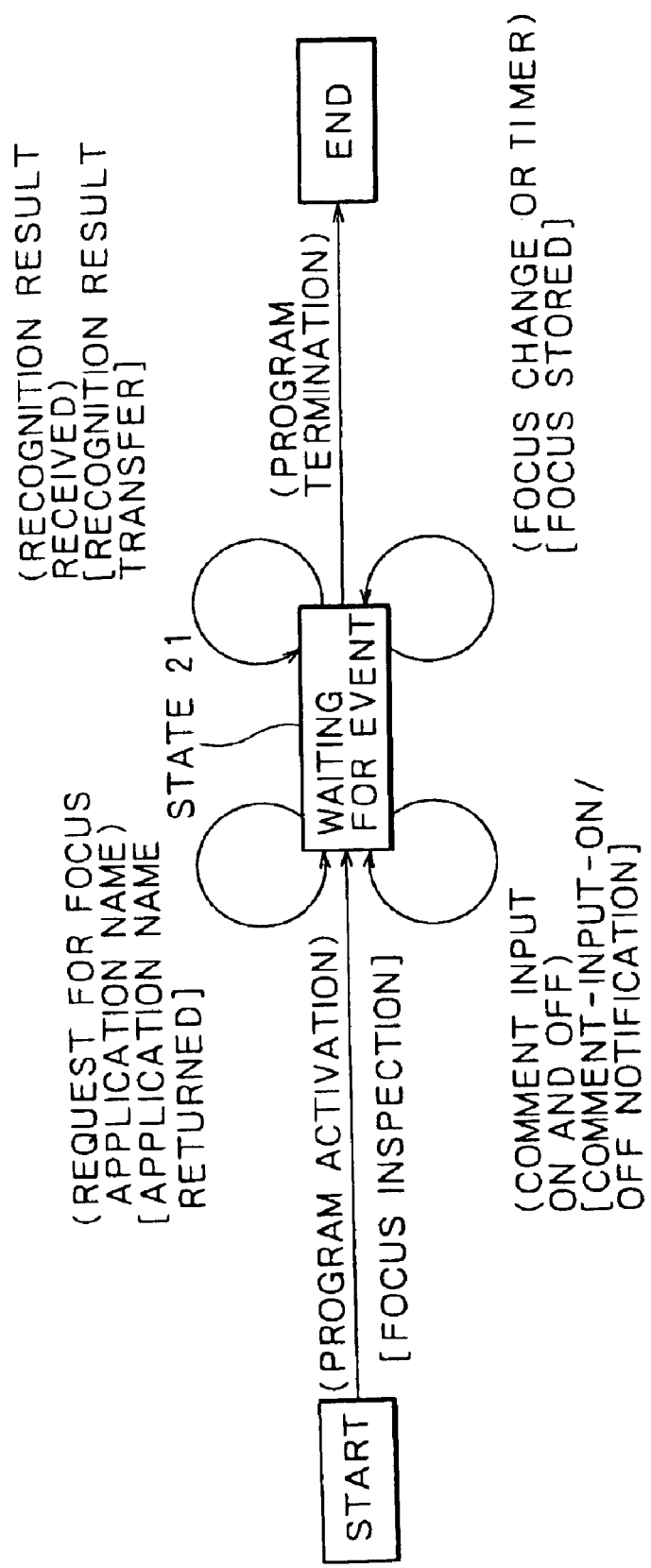
FIG. 14 is a diagram showing state transitions of an application-communication unit.

FIG. 14 is an explanatory diagram showing state transitions of the application communication unit 121 which correspond to predetermined inputs.

Accompanying activation of the voice commander 102, the application communication unit 121 transits to State 21. In State 21, the operation of the application communication unit 121 is ended when the processing carried out by the voice commander 102 is terminated.

During the operation of the application communication unit 121, the application communication unit 121 is always put in State 21. When the focus of a window is changed in this state or when a predetermined period of time lapses in this state, the application communication unit 121 updates predetermined data stored in the application communication unit 121 in dependence on the outcome of a judgment as to whether the still-picture photographing program 103, the still-picture viewing program 104 or the electronic-pet program 105 has been invoked or is active.

In addition, at a request made by the UI processing unit 123 or the engine communication unit 122, the application communication unit 121 provides the UI processing unit 123 or the engine communication unit 122 with data indicating whether the still-picture photographing program 103, the still-picture viewing program 104 or the electronic-pet program 105 has been invoked or is active. The data includes information indicating that none of the programs are active.

Figure 47:
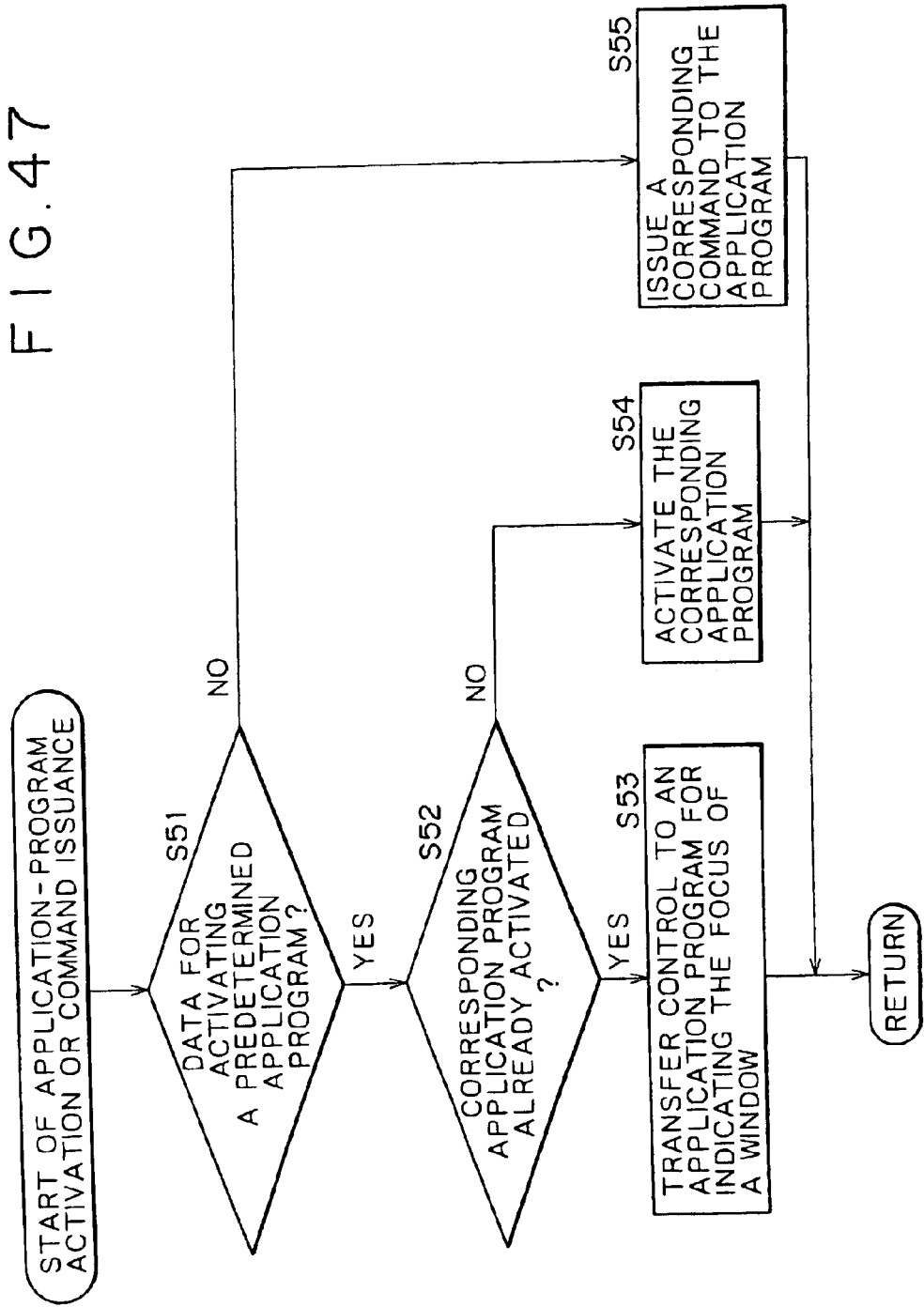
FIG. 47 shows a flowchart used for explaining processing to issue a command or activate an application program.

When data representing typically a recognized word or phrase is received from the engine communication unit 122 in State 21, the application communication unit 121, activates the still-picture photographing program 103, the still-picture viewing program 104 or the electronic-pet program 105 and puts the still-picture photographing program 103, the still-picture viewing program 104 or the electronic-pet program 105 in an active state in accordance with a flowchart shown in FIG. 47, or issues a predetermined command to the still-picture photographing program 103, the still-picture viewing program 104 or the electronic-pet program 105.

If data making a request for a comment is received from the still-picture photographing program 103 or data indicating that an operation be terminated is received in State 21, the application communication unit 121 passed on the data to the UI processing unit 123. Data indicating that an operation be terminated is received for example when the shutter button 10 is pressed or released.

Figure 15:
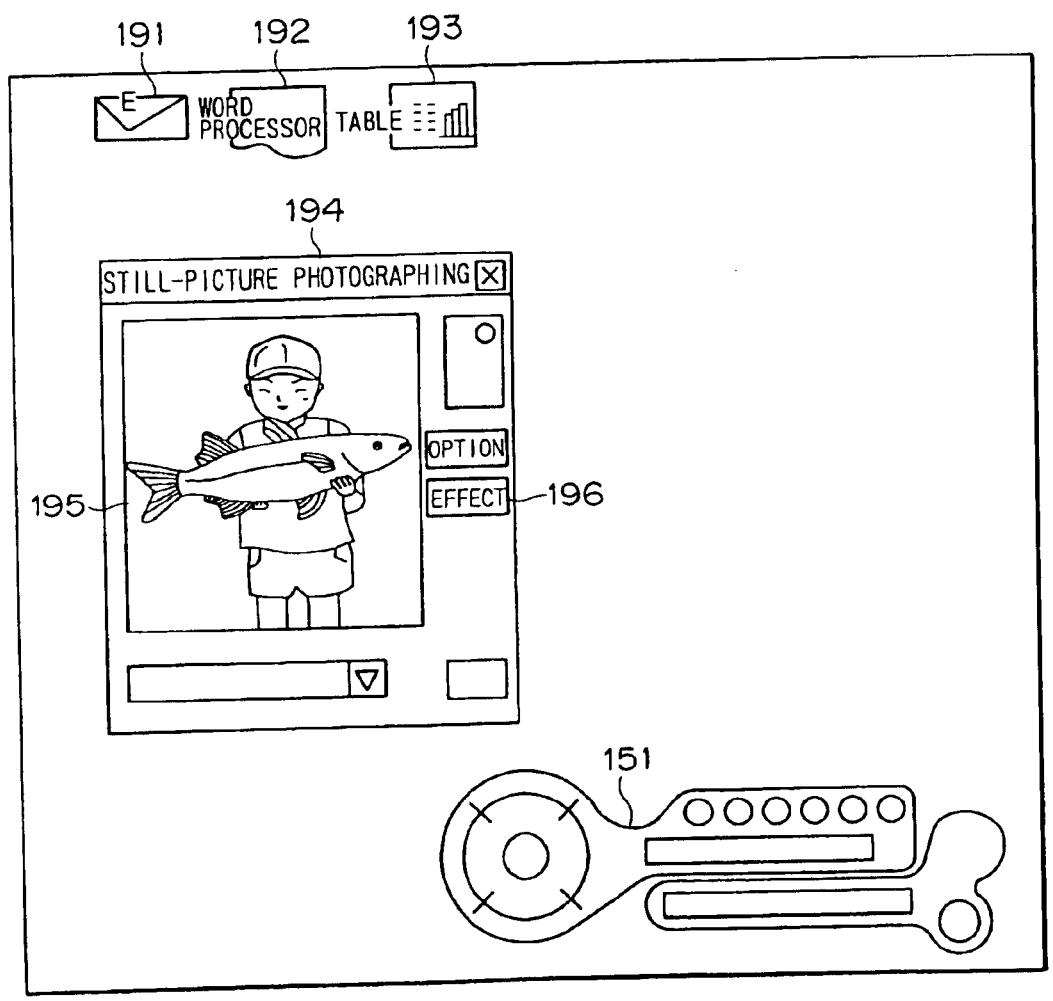
FIG. 15 is an explanatory diagram showing a screen appearing on the LCD panel with a voice-commander, a voice recognition engine and a still-picture photographing program activated.

Next screens appearing on the LCD panel 21 of the personal computer 1 are explained. FIG. 15 is a diagram showing a screen appearing on the LCD panel 21 with the voice commander 102, the voice recognition engine 101 and the still-picture photographing program 103 activated.

At predetermined positions on the screen appearing on the LCD panel 21, an icon 191 associated with the e-mail program 54A, an icon 192 associated with the word-processor program 106, an icon 193 associated with the table-calculation program 107, the voice-commander window 151 and a window 194 displaying the still-picture photographing program 103 are displayed.

When the icon 191 is selected typically by operating the stick-type pointing device 5 and an activation command is executed, the e-mail program 54A is activated. It should be noted that the e-mail program 54A may also be activated by selecting the e-mail program 54A from a menu not shown in the figure. By the same token, when the icon 192 is selected and an activation command is executed, the word-processor program 106 is activated. Likewise, when the icon 193 is selected and an activation command is executed, the table-calculation program 107 is activated.

The window 194 displaying the still-picture photographing program 103 includes, among other things, a picture display area 195 for displaying a picture taken by the CCD video camera 23 and an effect button 196.

If the shutter button 10 of the personal computer 1 is pressed in the state shown in FIG. 15, the still-picture photographing program 103 generates data of a still picture having a predetermined format such as the JPEG (Joint Photographic Experts Group) format on the basis of a picture taken by the CCD video camera 23. The still-picture photographing program 103 then generates a file for storing the data and stores the file in the HDD 56. At the same time, the still-picture photographing program 103 invokes the still-picture viewing program 104.

If the user enters a voice of, for example, "With papa in Hachijojima" via the microphone 24 while keeping the shutter button 10 of the personal computer 1 pressed, the UI processing unit 123 transits to State 5 to receive a recognized word or phrase from the voice recognition engine 101 through the engine communication unit 122. The UI processing unit 123 then passes on the recognized word or phrase to the still-picture photographing program 103 by way of the application communication unit 121.

Then, the still-picture photographing program 103 attaches the recognized word or phrase received from the UI processing unit 123 typically at a predetermined position in the header of the still-picture file.

When the shutter button 10 of the personal computer 1 is released, the UI processing unit 123 transits to State 2 to finish the processing of voice recognition.

It should be noted that the operation to stick a comment on the file of a still picture can also be carried out by the still-picture viewing program 104.

Figure 16:
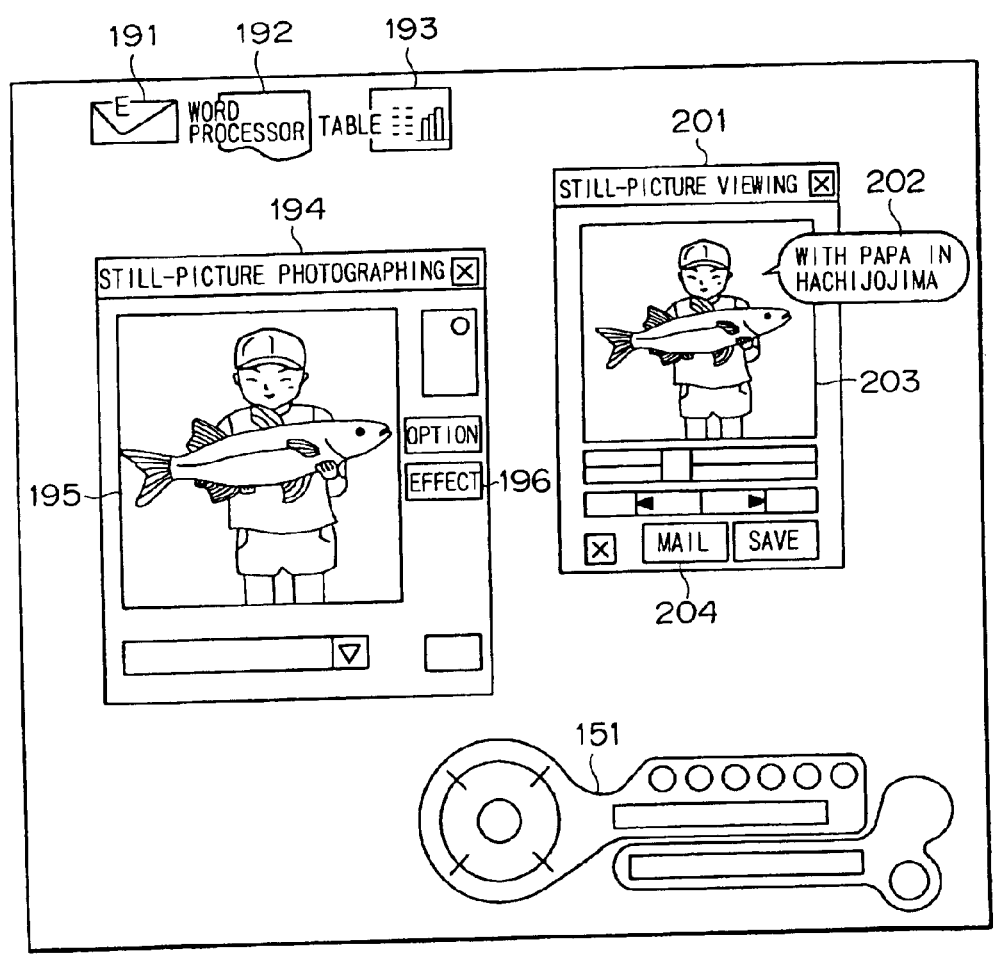
FIG. 16 is a diagram showing a still-picture stored in an already produced file on the LCD panel by a still-picture viewing program.

The still-picture viewing program 104 displays the still picture stored in the file generated by the still-picture photographing program 103 as a window 201 as shown in FIG. 16. The window 201 displayed by the still-picture viewing program 104 includes a picture display area 203 for displaying the still picture stored in the file generated by the still-picture photographing program 103, a comment input dialog 202 for displaying a stuck word or phrase and a button 204 named "Mail".

Figure 17:
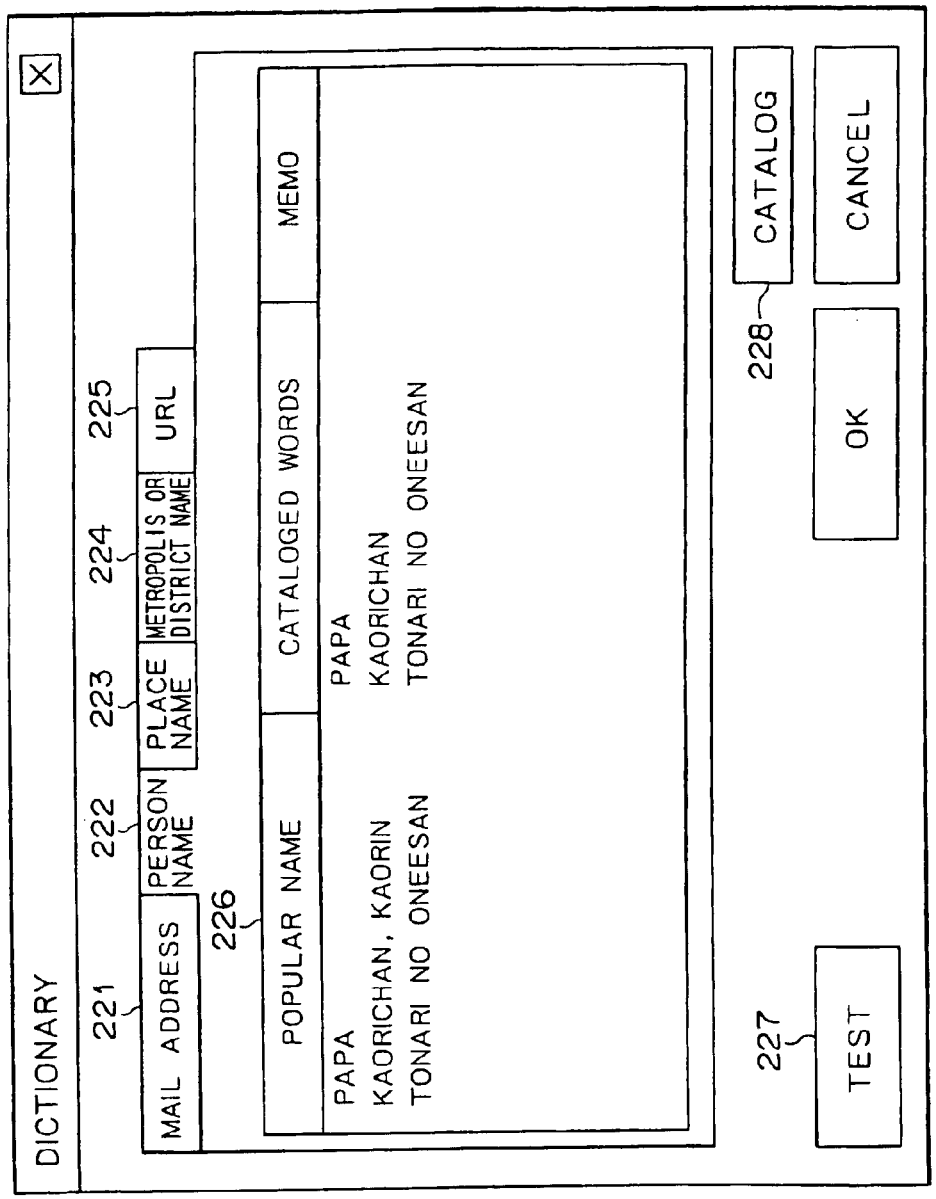
FIG. 17 is a diagram showing a dictionary management dialog which is displayed on the LCD panel.

The following description explains a dialog for cataloging a word to be appended to a file of a still picture. FIG. 17 is a diagram showing a dictionary management dialog which is displayed on the LCD panel 21 by the user dictionary control unit 125 when a dictionary management button 165 of the voice-commander window 151 is clicked.

As shown in the figure, the dictionary management dialog comprises a tab 221 named "Mail address", a tab 222 with a person name appended thereon, a tab 223 with a place name appended thereon, a tab 224 with a metropolis or district name appended thereon and a tab 225 named "URL". The tab 221 is clicked to display a mail address corresponding to a popular name, or a word or a phrase recognized by the voice recognition engine 101. The tab 222 is clicked to display a person name for the popular name. The tab 223 is clicked to display a place name associated with the popular name. The tab 224 is clicked to display a metropolis or district name associated with the popular name. The tab 225 is clicked to display a URL associated with the popular name.

The typical dictionary management dialog shown in FIG. 17 includes pairs which each consist of a popular name and a cataloged word in a popular-name display field 226. The cataloged words are stored in the dictionary setting data base 114, being included in a person-name category. A cataloged word is used as a comment when a voice is recognized successfully. The first pair consists of a popular name of "Papa" and a cataloged word of "Papa". The second pair consists of popular names of "Kaorichan" and "Kaorin" and a cataloged word of "Kaorichan". That is to say, when a voice is recognized to be "Kaorichan" or "Kaorin", the cataloged word used as a comment is "Kaorichan". The third pair consists of a popular name of "Tonari no oneesan" and a cataloged word of "Tonari no oneesan".

The dictionary management dialog also includes a catalog button 228 and a test button 227 for making a transition to State 8.

Figure 18:
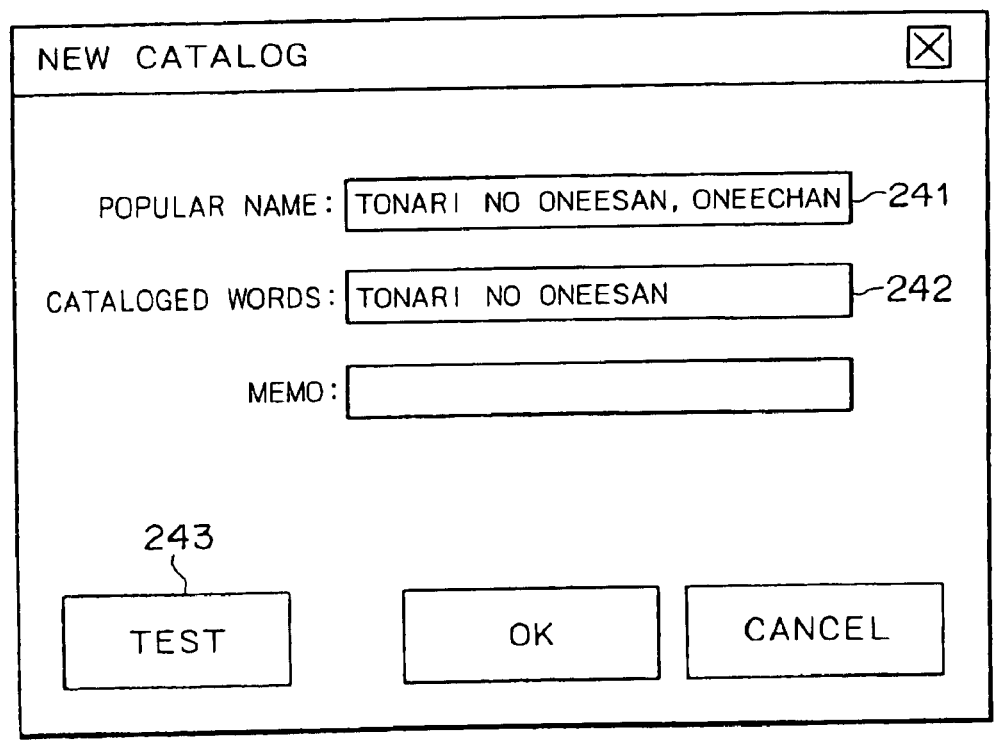
FIG. 18 is a diagram showing a new catalog dialog which is displayed on the LCD panel.

When the catalog button 228 is clicked, the user dictionary control unit 125 displays a new catalog dialog shown in FIG. 18 on the LCD panel 21. As shown in FIG. 18, the new catalog dialog has a popular-name input field 241 for entering a popular name, and a cataloged-word input field 242 for entering a cataloged word. If a popular name is entered to the popular-name input field 241, a cataloged word for the popular name is entered to the cataloged-word input field 242 and a button named OK is clicked, the popular name entered to the popular-name input field 241 and the cataloged word entered to the cataloged-word input field 242 are stored in the dictionary setting data base 114.

If a button 243 named "New Catalog Dialog Test" is clicked, the UI processing unit 123 transits to State 8. The recognized-test processing unit 126 displays a newly cataloged-word test dialog shown in FIG. 19.

As shown in the figure, the newly cataloged-word test dialog has a popular-name input field 241, a message field 252 for displaying a predetermined message and test-result display field 253. When the user enters a voice via the microphone 24 or, to be more specific, when the user mentions a popular name toward the microphone 24, the recognized-test processing unit 126 forms a judgment as to whether or not the voice recognized by the voice recognition engine 101 matches a word entered to the popular-name input field 241 and displays the outcome of the judgment on the test-result display field 253.

Figure 19:
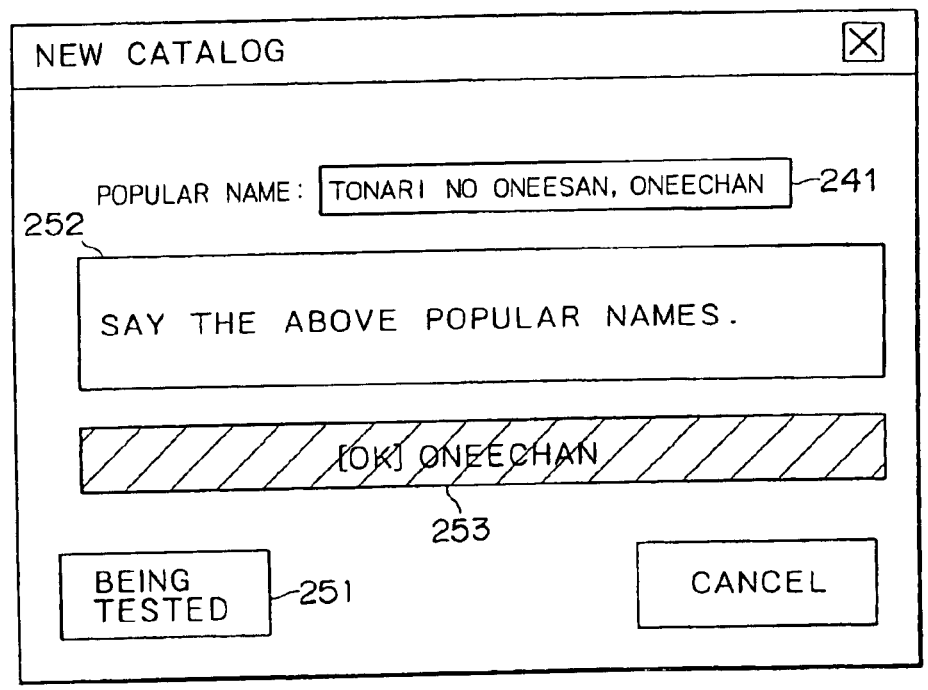
FIG. 19 is a diagram showing a newly cataloged-word test dialog which is displayed on the LCD panel.

In the typical newly cataloged-word test dialog shown in FIG. 19, the user mentions the word "oneechan" to the microphone 24 with the word "oneechan" already entered to the popular-name input field 241. The voice recognition engine 101 recognizes the word "oneechan" mentioned to the microphone 24. The recognized-test processing unit 126 determines that the recognized word matches the word entered to the popular-name input field 241, displaying the fact that the recognized word matches the word entered to the popular-name input field 241 on the test-result display field 253.

If the voice recognized by the voice recognition engine 101 is determined not to match the word entered to the popular-name input field 241, the recognized-test processing unit 126 displays a text corresponding to the voice recognized by the voice recognition engine 101 along with a message indicating the mismatch in the test-result display field 253. An example of such a message is "NG".

When a button 251 named "Being Tested" is clicked, the UI processing unit 123 transits to State 6 to request the user dictionary control unit 125 to display a dictionary management dialog.

When a test button 227 of the dictionary management catalog is clicked, the UI processing unit 123 transits to State 8 in which the recognized-test processing unit 126 displays a cataloged-word test dialog shown in FIG. 20.

As shown in the figure, the cataloged-word test dialog has tabs 221, 222, 223, 224 and 225, a popular-name display field 226, a message field 272 for displaying a predetermined message and a test-result display field 273.

When the user enters a voice to a microphone 24 with the cataloged-word test dialog displayed on the screen, that is, when the users says a popular name to the microphone 24 with the cataloged-word test dialog displayed, the recognized-test processing unit 126 forms a judgment as to whether or not any of words displayed in the popular-name display field 226 matches a word recognized by the voice recognition engine 101. If any of the words displayed in the popular-name display field 226 matches a word recognized by the voice recognition engine 101, the word displayed in the popular-name display field 226 matching the word recognized by the voice recognition engine 101 is highlighted.

If none of the words displayed in the popular-name display field 226 matches a word recognized by the voice recognition engine 101, on the other hand, the recognized-test processing unit 126 typically displays a text corresponding to the voice recognized the voice recognition engine 101 along with a message indicating the mismatch in the test-result display field 273. An example of such a message is "NG".

When a button 271 of the cataloged-word test dialog is clicked, the UI processing unit 123 transits to State 6 to request the user dictionary control unit 125 to display the dictionary management dialog.

Figure 21:
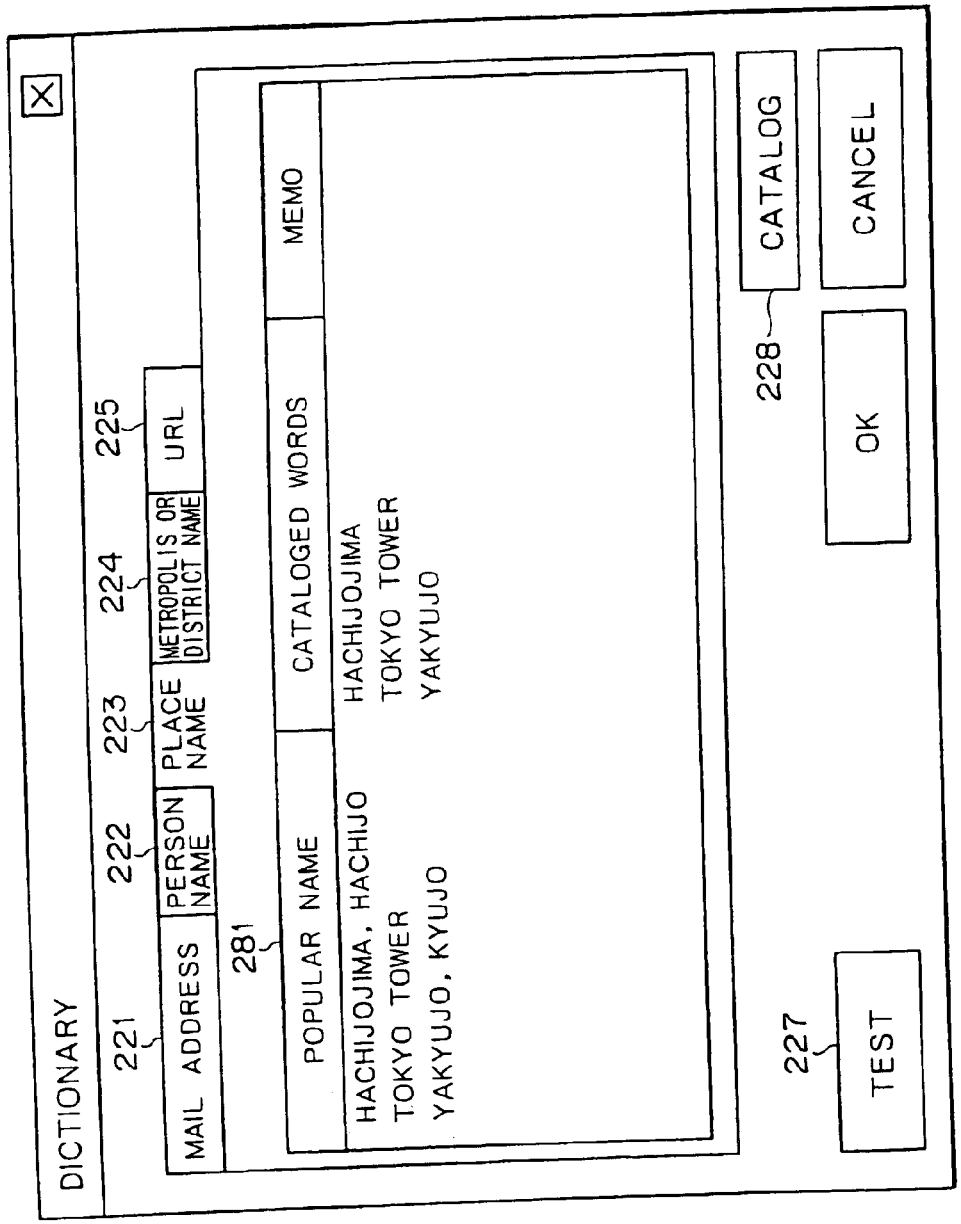
FIG. 21 is a diagram showing a dictionary management dialog which is displayed on the LCD panel.

When the tab 223 of the dictionary management dialog is clicked, the user dictionary control unit 125 displays popular names and cataloged words associated with the popular names in a popular-name display field 281 as shown in FIG. 21. Stored in the dictionary setting data base 114, the popular names and cataloged words associated with the popular names pertain to a place-name category. A cataloged word is a word to be input as a comment for successful recognition of a voice. For example, a cataloged word associated with a popular name of "Hachijojima" or "Hachijo" is "Hachijojima" whereas a cataloged word associated with a popular name of "Tokyo Tower" is "Tokyo Tower". When a voice is recognized as "Yakyujo" or "Kyujo", a cataloged word input as a comment is "Yakyujo".

When the button 204 named "Mail" of a window used by the still-picture viewing program 104 to display a predetermined still picture as shown in FIG. 16 is clicked, the still-picture viewing program 104 activates the e-mail program 54A in case the e-mail program 54A has not been activated yet.

The still-picture viewing program 104 drives the e-mail program 54A to generate a new mail. The still-picture viewing program 104 attaches a file of the still picture to the newly generated mail. That is to say, the file attached to the new mail is a file corresponding to the displayed still picture.

Furthermore, the still-picture viewing program 104 sticks a comment stored in the attached file of the still picture on the text of the new mail.

Figure 22:
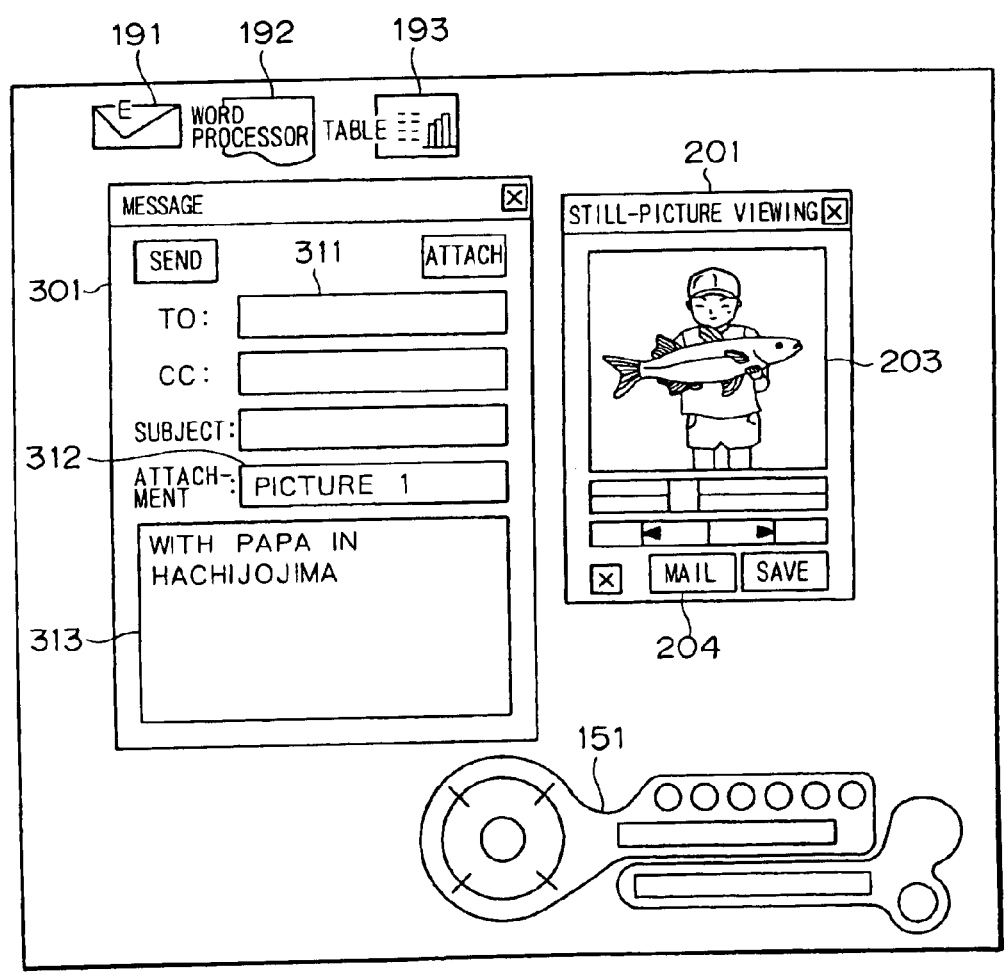
FIG. 22 is an explanatory diagram showing a message window on the LCD panel by an e-mail program.

FIG. 22 is an explanatory diagram showing a message window 301 which is displayed by the e-mail program 54A on the LCD panel 21 when the still-picture viewing program 104 requests the e-mail program 54A to generate a message.

The name of the attached still-picture file is displayed on an attached-file display field 312. On the other hand, the text of a new message stuck from a comment stored in the attached still-picture file is displayed on a text display field 313.

A predetermined mail address is entered to a destination field 311. When a button named "Send" on the message window 301 is clicked, the message displayed on the message window 301 is sent to a destination indicated by the mail address set in the destination field 311 by way of the Internet 92.

The following description explains processing carried out by the voice commander 102 to activate the e-mail program 54A and to drive the e-mail program 54A to generate a mail with a mail address set thereon. If a voice such as "Mail for neesan" is entered to the microphone 24 with the recognition key being pressed in an activated state of the voice commander 102, the voice recognition engine 101 supplies predetermined data corresponding to the phrase "Mail for neesan" to the voice commander 102.

Figure 23:
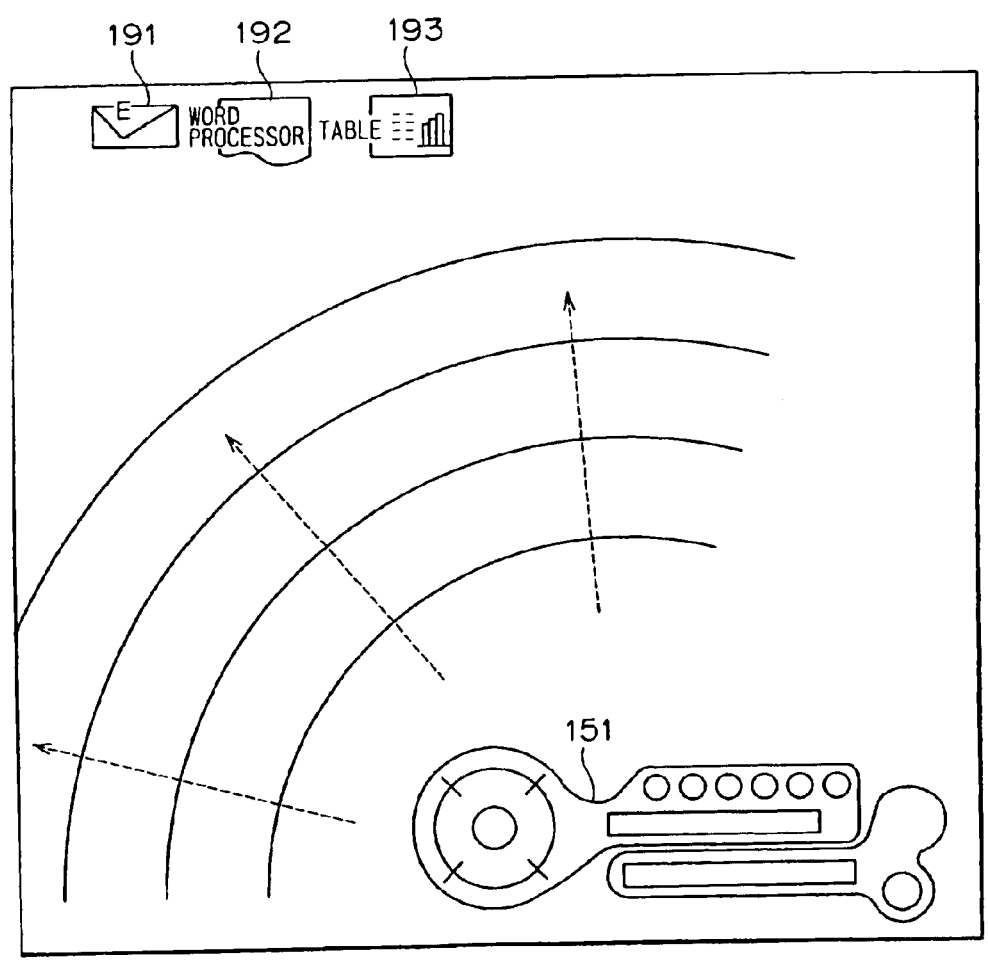
FIG. 23 is a diagram showing a shape like a ripple spreading from a voice-commander window over the entire screen on the LCD panel.

As shown in FIG. 23, the UI processing unit 123 displays a picture with a shape like a ripple spreading from the voice-commander window 151 over the entire screen as indicated by dotted-line arrows on the LCD panel 21. It should be noted that the dotted-line arrows are shown in FIG. 23 for explanation purposes only and not actually displayed on the screen.

Figure 24:
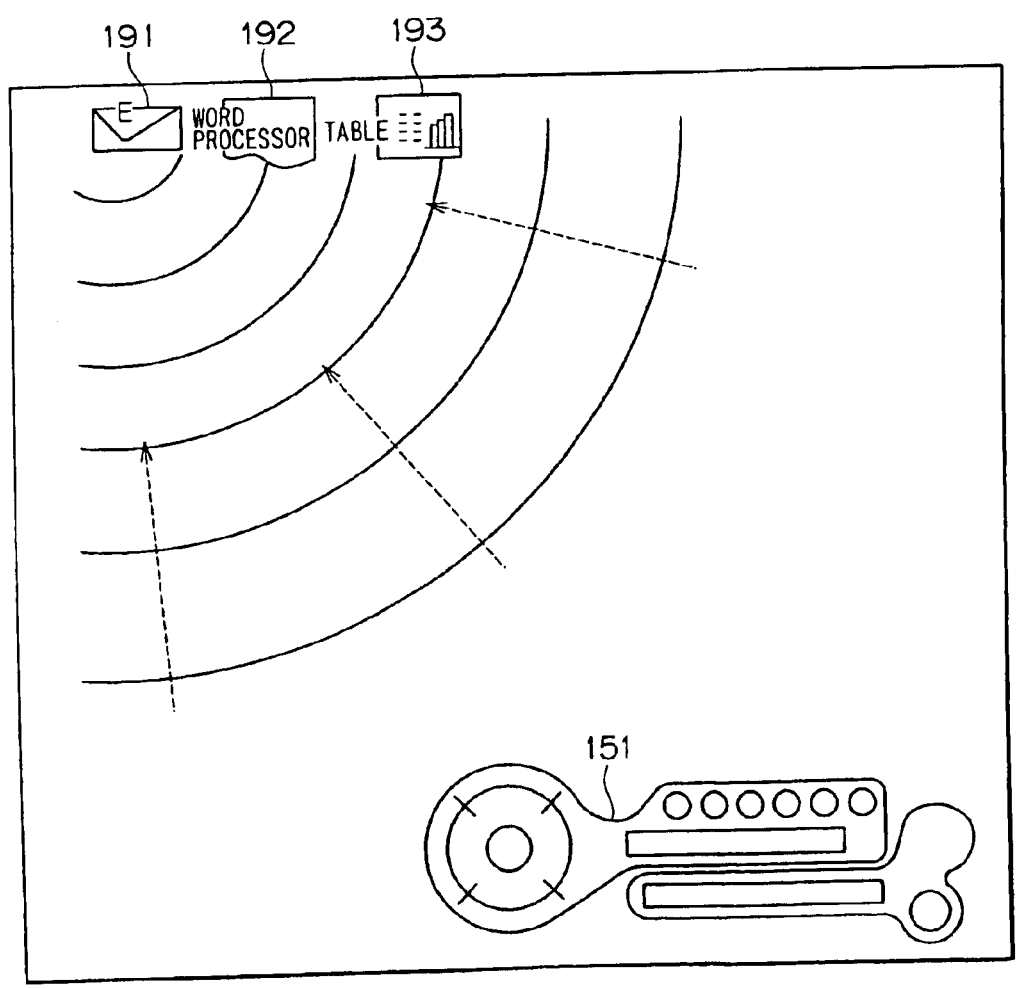
FIG. 24 is a diagram showing a shape like a ripple converging from the entire screen toward an icon of an e-mail program on the LCD panel.

Then, as shown in FIG. 24, the UI processing unit 123 displays a picture with a shape like a ripple converging from the entire screen toward an icon 191 representing the e-mail program 54A as indicated by dotted-line arrows on the LCD panel 21. It should be noted that the dotted-line arrows are shown in FIG. 24 for explanation purposes only and not actually displayed on the screen.

Figure 25:
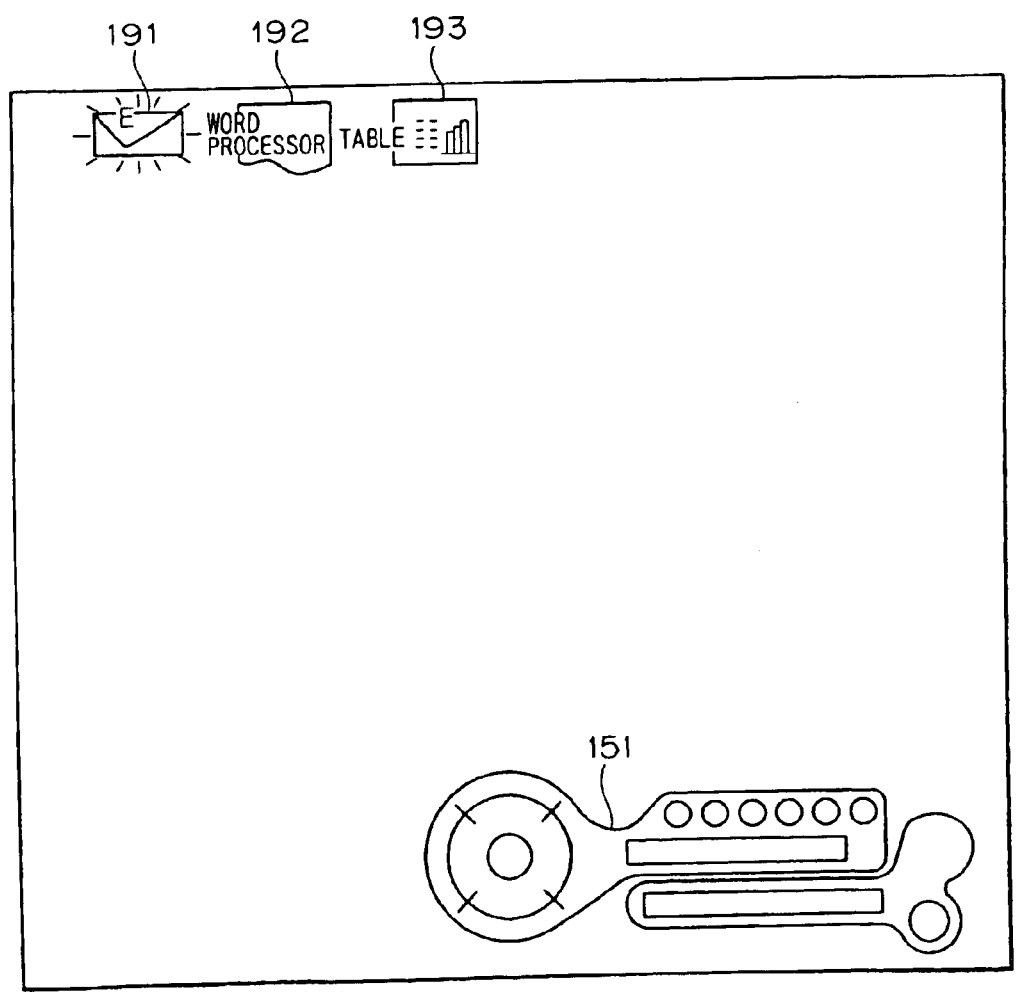
FIG. 25 is a diagram showing an emphasized icon of the e-mail program on the LCD panel.

Then, the UI processing unit 123 emphasizes the display of the icon 191 representing the e-mail program 54A as shown in FIG. 25. If the e-mail program 54A has not been activated, an application communication unit 12 of the voice commander 102 requests the still-picture viewing program 104 to activate the e-mail program 54A.

Figure 26:
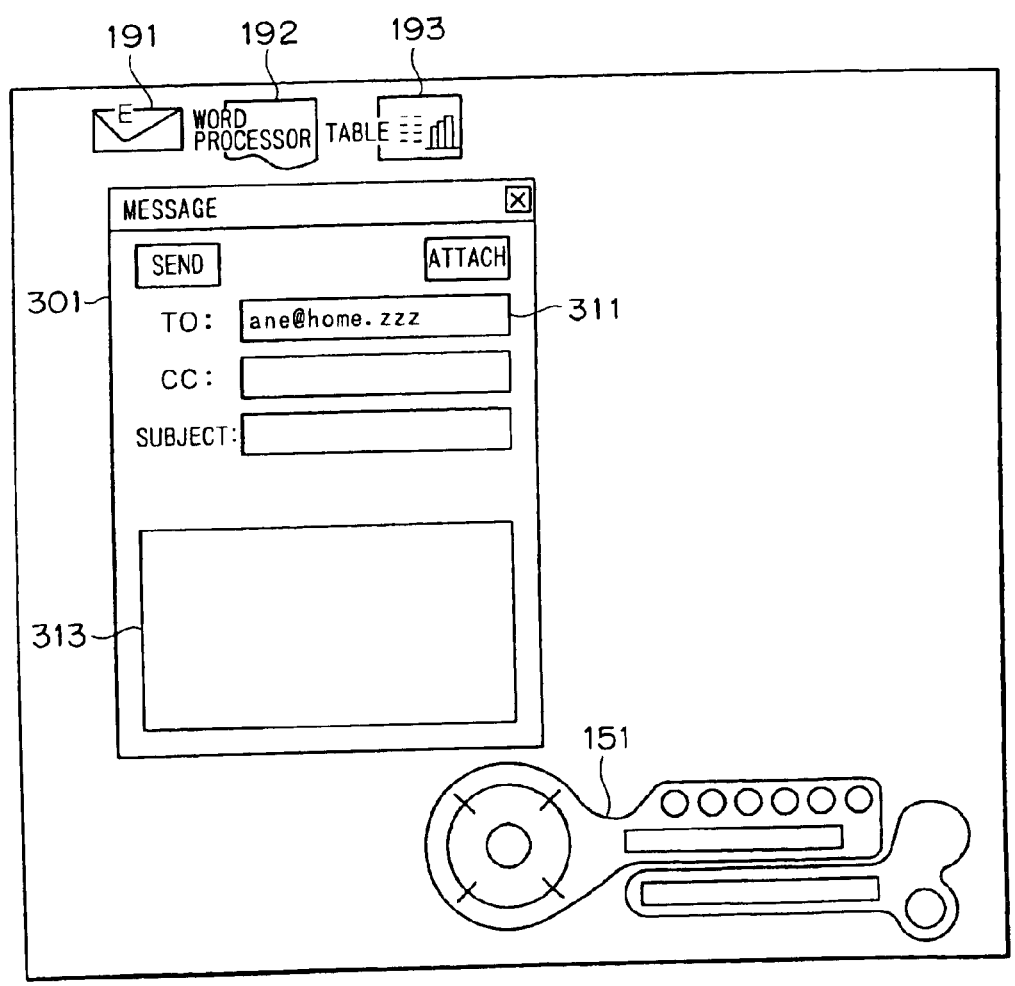
FIG. 26 is a diagram showing a new message on the message window on the LCD panel by the e-mail program.

Later on, as shown in FIG. 26, the voice launcher control unit 124 requests the e-mail program 54A to generate a new message. The e-mail program 54A displays the new message on the message window 301. The voice launcher control unit 124 requests the e-mail program 54A to set a mail address for the new mail. The mail address corresponds to the word "neesan" of the phrase "Mail for neesan" which has been supplied by the voice recognition engine 101 by way of the engine communication unit 122.

In a destination field 311 of the message window. 301 for displaying the new message, the mail address corresponding to the word "neesan" of the phrase "Mail for neesan" is displayed. An example of such a mail address is "ane@home.zzz".

Figure 27:
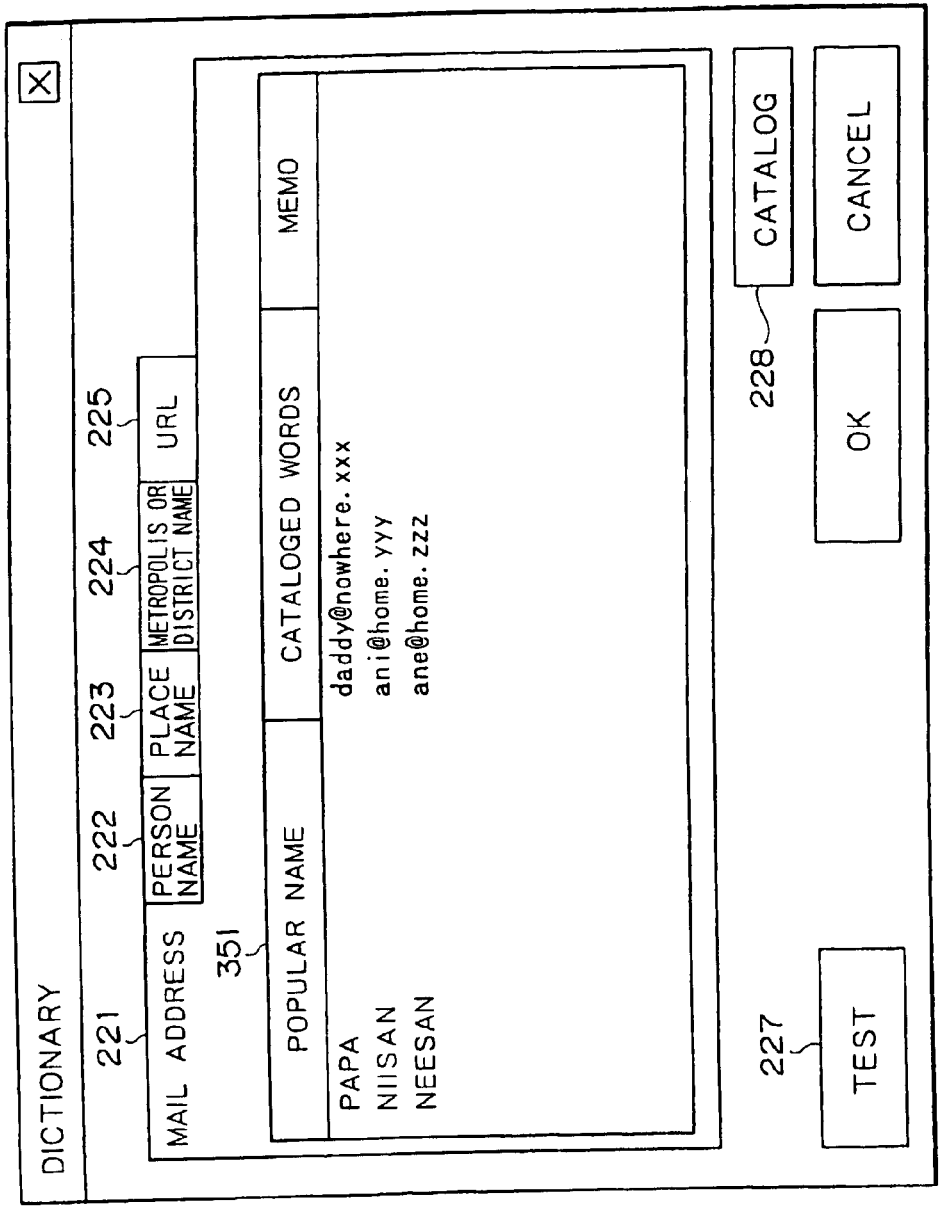
FIG. 27 is a diagram showing a typical dictionary management dialog on the LCD panel.

FIG. 27 is a diagram showing a typical dictionary management dialog which is displayed when a tab 221 of the dictionary management dialog is clicked. As shown in the figure, the tab 221 is named "Mail Address". In a popular-name display field 351, popular names and cataloged words associated with the popular names are displayed. Stored in the launcher setting data base 113, the popular names and the cataloged words pertain to a mail-address category. Each of the cataloged words is a text which is set as a mail address when recognition of a voice is successful. For example, the cataloged word associated with a popular name of "Papa" is "daddy@nowhere.xxx". When a voice is recognized to be "Niisan", a cataloged word set as a mail address is "ani@home.yyy". The cataloged word associated with a popular name of "Neesan" is "ane@home.zzz".

Figure 28:
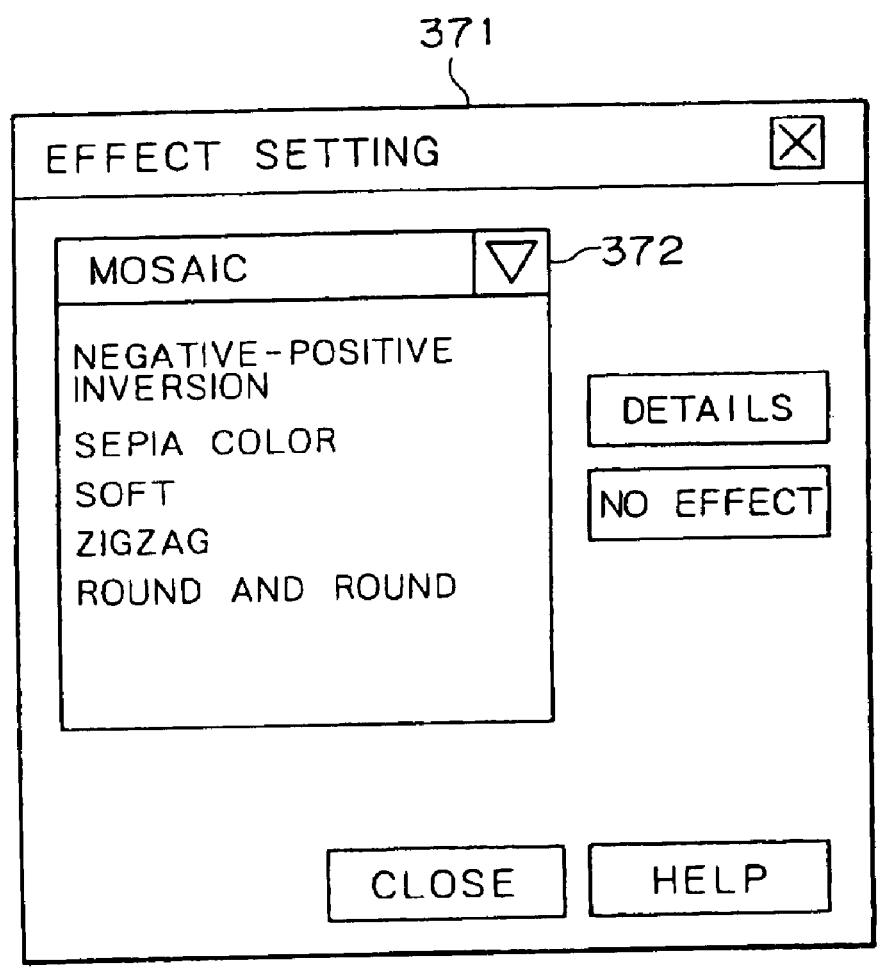
FIG. 28 is a diagram showing an effect setting dialog which is displayed on the LCD panel.

The following description explains a screen which is displayed when the voice commander 102 supplies a predetermined command to the still-picture photographing program 103. If an effect button 196 of a window 194 displayed by the still-picture photographing program 103 is clicked, an effect setting dialog 371 shown in FIG. 28 is displayed on the LCD panel 21.

When an effect is selected from an effect select field 372 of the effect setting dialog 371, the selected effect is applied by the still-picture photographing program 103 to a picture taken by the CCD video camera 23.

When "Mosaic" is selected by using the effect setting dialog 371, for example, the still-picture photographing program 103 applies the so-called mosaic effect to a picture taken by the CCD video camera 23, and displays the picture with the mosaic effect applied thereto in the picture display area 195. If "Negative-positive inversion" is selected by using the effect setting dialog 371, the still-picture photographing program 103 applies the so-called "negative-positive inversion" effect to a picture taken by the CCD video camera 23, and displays the picture with the "negative-positive inversion" effect applied thereto in the picture display area 195.

Figure 29:
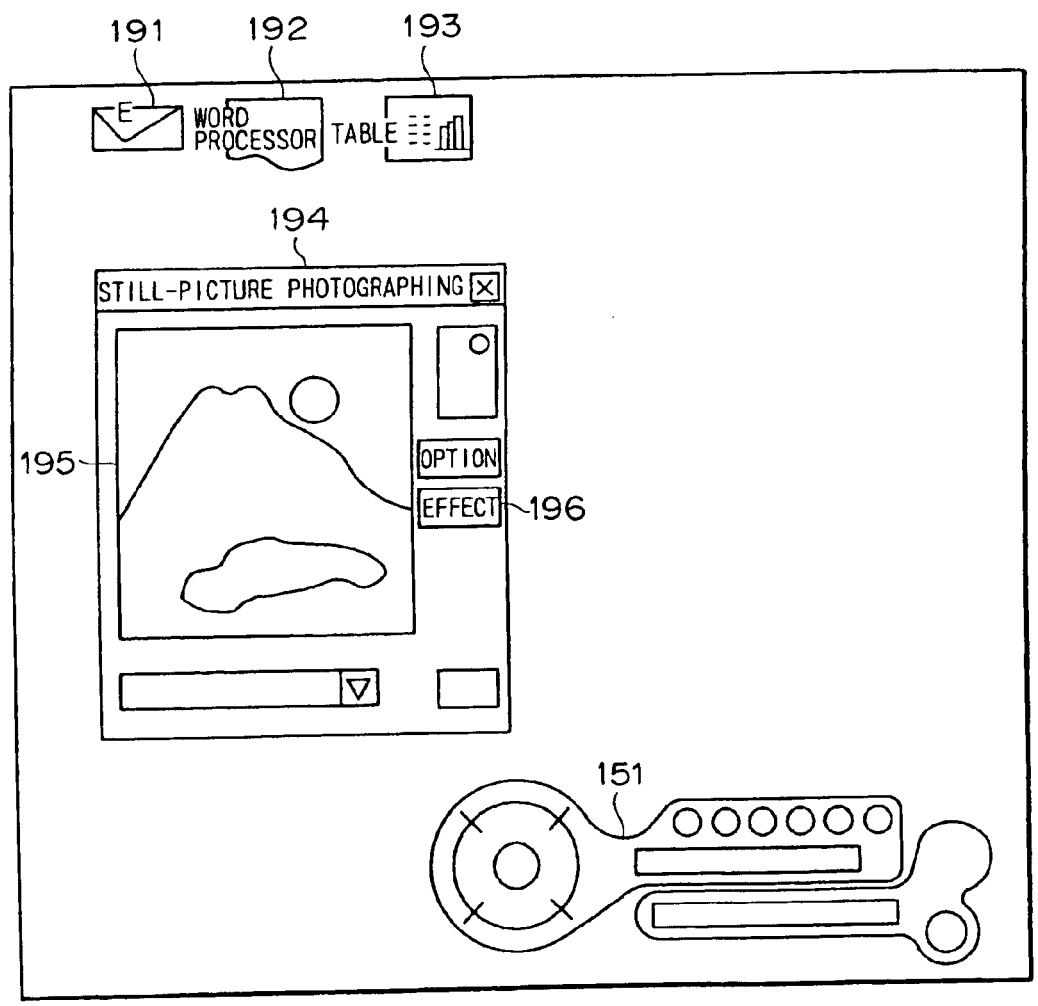
FIG. 29 is a diagram showing a voice-commander window and a window based on the still-picture photographing program on the LCD panel.

Assume that the still-picture photographing program 103 is active, and the voice-commander window 151 as well as a window 194 displayed by the still-picture photographing program 103 appear on the LCD panel 21 as shown in FIG. 29. Let a voice with a pronunciation of "mosaic" be entered to the microphone 24 with the recognition key pressed as it is. In this case, the voice recognition engine 101 supplies data representing a command corresponding to the voice "mosaic" to the voice commander 102.

Figure 30:
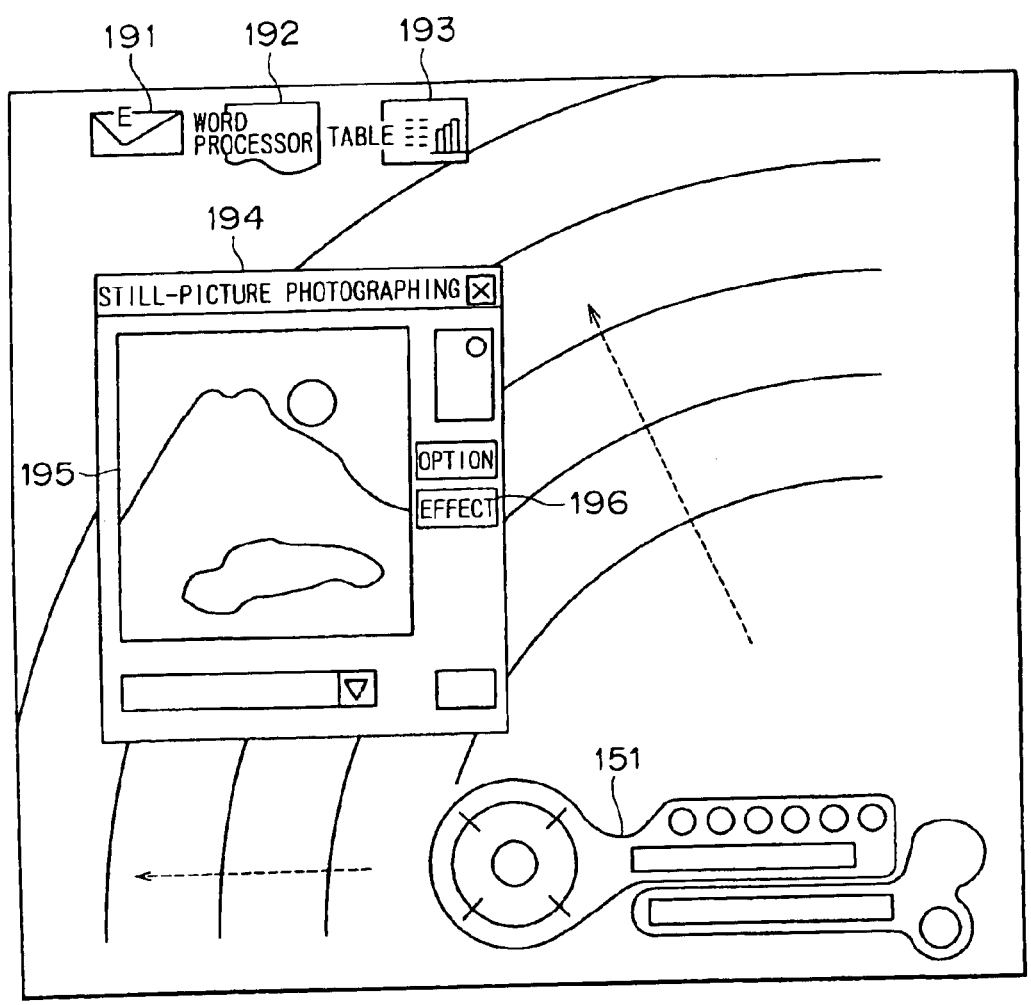
FIG. 30 is a diagram showing a shape like a ripple spreading from the voice-commander window over the entire screen on the LCD panel.

As shown in FIG. 30, the UI processing unit 123 displays a picture with a shape like a ripple spreading from the voice-commander window 151 over the entire screen as indicated by dotted-line arrows on the LCD panel 21. It should be noted that the dotted-line arrows are shown in FIG. 30 for explanation purposes only and not actually displayed on the screen.

Figure 31:
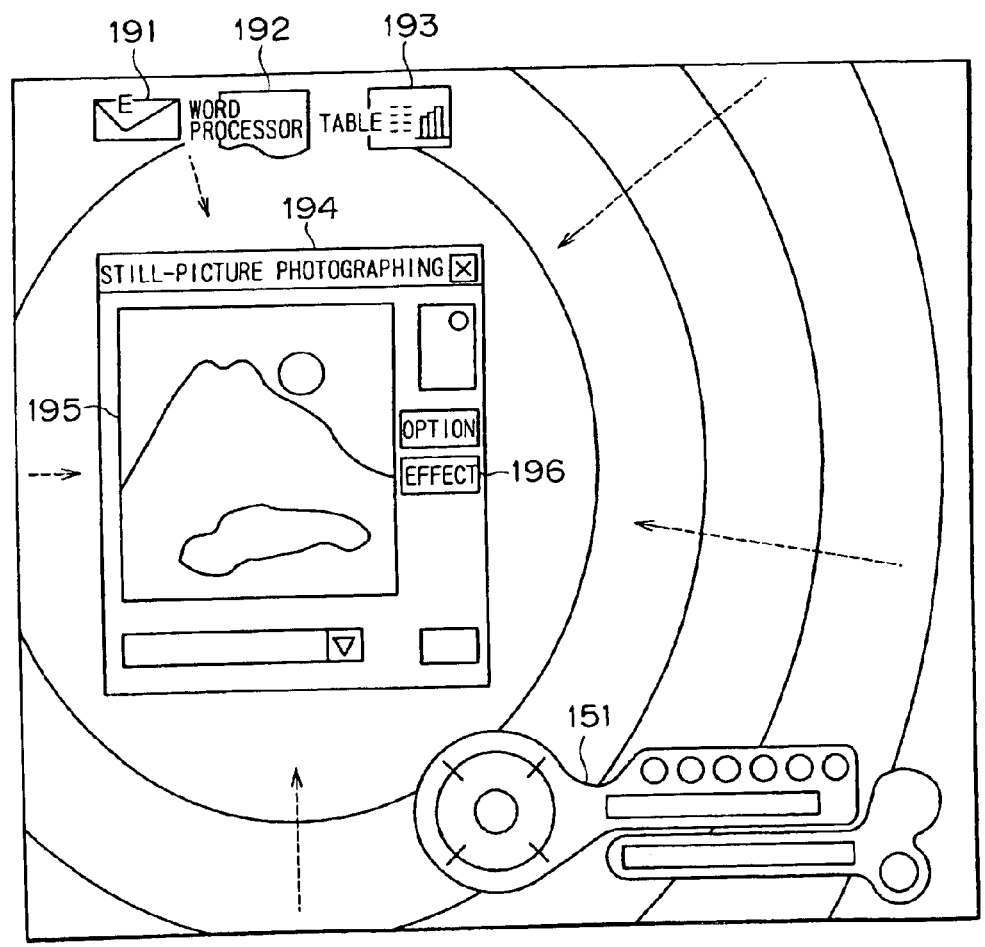
FIG. 31 is a diagram showing a shape like a ripple converging from the entire screen toward the window on the LCD panel.

Then, as shown in FIG. 31, the UI processing unit 123 displays a picture with a shape like a ripple converging from the entire screen toward the window 194 as indicated by dotted-line arrows on the LCD panel 21. It should be noted that the dotted-line arrows are shown in FIG. 31 for explanation purposes only and not actually displayed on the screen.

Figure 32:
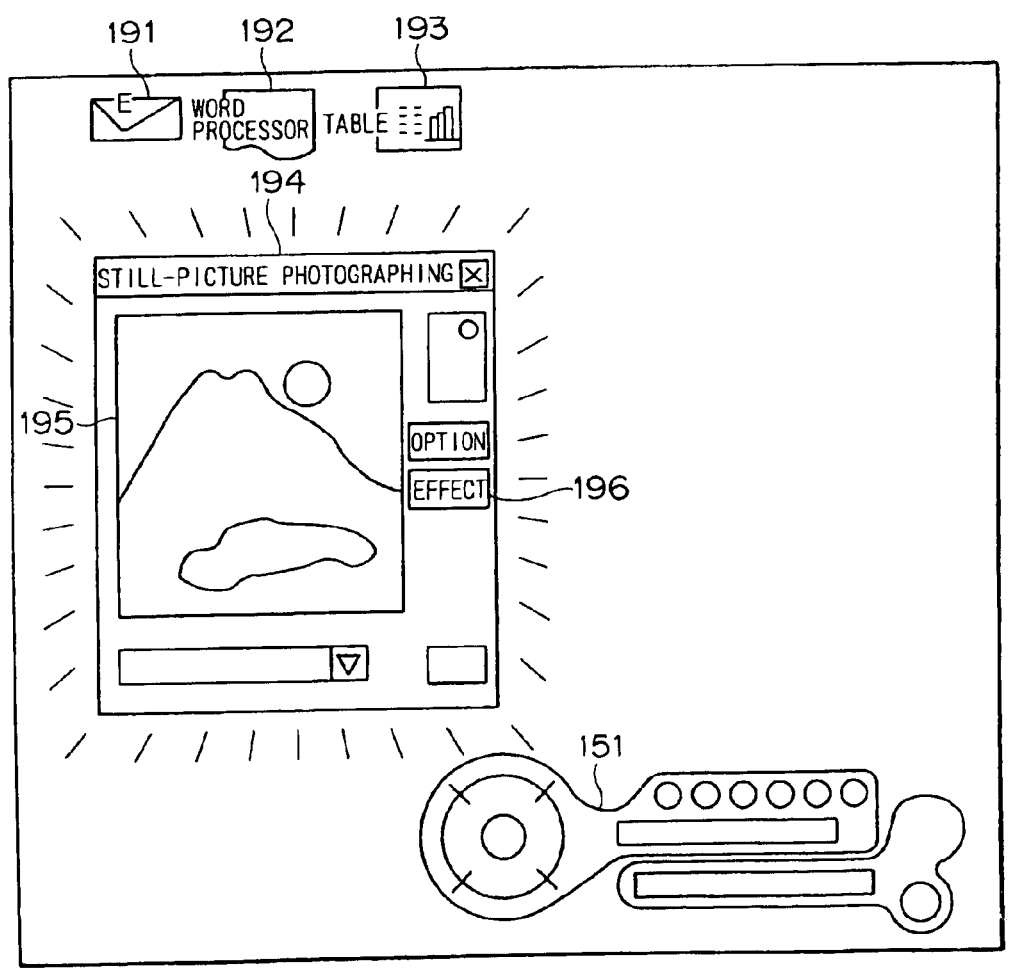
FIG. 32 is a diagram showing an emphasized window on the LCD panel.

Then, the UI processing unit 123 emphasizes the window 194 displayed by the still-picture photographing program 103 as shown in FIG. 32.

Figure 33:
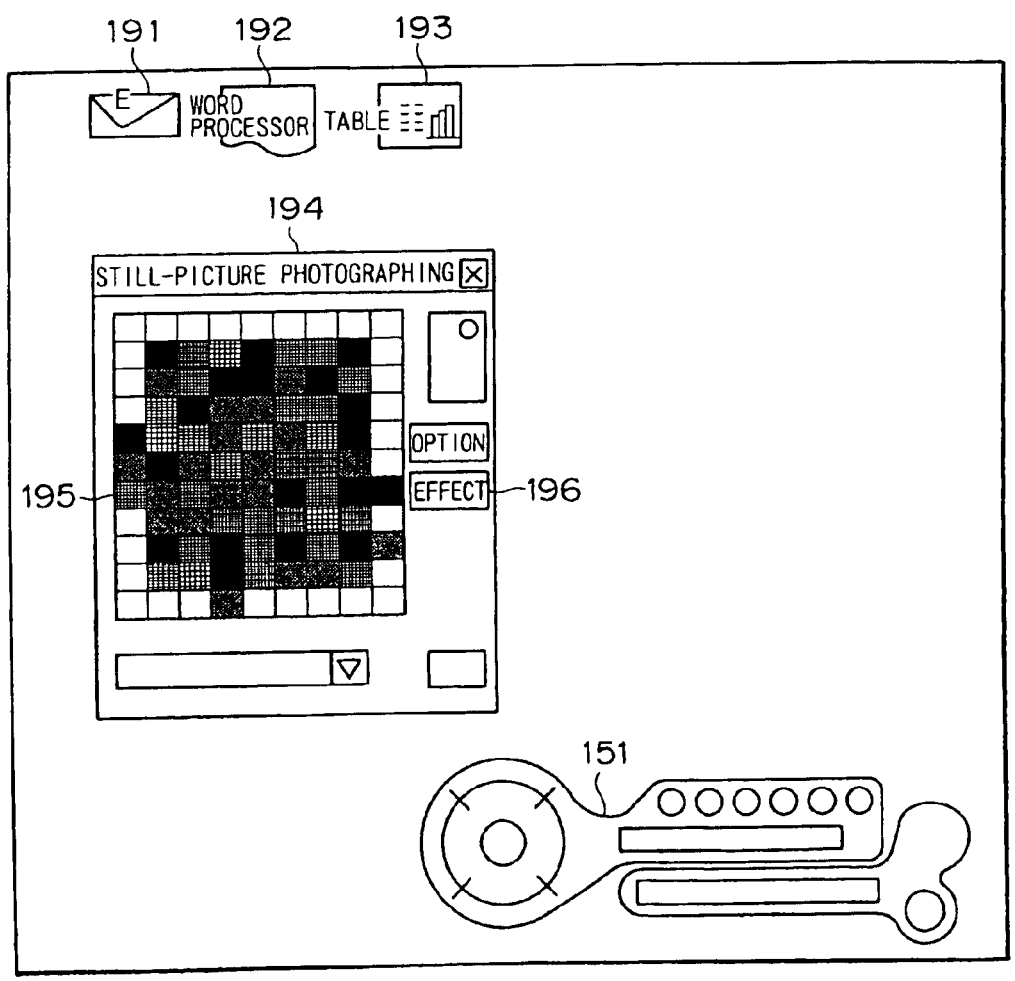
FIG. 33 is a diagram showing a picture with a mosaic effect applied in a picture display area displayed on the LCD panel.

The voice commander 102 supplies a command corresponding to "mosaic" to the still-picture photographing program 103 in accordance with the data for the command corresponding to "mosaic". Receiving the command corresponding to "mosaic", the still-picture photographing program 103 applies the so-called mosaic effect to a picture taken by the CCD video camera 23 and displays the picture with the mosaic effect applied thereto on the picture display area 195 as shown in FIG. 33.

Figure 34:
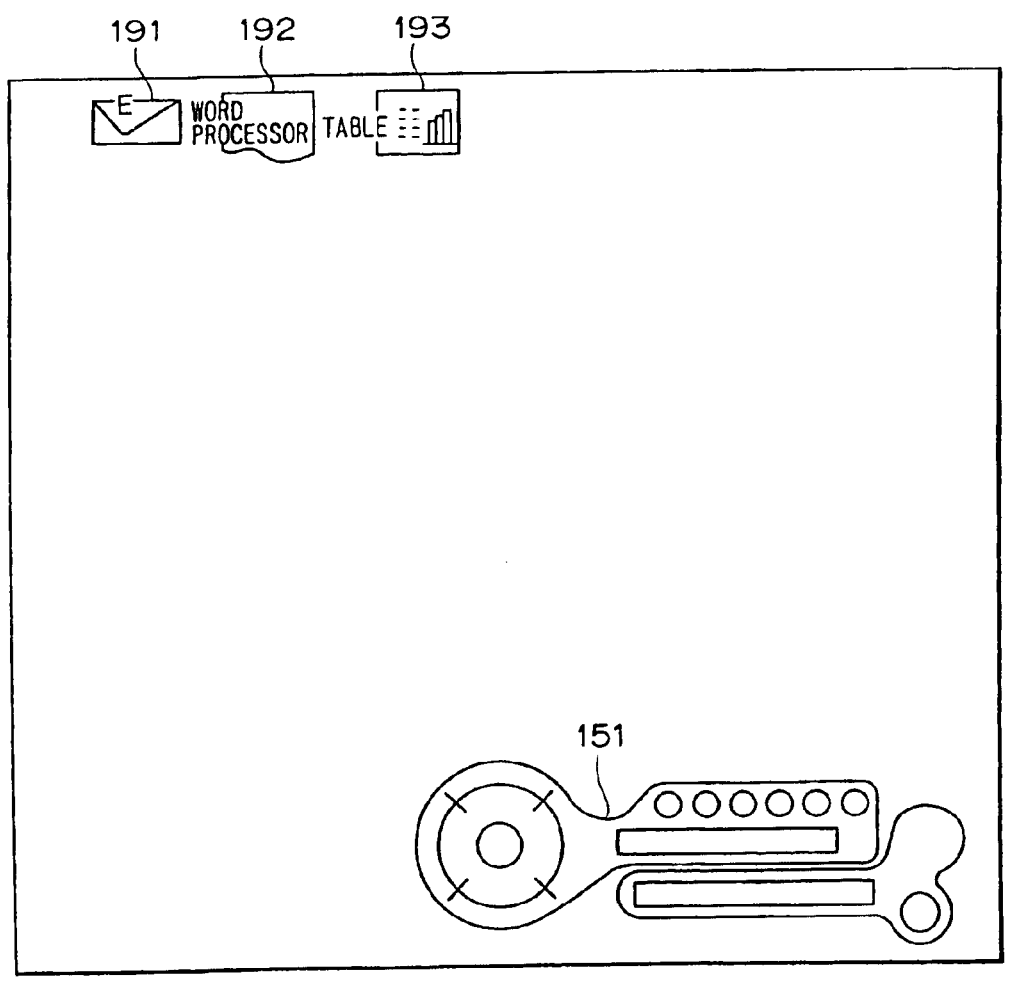
FIG. 34 is a diagram showing the voice-commander window on the LCD panel.

The following description explains processing carried out by the voice commander 102 to activate the word-processor program 106. Assume that the voice commander 102 has been activated, and a voice with a pronunciation of "word processor" is entered to the microphone 24 with the recognition key pressed as it is as shown in FIG. 34. In this case, the voice recognition engine 101 supplies data representing a command corresponding to the voice "word processor" to the voice commander 102.

As shown in FIG. 35, the UI processing unit 123 displays a picture with a shape like a ripple spreading from the voice-commander window 151 over the entire screen as indicated by dotted-line arrows on the LCD panel 21. It should be noted that the dotted-line arrows are shown in FIG. 35 for explanation purposes only and not actually displayed on the screen.

Figure 36:
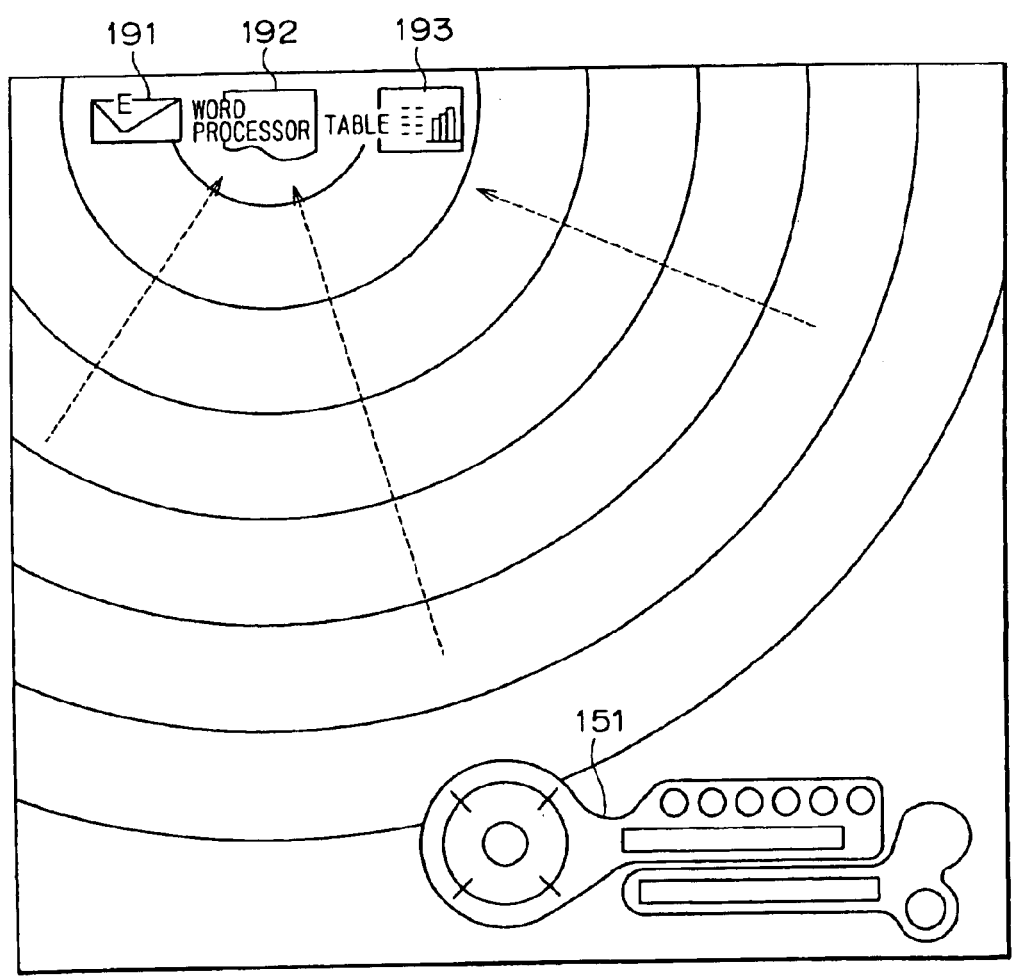
FIG. 36 is a diagram showing a shape like a ripple converging from the entire screen toward an icon of a word-processor program on the LCD panel.

Then, as shown in FIG. 36, the UI processing unit 123 displays a picture with a shape like a ripple converging from the entire screen toward an icon 192 representing the word-processor program 106 as; indicated by dotted-line arrows on the LCD panel 21. It should be noted that the dotted-line arrows are shown in FIG. 36 for explanation purposes only and not actually displayed on the screen.

Figure 37:
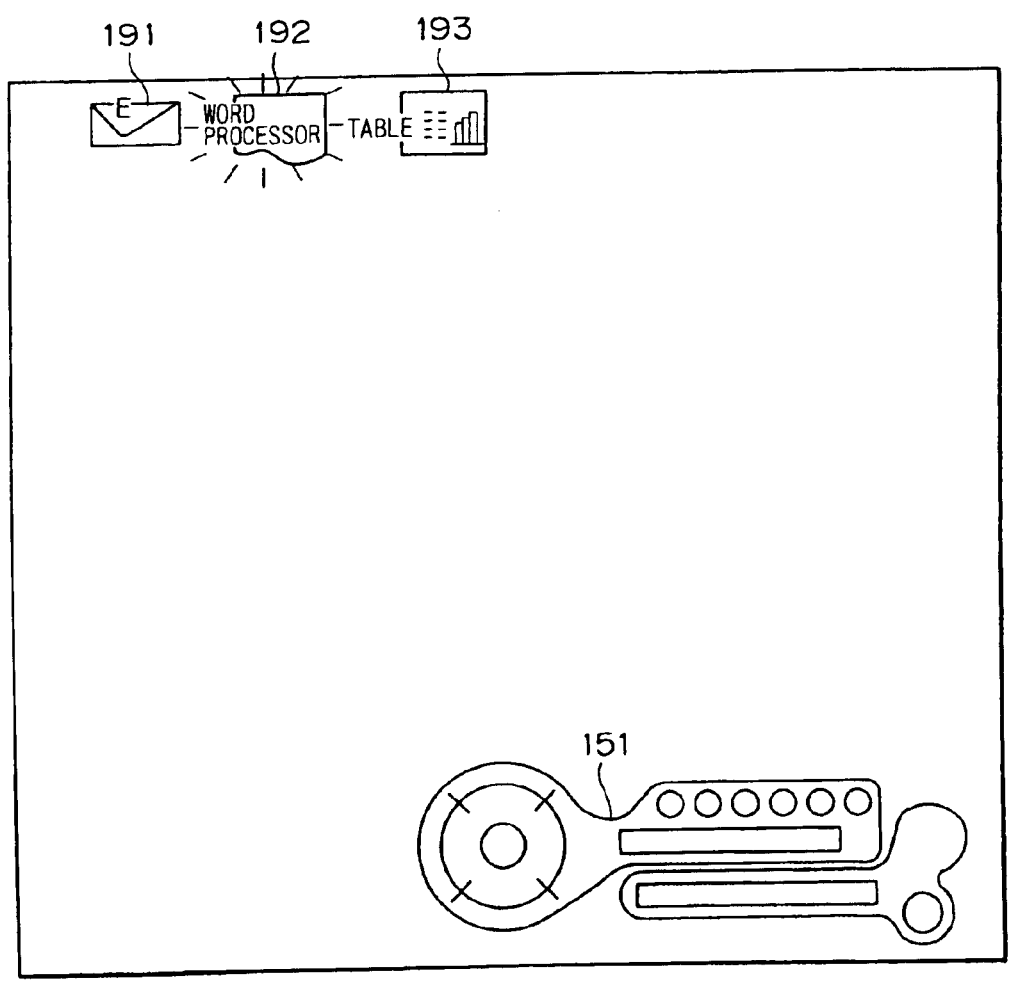
FIG. 37 is a diagram showing an emphasized icon of the word-processor program on the LCD panel.
Figure 38:
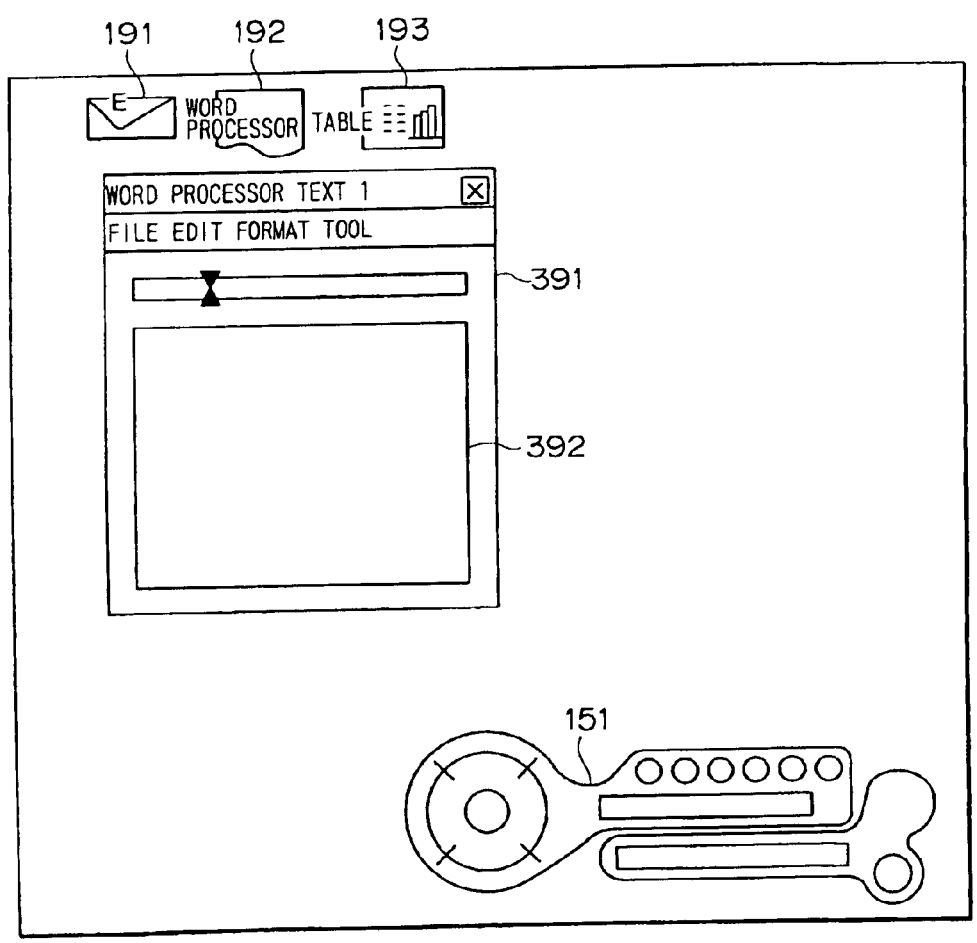
FIG. 38 is a diagram showing a window for displaying a text file, which is displayed on the LCD panel.

Then, the UI processing unit 123 emphasizes the icon 192 representing the word-processor program 106 as shown in FIG. 37.

The voice launcher control unit 124 of the voice commander 102 activates the word-processor program 106 which displays a predetermined window 391 on the LCD panel 21. The window 391 displayed by the word-processor program 106 includes a display area 392 for displaying a text file.

When the voice launcher control unit 124 of the voice commander 102 activates the word-processor program 106 in response to a voice with a pronunciation of "word processor" entered to the microphone 24, the voice launcher control unit 124 activates the word-processor program 106 only. At that time, the word-processor program 106 generates a new text and displays the new text in the display area 392.

Figure 39:
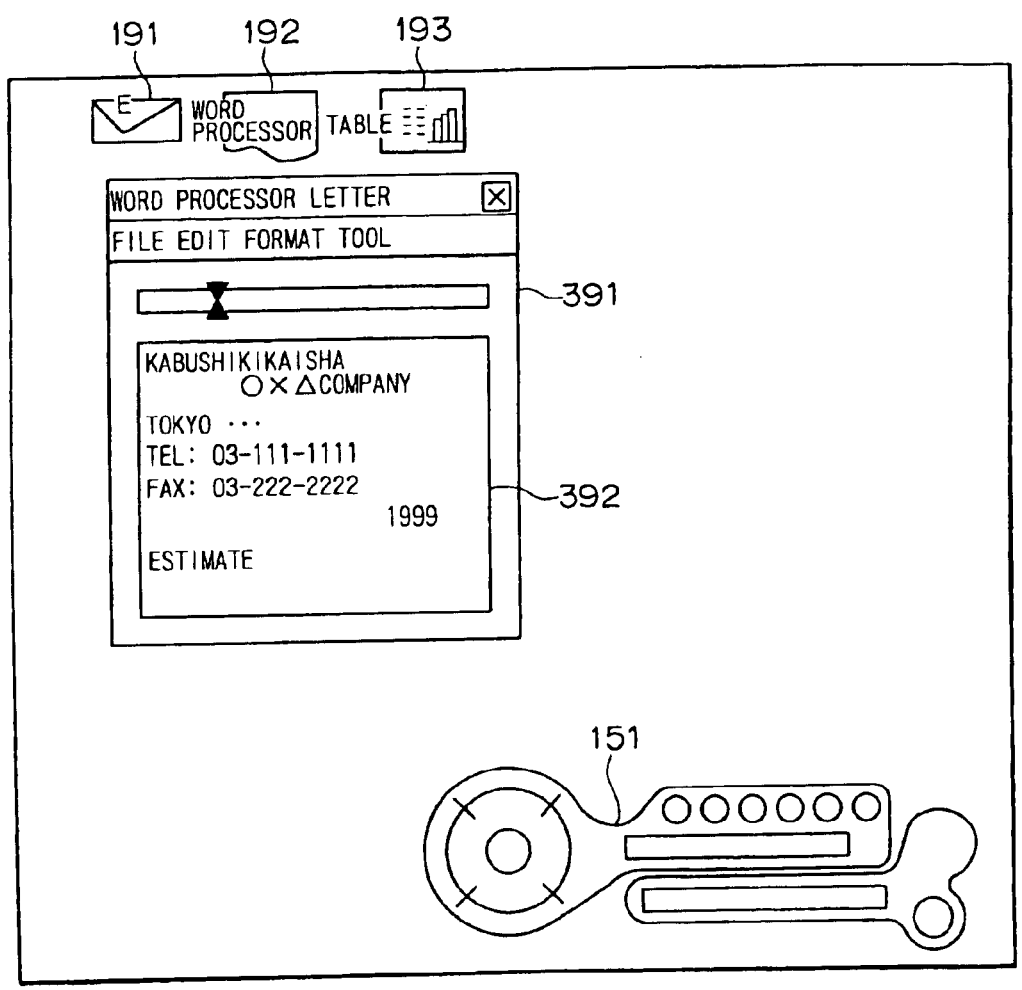
FIG. 39 is a diagram showing a window for displaying a text file corresponding to "letter", which is displayed on the LCD panel.

When the voice launcher control unit 124 of the voice commander 102 activates the word-processor program 106 in response to a voice with a pronunciation of "write a letter using the word processor" entered to the microphone 24, the voice launcher control unit 124 requests the word-processor program 106 to open a text file corresponding to "letter". At that time, the word-processor program 106 displays characters or a picture for the text file corresponding to "letter" in the display area 392 as shown in FIG. 39.

Figure 40:
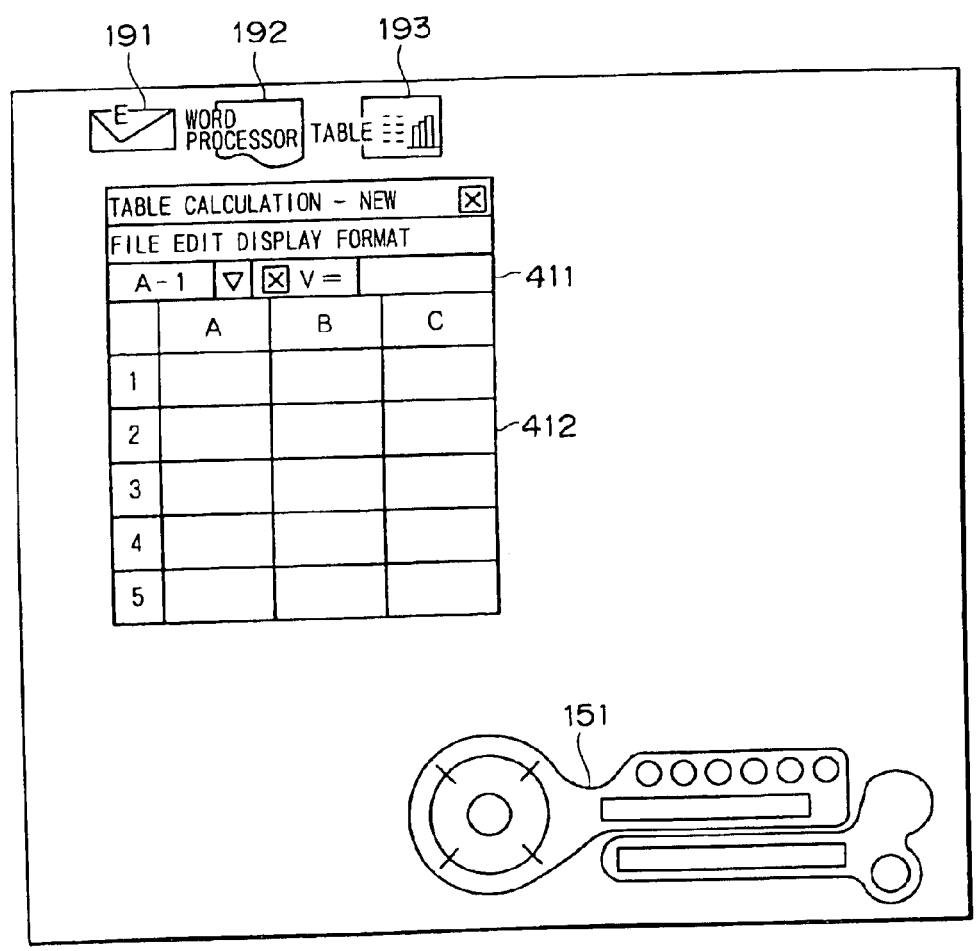
FIG. 40 is a diagram showing a window for displaying a new text of table-calculation program, which is displayed on the LCD panel.

By the same token, when the voice launcher control unit 124 of the voice commander 102 activates the word-processor program 106 in response to a voice with a pronunciation of "table calculation" entered to the microphone 24, the voice launcher control unit 124 activates the table-calculation program 107 only. Also when the voice launcher control unit 124 activates the table-calculation program 107, the UI processing unit 123 displays a predetermined picture having the shape like a ripple and emphasizes the display of an icon 193. As shown in FIG. 40, the table-calculation program 107 generates a new text and displays the new text in a display area 412 of a window 411 displayed by the table-calculation program 107.

Figure 41:
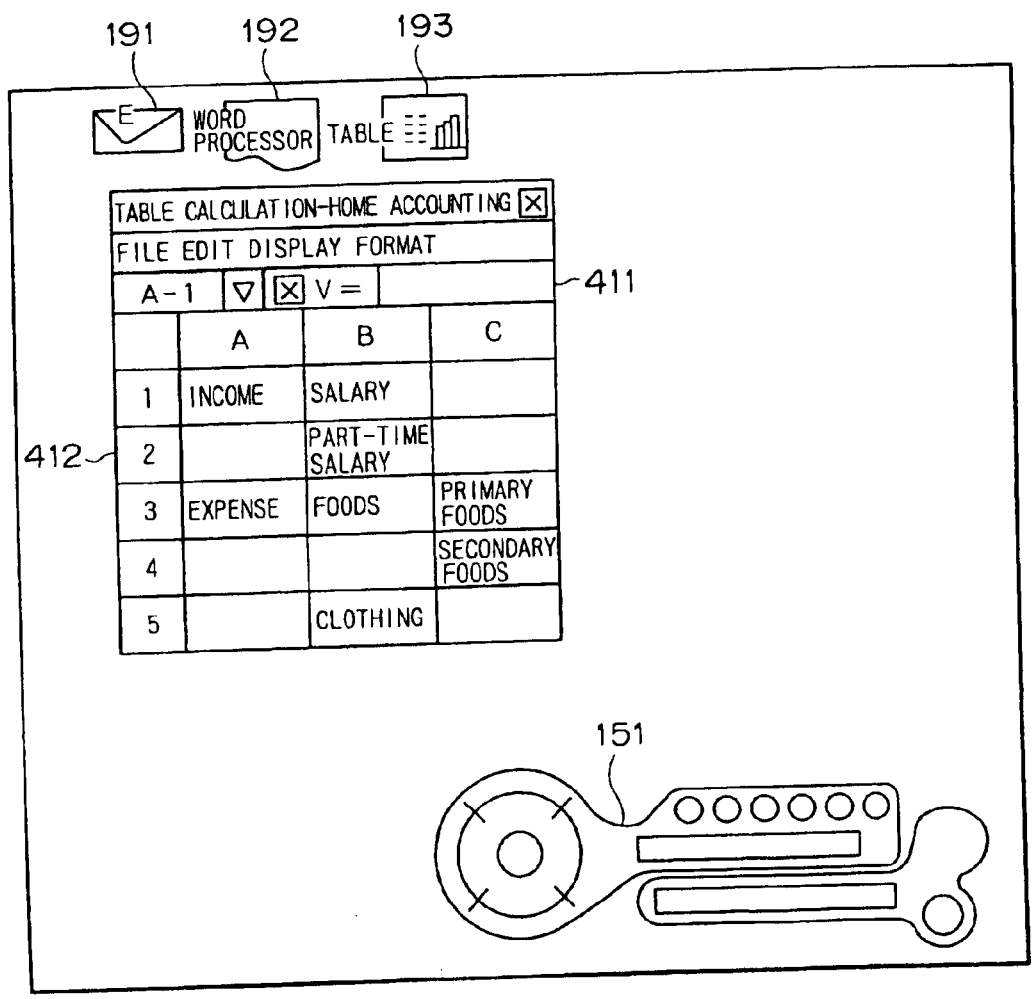
FIG. 41 is a diagram showing a window for displaying a text file corresponding to "home-accounting", which is displayed on the LCD panel.

When the voice launcher control unit 124 of the voice commander 102 activates the table-calculation program 107 in response to a voice with a pronunciation of "home accounting using the table calculation" entered to the microphone 24, the voice launcher control unit 124 requests the table-calculation program 107 to open a text file corresponding to "home accounting". At that time, the table-calculation program 107 displays characters or a picture for the text file corresponding to "home accounting" in a display area 412 as shown in FIG. 41.

Figure 42:
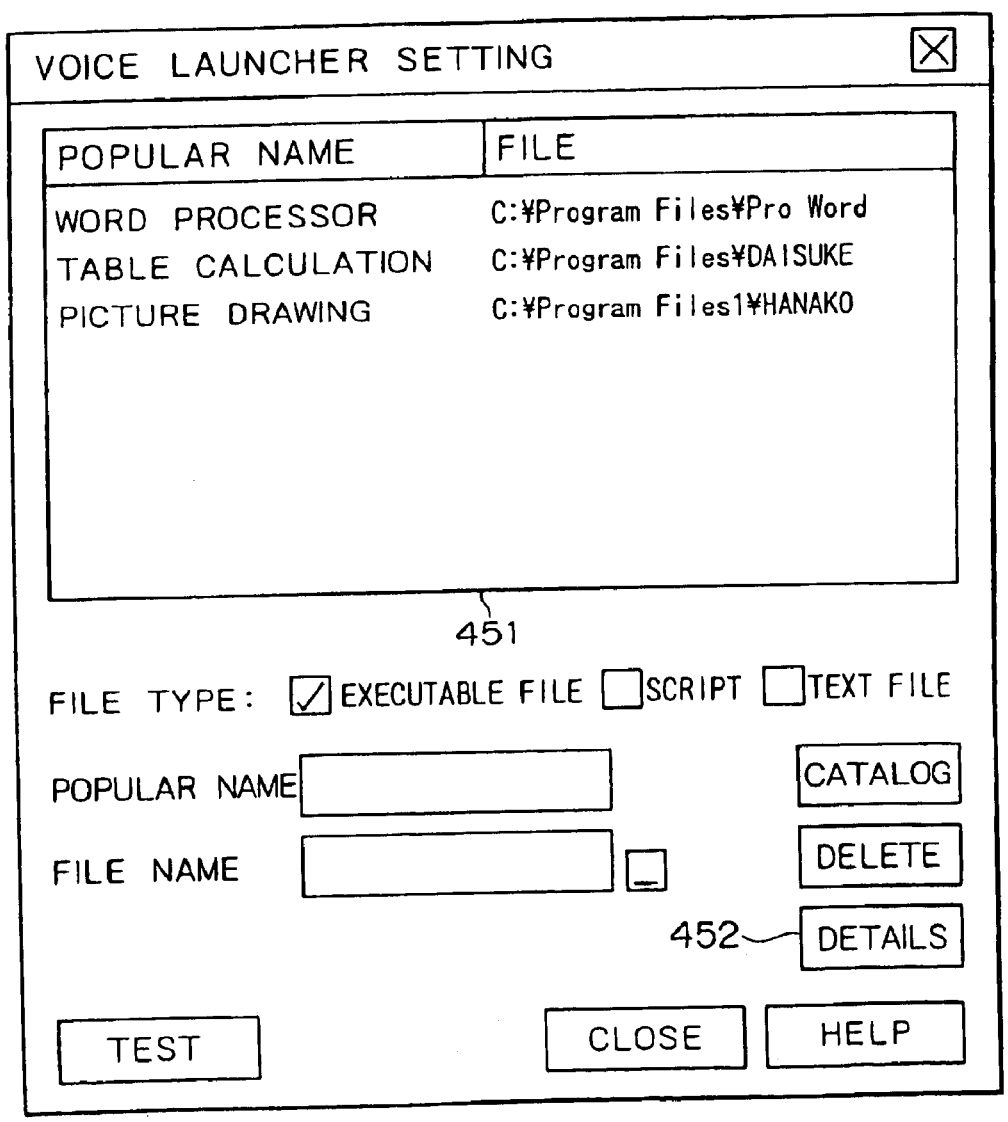
FIG. 42 is a diagram showing a launcher setting dialog which is displayed on the LCD panel.

The following description explains a dialog for cataloging a word for a program to be activated. FIG. 42 is a diagram showing a launcher setting dialog which is displayed by a voice launcher control unit 124 on the LCD panel 21 when a launcher setting button 164 appearing on the voice-commander window 151 is clicked.

If a check box named "Executable File" is checked, the launcher setting dialog displays popular names and the names of executable files associated with the popular names in a popular-name display field 451. The names of the files may include directories. The popular names and the names of the executable files are stored in the launcher setting data base 113. The executable files represented by the names displayed in the popular-name display field 451 pertain to an executable-file category.

For example, the name of an executable file associated with a popular name of "Word processor" is "C:¥ProgramFiles¥ProWord" and the name of an executable file associated with a popular name of "Table calculation" is "C:¥ProgramFiles¥Daisuke". The name of an executable file associated with a popular name of "Picture drawing" is "C:¥ProgramFiles1¥Hanako".

As shown in FIG. 42, the launcher setting dialog has a button named "Test" and a button 452 named "Details".

Figure 43:
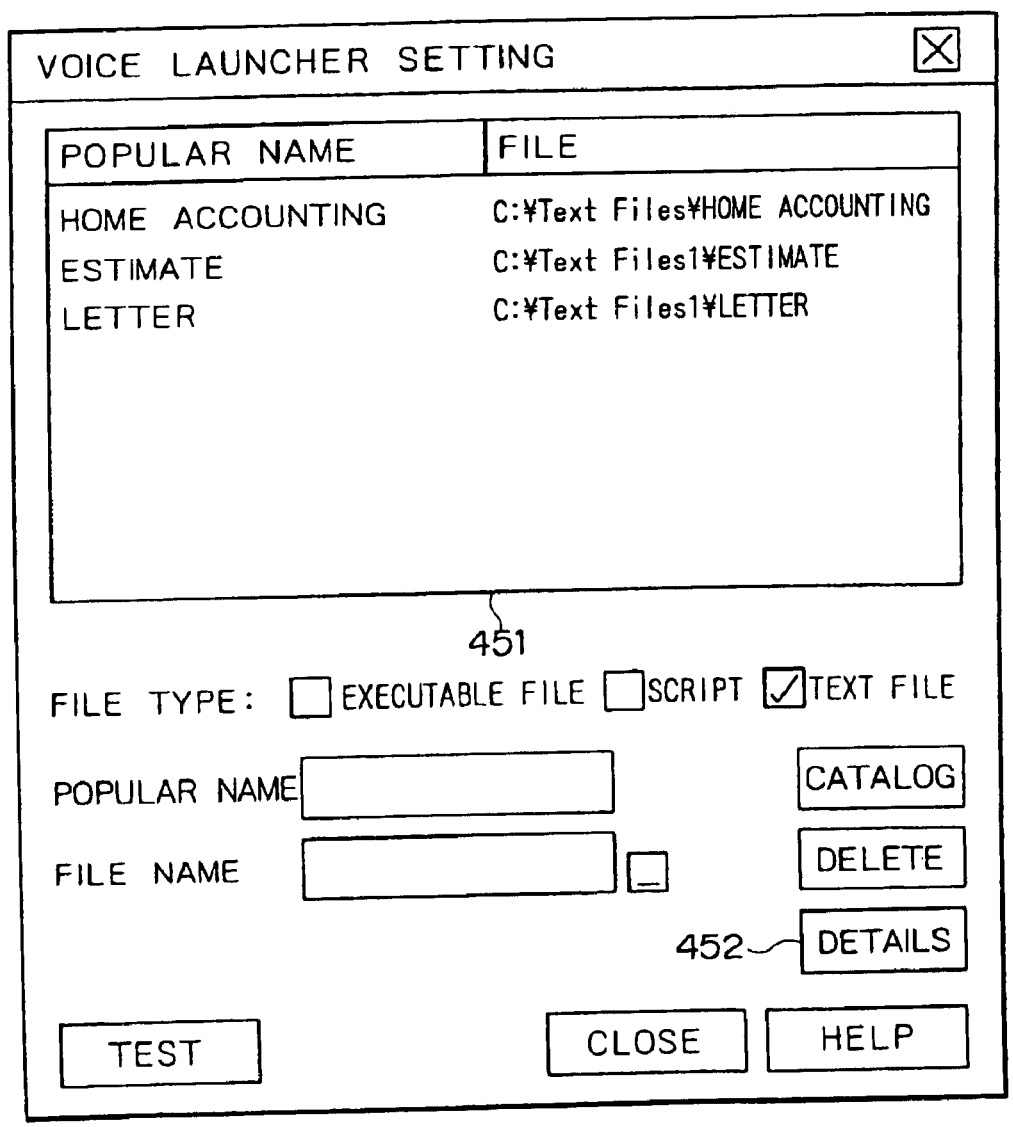
FIG. 43 is a diagram showing the launcher setting dialog shown in FIG. 42, in which another check box is checked.

If a check box named "Text File" is checked, the launcher setting dialog displays popular names and the names of text files associated with the popular names in a popular-name display field 451 as shown in FIG. 43. The names of the files may include directories. The popular names and the names of the text files are stored in the launcher setting data base 113. For example, the name of a text file associated with a popular name of "Home Accounting" is "C:¥TextFiles¥HomeAccounting" and the name of a text file associated with a popular name of "Estimate" is "C:¥TextFiles¥Estimate". The name of a text file associated with a popular name of "Letter" is "C:¥TextFiles1¥Letter".

The executable files represented by the names displayed in the popular-name display field 451 pertain to a text-file category.

Figure 44:
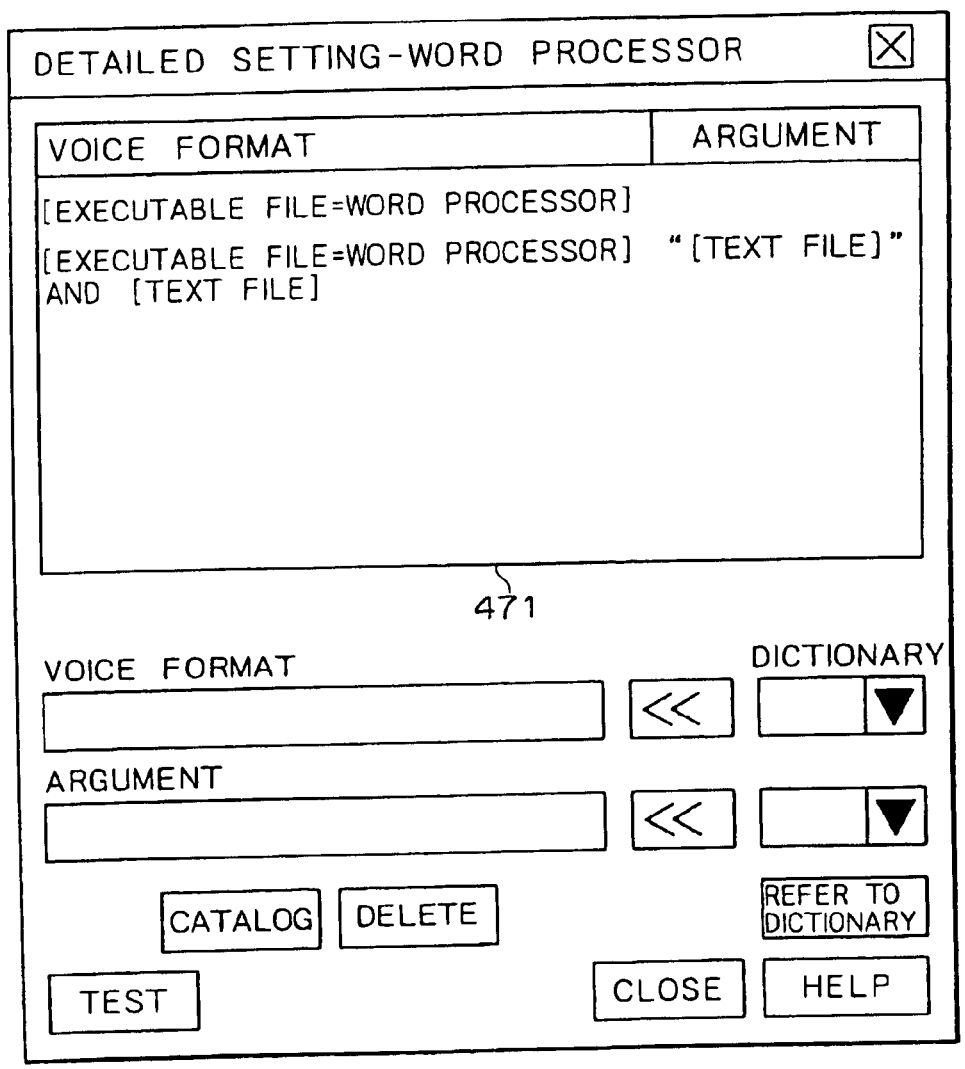
FIG. 44 is a diagram showing a launcher-detail setting dialog on the LCD panel.

If a popular name such as "Word processor" and the name of an executable file associated with this popular name which are displayed in the popular-name display field 451 are selected and a button 452 named "Details" is clicked, the voice launcher control unit 124 displays a launcher-detail setting dialog shown in FIG. 44 on the LCD panel 21.

As shown in the figure, the launcher-detail setting dialog displays a voice form of [Executable file=Word processor] corresponding to a popular name selected from the popular-name display field 451 on a popular-name display field 471. In this example, the selected popular name is "Word processor". By operating a button named "Refer to dictionary" on the launcher-detail setting dialog, the user is capable of defining a voice format combining an executable file and a text file as, for example, "[Executable file=Word processor] and [Text file]".

The voice launcher control unit 124 assigns a grammar number to the set voice format and stores the voice format in the launcher setting data base 113.

The combination of an executable file and a text file set by the user as a voice format is displayed in the popular-name display field 471. In the combination of a file pertaining to the executable-file category and a file pertaining to the text-file category set as "[Executable file=Word processor] and [Text file]" as shown in FIG. 44, [Text file] is used as an argument. Assume that the voice launcher control unit 124 is provided with data indicating that a voice corresponding to "[Executable file=Word processor] and [Text file]" has been recognized. An example of the data is "Write a letter using the word processor" and a grammar number. In this case, the voice launcher control unit 124 opens an executable file such as C:¥ProgramFiles¥ProWord pertaining to the executable-file category corresponding to a popular name of "Word processor" in accordance with the grammar number. That is to say, the voice launcher control unit 124 activates the word-processor program 106 and then requests the word-processor program 106 to open the set text file such as C:¥TextFiles1¥Letter corresponding to "Letter" which pertains to the text-file category.

By the same token, assume that the data supplied to the voice launcher control unit 124 to indicate that a voice corresponding to "[Executable file=Word processor] and [Text file]" has been recognized is "Home calculation using the word processor" and a grammar number. In this case, the voice launcher control unit 124 opens an executable file such as C:¥ProgramFiles¥ProWord pertaining to the executable-file category corresponding to a popular name of "Word processor" in accordance with the grammar number. The voice launcher control unit 124 requests the word-processor program 106 to open the set text file such as C:¥TextFiles¥HomeAccounting which is a text file pertaining to the text-file category.

It should be noted that the voice launcher control unit 124 may request a predetermined script execution program shown in none of the figures to execute a predetermined script file, that is, a file describing a processing procedure comprising commands and the like. In addition, data such as a mail address or a picture may also be specified as an argument of the script file. At that time, information including data for identifying the script file or identifying an argument of the script file or a grammar number is stored in the launcher setting data base 113.

Figure 45:
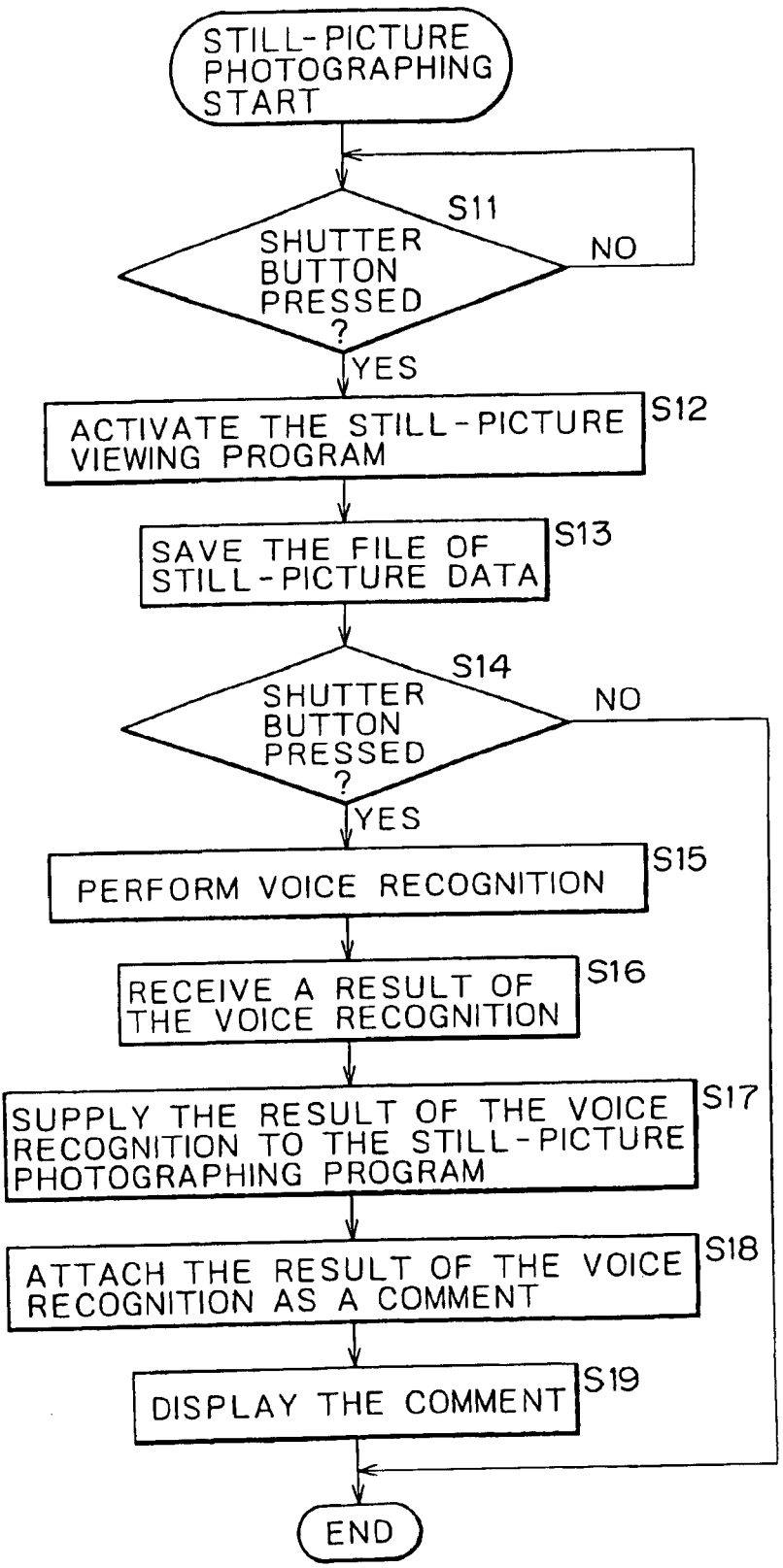
FIG. 45 shows a flowchart used for explaining processing to image-sense a still picture.

The following description explains processing to image-sense a still picture which is carried out by the voice recognition engine 101, the voice commander 102 and the CPU 52 for executing the still-picture photographing program 103 with reference to a flowchart shown in FIG. 45. As shown in the figure, the flowchart begins with a step S11 at which the still-picture photographing program 103 forms a judgment as to whether or not the shutter button 10 has been pressed. The formation of the judgment is based on a signal supplied by the complete-push switch 86 pressed earlier by way of the microcontroller 61, the external bus 55 and the internal bus 51. If the outcome of the judgment indicates that the shutter button 10 has not been pressed, the flow of the processing returns to the step S11. The processing to form a judgment is repeated till the shutter button 10 is pressed.

If the outcome of the judgment formed at the step S11 indicates that the shutter button 10 has been pressed, on the other hand, the flow of the processing goes on to a step S12 at which the still-picture photographing program 103 activates the still-picture viewing program 104. At the next step S13, the still-picture photographing program 103 generates a file of still-picture data conforming to a predetermined system on the basis of a signal supplied by the CCD video camera 23 by way of the processing unit 82 and the graphic chip 81. The generated file of still-picture data is then stored in the HDD 56.

At the next step S14, the still-picture photographing program 103 forms a judgment as to whether or not the shutter button 10 has been pressed. If the outcome of the indicates that the shutter button 10 has been pressed, the flow of the processing goes on to a step S15 at which the voice commander 102 requests the voice recognition engine 101 to carry out processing of voice recognition based on a signal received from the microphone 24. At the next step S16, the voice commander 102 receives results of the voice-recognition processing from the voice recognition engine 101.

At the next step S17, the voice commander 102 passes on the results of the voice-recognition processing to the still-picture photographing program 103. At the next step S18, the voice commander 102 attaches the results of the voice-recognition processing to the still-picture photographing program 103 as a comment of a picture file.

At the next step S19, the voice commander 102 requests the still-picture viewing program 104 to display the comment and then terminates the processing.

If the outcome of the judgment formed at the step S14 indicates that the shutter button 10 has been released, on the other hand, the processing is ended by skipping the steps 15 to 19.

In this way, the user is capable of sticking a comment on a still picture taken by the still-picture photographing program 103 with ease without operating the keyboard 4 and the like.

Figure 46:
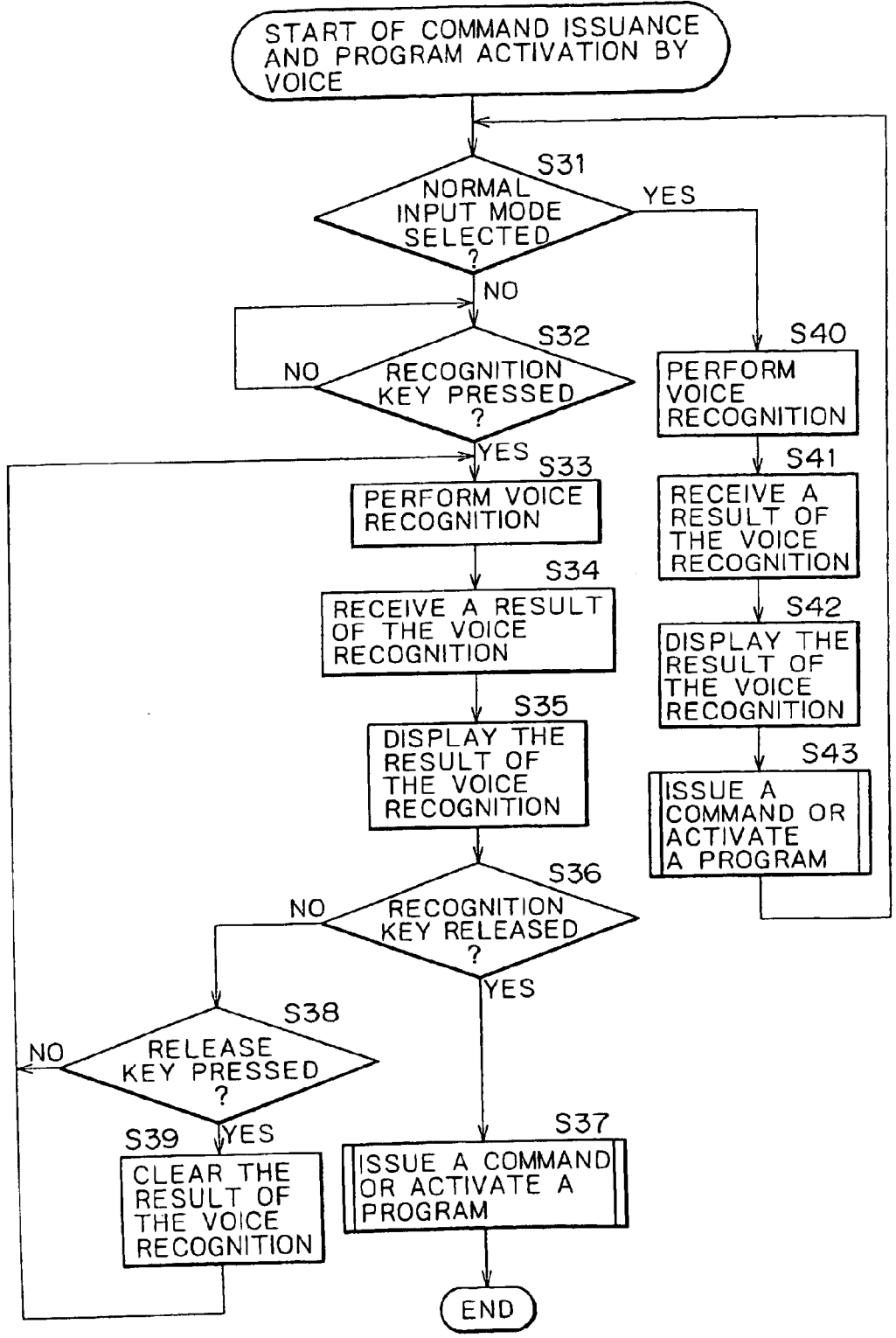
FIG. 46 shows a flowchart used for explaining processing to issue a command or activate a program in accordance with a voice.

The following description explains processing to issue a command or activate a program in accordance with a voice recognized by the voice recognition engine 101 or voice information obtained as a result of execution of the voice commander 102 by the CPU 52 with reference to a flowchart shown in FIG. 46. As shown in the figure, the flowchart begins with a step S31 at which the voice commander 102 forms a judgment as to whether or not a normal input mode has been selected. If the outcome of the judgment indicates that the normal input mode has not been selected, the flow of the processing goes on to a step S32 to form a judgment as to whether or not the recognition key has been pressed.

If the outcome of the judgment formed at the step S32 indicates that the recognition key has not been pressed, the flow of the processing goes back to the step S32. The processing to form a judgment carried out at the step S32 is repeated by the voice commander 102 till the recognition key 10 is pressed.

As the outcome of the judgment formed at the step S32 indicates that the recognition key has been pressed, the flow of the processing goes on to a step S33 at which the voice commander 102 requests the voice recognition engine 101 to carry out voice-recognition processing. At the next step S34, the voice commander 102 receives results of the voice-recognition processing from the voice recognition engine 101.

At the next step S35, the voice commander 102 displays the results of the voice-recognition processing received from the voice recognition engine 101.

At the next step S36, the voice commander 102 forms a judgment as to whether or not the recognition key has been released. If the outcome of the judgment indicates that the recognition key has been released, the flow of the processing goes on to a step S37 at which a command is issued or a program is activated and then the processing is ended.

If the outcome of the judgment formed at the step S36 indicates that the recognition key has not been released, on the other hand, the flow of the processing goes on to a step S38 at which the voice commander 102 forms a judgment as to whether or not a release key such as a shift key has been pressed. If the outcome of the judgment formed at the step S38 indicates that the release key has been pressed, the flow of the processing goes on to a step S39 at which the voice commander 102 clears the results of the voice recognition. Then, the flow of the processing goes back to the step S33 to repeat the voice recognition.

If the outcome of the judgment formed at the step S38 indicates that the release key has not been pressed, on the other hand, the flow of the processing goes back to the step S33, skipping the step S39.

If the outcome of the judgment formed at the step S31 indicates that the normal input mode has been selected, on the other hand, the flow of the processing goes on to a step S40 at which the voice commander 102 requests the voice recognition engine 101 to carry out voice-recognition processing. At the next step S41, the voice commander 102 receives results of the voice-recognition processing from the voice recognition engine 101.

At the next step S42, the voice commander 102 displays the results of the voice-recognition processing received from the voice recognition engine 101. At the next step S43, the commander 102 carries out processing to issue a command or activate a program and then the flow of the processing goes back to the step S31 to repeat the processing to issue a command or activate a program.

In this way, by operating the recognition key, the user is capable of verifying results of voice recognition and issuing a command or activating a predetermined program. Thus, it is possible to prevent processing from being carried out due to incorrect recognition of a voice.

The following description explains processing carried out by the CPU 52 to activate a program or to issue a command in execution of the voice commander 102 with reference to a flowchart shown in FIG. 47. The processing corresponds to the step S37 or the step S43. As shown in the figure, the step begins with a step S51 at which the voice commander 102 forms a judgment as to whether or not the result of the voice-recognition processing received from the voice recognition engine 101 is data for activating a predetermined application program. If the outcome of the judgment indicates that the result of the voice-recognition processing received, from the voice recognition engine 101 is data for activating a predetermined application program, the flow of the processing goes on to a step S52.

At the next step S52, the voice commander 102 forms a judgment as to whether or not the predetermined application program corresponding to the result of the voice-recognition processing received from the voice recognition engine 101 has been activated. If the outcome of the judgment indicates that the predetermined application program corresponding to the result of the voice-recognition processing received from the voice recognition engine 101 has been activated, the flow of the processing goes on to a step S53 at which control is transferred to an application program for indicating the focus of a window and the processing is then ended.

If the outcome of the judgment formed at the step S52 indicates that the predetermined application program corresponding to the result of the voice-recognition processing received from the voice recognition engine 101 has not been activated, on the other hand, the flow of the processing goes on to a step S54 at which the voice commander 102 activates the predetermined application program corresponding to the result of the voice-recognition processing. Then, the processing is ended.

If the outcome of the judgment formed at the step S51 indicates that the result of the voice-recognition processing received from the voice recognition engine 101 is data for activating a predetermined application program, on the other hand, the flow of the processing goes on to a step S55 at which the voice commander 102 issues a corresponding command to an application program and, then, the processing is ended.

As described above, the voice commander 102 is capable of carrying out processing to issue a command or activate a program in accordance with program status and data representing an input voice.

Figure 48:
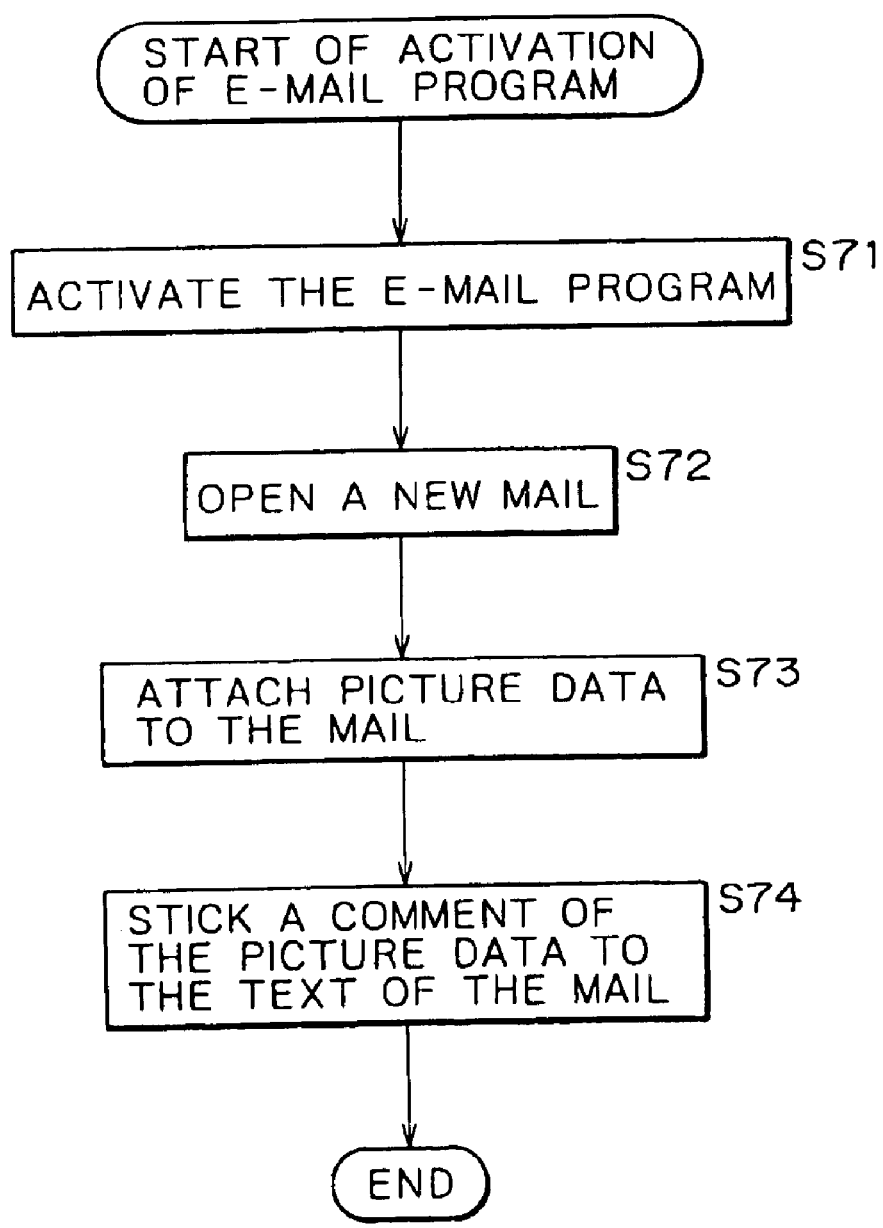
FIG. 48 shows a flowchart used for explaining processing to activate an e-mail program 54A.

The following description explains processing carried out 104 by the CPU 52 to activate the e-mail program 54A in execution of the still-picture viewing program 104 with reference to a flowchart shown in FIG. 48. As shown in the figure, the flowchart begins with a step S71 at which the still-picture viewing program 104 activates the e-mail program 54A. At the next step S72, the still-picture viewing program 104 requests the e-mail program 54A to open a new mail.

At the next step S73, the still-picture viewing program 104 attaches picture data to the new mail. At the next step S74, the still-picture viewing program 104 sticks a comment of the picture data on the text of the new mail. Then, the processing is ended.

In this way, the user is capable of attaching a picture and generating a mail including an attached comment with ease without operating the keyboard 4.

Figure 49:
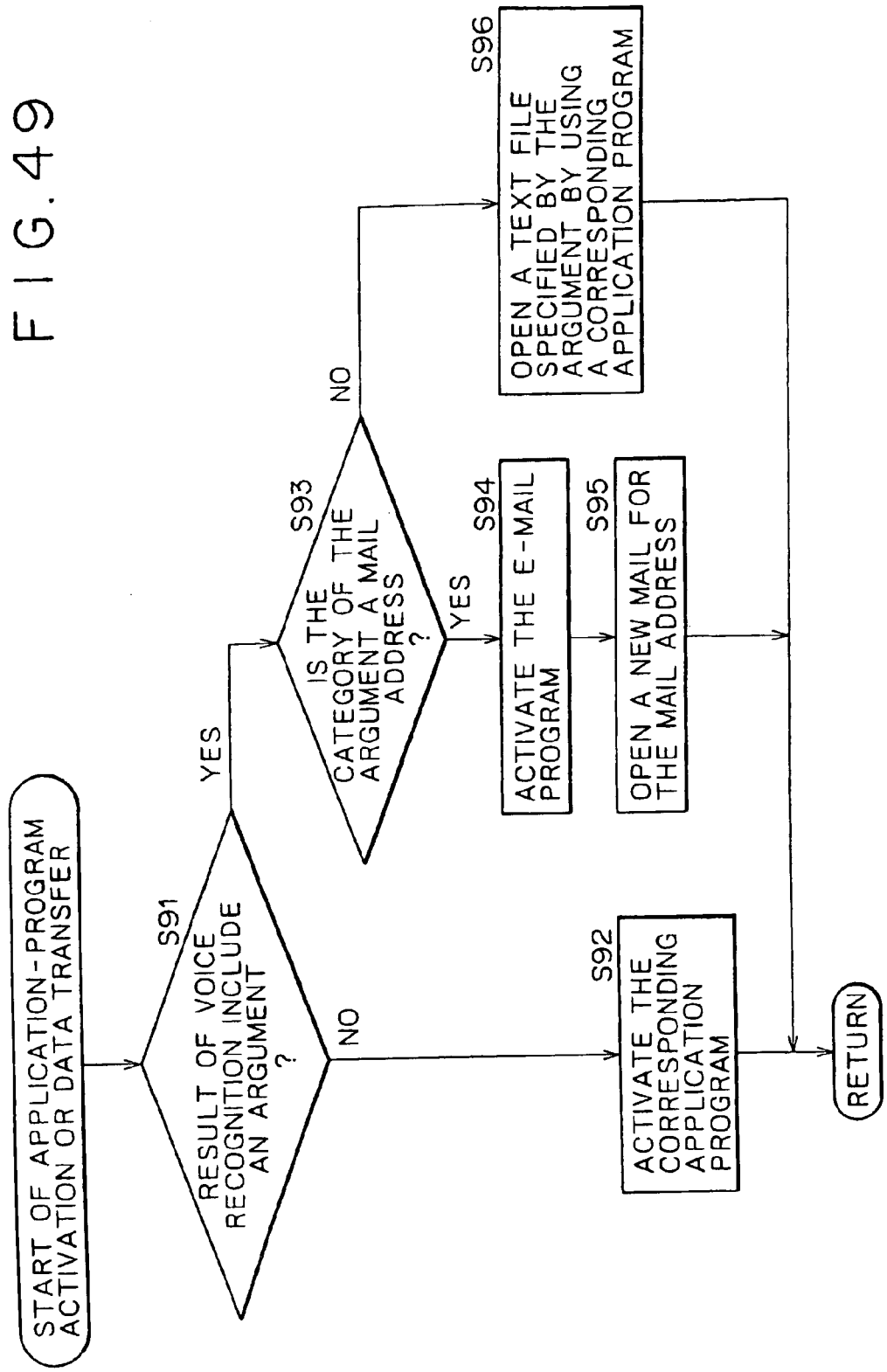
FIG. 49 shows a flowchart used for explaining processing to activate an application program or transfer data.

The following description explains processing carried out by the CPU 52 to activate an application program or to transfer data in execution of the voice commander 102 with reference to a flowchart shown in FIG. 49. The processing corresponds to the step S37 or the step S43 of the flowchart shown in FIG. 48. As shown in the figure, the step begins with a step S91 at which the voice commander 102 forms a judgment as to whether or not the result of the voice recognition includes an argument. If the outcome of the judgment indicates that the result of the voice recognition does not include an argument, the flow of the processing goes on to a step 92 at which a corresponding application program is activated and the processing is ended.

If the outcome of the judgment formed at the step S91 indicates that the result of the voice recognition includes an argument, on the other hand, the flow of the processing goes on to a step S93 at which the voice commander 102 forms a judgment as to whether or not the category of the argument included in the result of the voice recognition is the mail-address category. If the outcome of the judgment indicates that the category of the argument included in the result of the voice recognition is the mail-address category, the flow of the processing goes on to a step S94 at which the e-mail program 54A is activated. At the next step S95, the voice commander 102 opens a new mail address with a mail address set to correspond to the argument. Then, the processing is ended.

If the outcome of the judgment formed at the step S93 indicates that the category of the argument included in the result of the voice recognition is not the mail-address category, on the other hand, the flow of the processing goes on to a step S96 at which the voice commander 102 opens a text file specified by the argument by using a corresponding application program. The processing is then ended.

As described above, the voice commander 102 is capable of activating a predetermined program corresponding to an input voice and letting the program open a predetermined text file pertaining to the text-file category.

Figure 50:
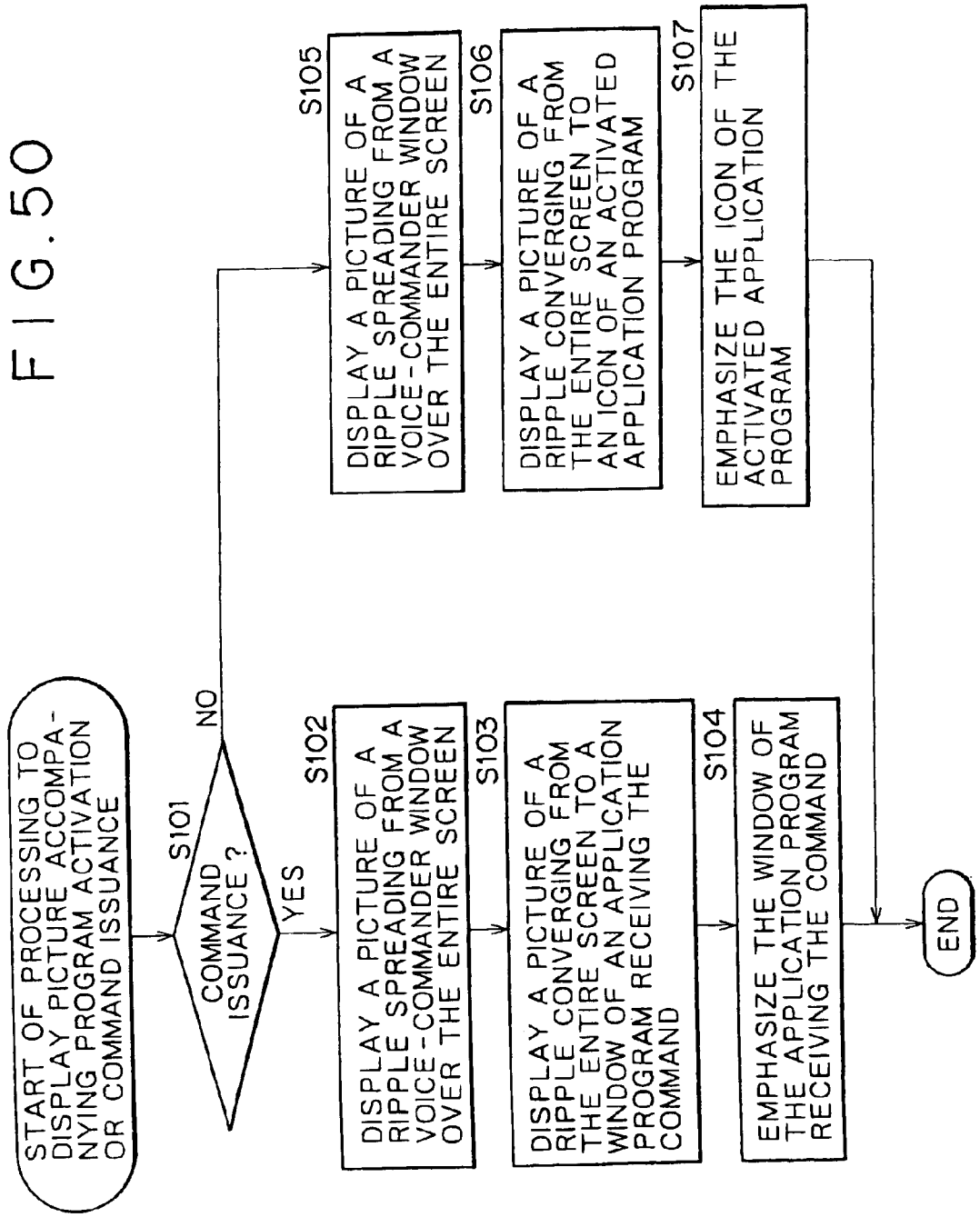
FIG. 50 shows a flowchart used for explaining processing to display a screen accompanying activation of a program or issuance of a command.

The following description explains processing to display a picture in activation of a program or issuance of a command by the CPU 52 executing the voice commander 102 with reference to a flowchart shown in FIG. 50. As shown in the figure, the flowchart begins with a step S101 at which the voice commander 102 forms a judgment as to whether or not a command has been issued to an application program. If a command has been issued, the flow of the processing goes on to a step S102 to display a picture of a ripple spreading from the voice-commander window 151 over the entire screen.

At the next step S103, the voice commander 102 displays a picture of a ripple converging from the entire screen to the window of the application program.

At the next step S104, the voice commander 102 emphasizes the display of the window of the application program receiving the command and then the processing is finished.

If the outcome of the judgment formed at the step S101 indicates that a command has not been issued to an application program, on the other hand, the application program is to be activated. In this case, the flow of the processing goes on to a step S105 at which the voice commander 102 displays a picture of a ripple spreading from the voice commander window 151 over the entire screen.

At the next step S106, the voice commander 102 displays a picture of a ripple converging from the entire screen to the icon of the application program.

At the next step S107, the voice commander 102 emphasizes the display of the icon of the activated application program and then the processing is finished.

As described above, since the voice commander 102 displays a picture converging to the window of a program receiving a command from the voice-commander window 151, the user is capable of knowing that the voice commander 102 is functioning and knowing the operation object of the voice commander 102 with a high degree of reliability.

In addition, since the voice commander 102 displays a picture converging to the icon of a program to be activated from the voice-commander window 151, the user is capable of knowing that the voice commander 102 is functioning and knowing the operation object of the voice commander 102 with a high degree of reliability.

Figure 51:
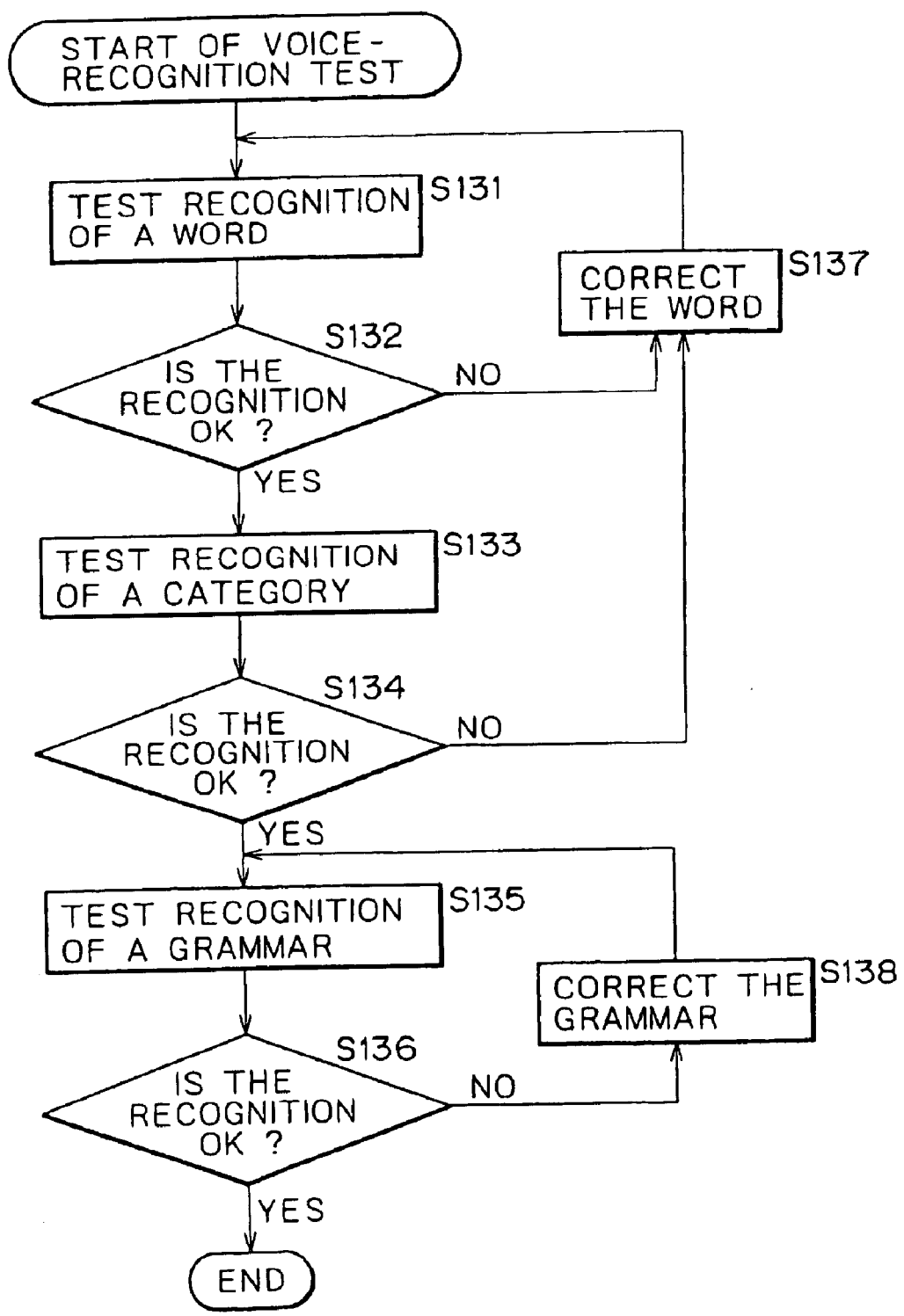
FIG. 51 shows a flowchart used for explaining processing of a voice-recognition test.

The following description explains processing of a voice-recognition test carried out by the CPU 52 in execution of the voice commander 102 by referring to a flowchart shown in FIG. 51. As shown in the figure, the flowchart begins with a step S131 at which the voice commander 102 carries out a test to recognize a word. In the test which is based on a predetermined word recognition result supplied by the voice recognition engine 101, the voice commander 102 forms a judgment as to whether or not a predetermined word has been recognized by comparison of the word with a cataloged popular name.

At the next step S132, the voice commander 102 forms a judgment as to whether or not a predetermined word has been recognized. The formation of the judgment is based on a result produced at the step S131. If the outcome of the judgment indicates that the predetermined word has been recognized, the flow of the processing goes on to a step S133 to carry out a test of recognizing a word pertaining to a predetermined category.

At the next step S134, the voice commander 102 forms a judgment as to whether or not a word pertaining to the predetermined category has been recognized. If the outcome of the judgment indicates that the word pertaining to the predetermined category has been recognized, the flow of the processing goes on to a step S135 to carry out a test to recognize a grammar for a case including a plurality of words.

At the next step S136, the voice commander 102 forms a judgment as to whether or not a grammar for a case including a plurality of words has been recognized. If the outcome of the judgment indicates that the grammar for a case including a plurality of words has been recognized, the processing is finished.

If the outcome of the judgment formed at the step S136 indicates that the grammar for a case including a plurality of words has not been recognized, on the other hand, the flow of the processing goes on to a step S138 at which the voice commander 102 corrects the grammar. The flow of the processing then goes back to the step S135 to repeat the test to recognize a grammar for a case including a plurality of words.

If the outcome of the judgment formed at the step S134 indicates that the word pertaining to the predetermined category has not been recognized or if the outcome of the judgment formed at the step S132 indicates that the predetermined word has not been recognized, on the other hand, the flow of the processing goes on to a step S137 at which the voice commander 102 corrects the word. Then, the flow of the processing goes back to the step S131 to repeat the test to recognize the word.

As described above, since the voice commander 102 displays a result of a test to recognize a predetermined voice and corrects a word or a grammar, the predetermined voice can be recognized with a high degree of reliability.

Figure 52:
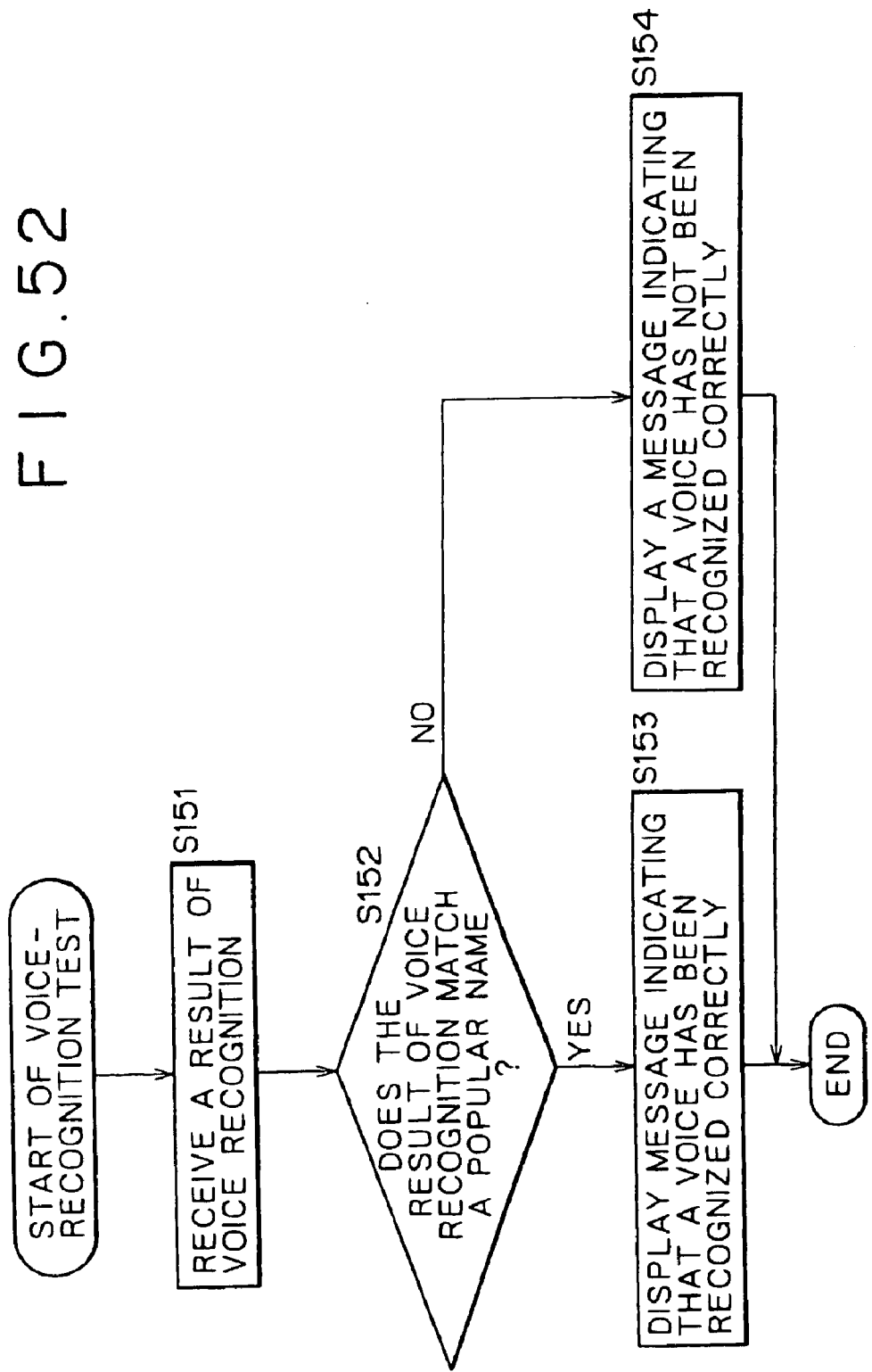
FIG. 52 shows a flowchart used for explaining processing to test voice recognition.

The following description explains processing to, test voice recognition by comparison with a cataloged popular name by referring to a flowchart shown in FIG. 52. Carried out by the CPU 52 executing the voice commander 102, the processing corresponds to the test performed at the step S131 to recognize a word. As shown in the figure, the flowchart begins with a step S151 at which the voice commander 102 receives a result of voice recognition from the voice recognition engine 101.

At the next step S152, the voice commander 102 forms a judgment as to whether or not the result of the voice recognition matches a popular name. If the outcome of the judgment indicates that the result of the voice recognition matches a popular name, the flow of the processing goes on to a step S153 at which a message is displayed on a test-result display field 253, indicating that a voice has been recognized correctly. Then, the processing is finished.

If the outcome of the judgment formed at the step S152 indicates that the result of the voice recognition does not match a popular name, on the other hand, the flow of the processing goes on to a next step S154 at which a message is displayed by the voice commander 102 on the test-result display field 253, indicating that a voice has not been recognized correctly. Then, the processing is finished.

Figure 53:
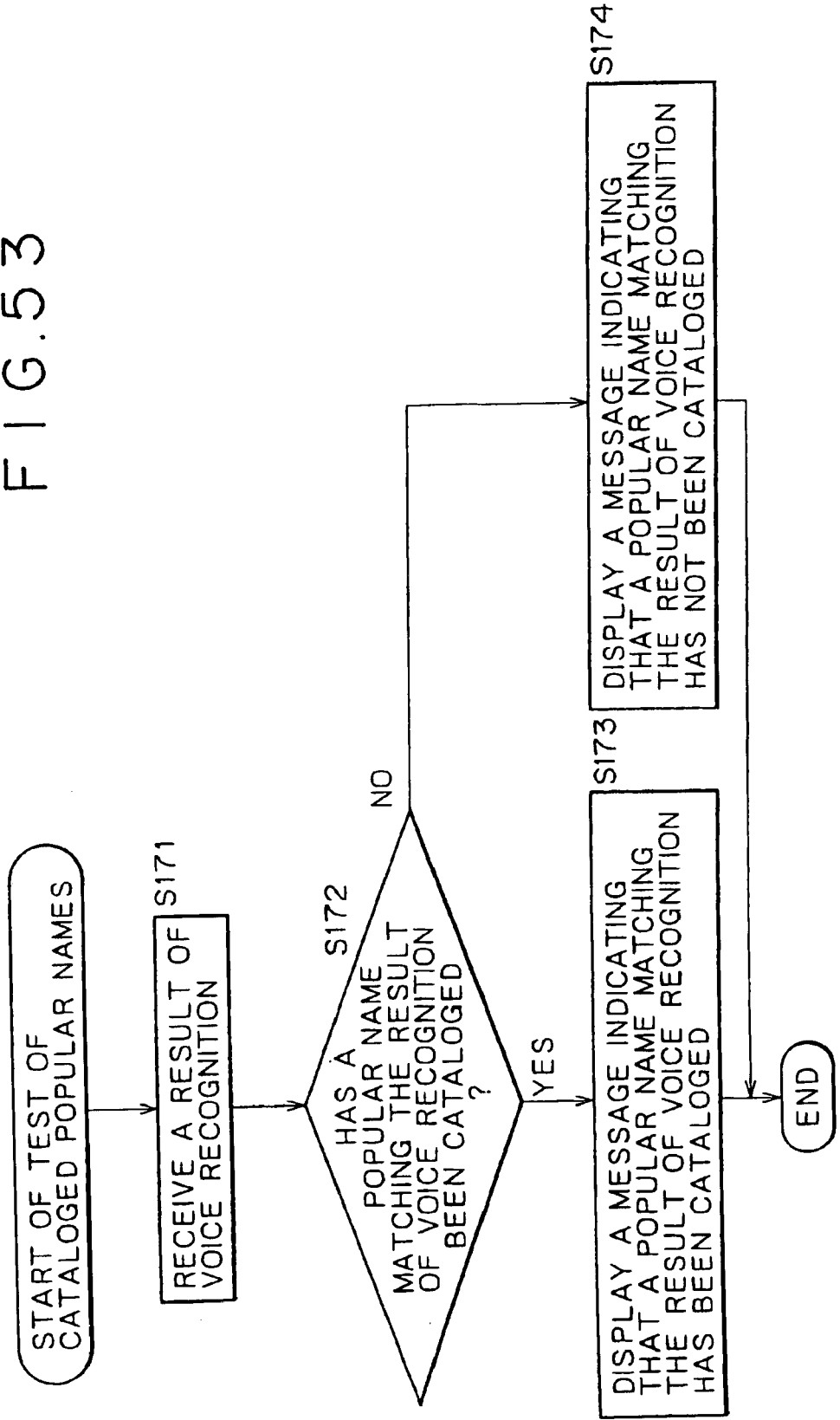
FIG. 53 shows a flowchart used for explaining processing to test cataloged popular names.

The following description explains processing to test cataloged popular names by referring to a flowchart shown in FIG. 53. Carried out by the CPU 52 executing the voice commander 102, the processing corresponds to the test performed at the step S133 to recognize a category. As shown in the figure, the flowchart begins with a step S171 at which the voice commander 102 receives a result of voice recognition from the voice recognition engine 101.

At the next step S172, the voice commander 102 forms a judgment as to whether or not a popular name matching the result of the voice recognition has been cataloged. If the outcome of the judgment indicates that a popular name matching the result of the voice recognition has been cataloged, the flow of the processing goes on to a next step S173. At the step S173, the popular name which matches the result of the voice recognition and is displayed on a popular-name display field 226 is emphasized. Then, the processing is finished.

If the outcome of the judgment formed at the step S172 indicates that no popular name matching the result of the voice recognition has been cataloged, on the other hand, the flow of the processing goes on to a next step S174 at which a message is displayed by the voice commander 102 on the test-result display field 273, indicating that no popular name matching the result of the voice recognition has been cataloged. Then, the processing is finished.

Figure 54:
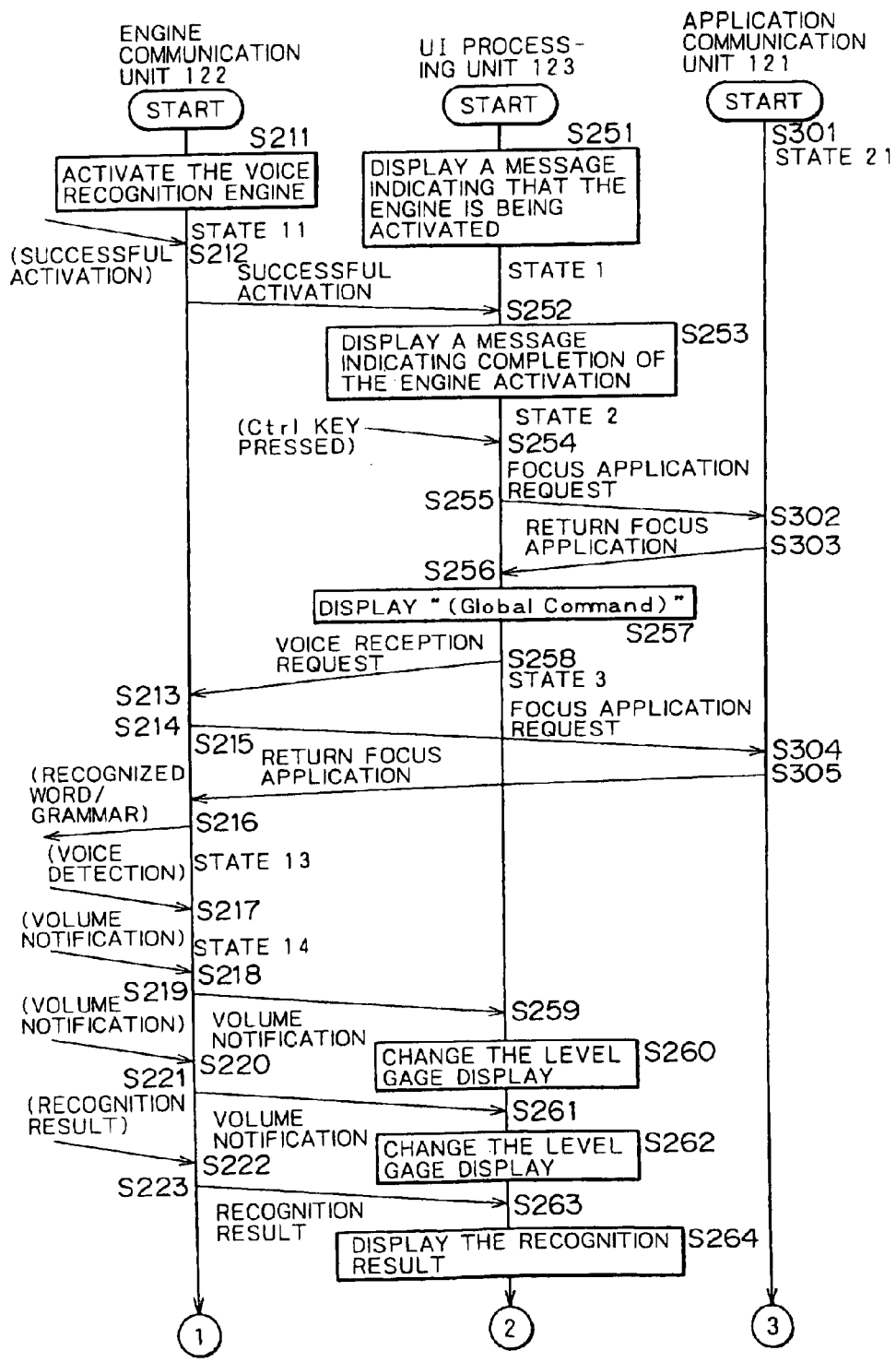
FIG. 54 shows a diagram showing state transitions of a series of processes, from activation of a still-picture photographing program till an operation to stick a comment on a still picture through image-sensing of the still picture.
Figure 55:
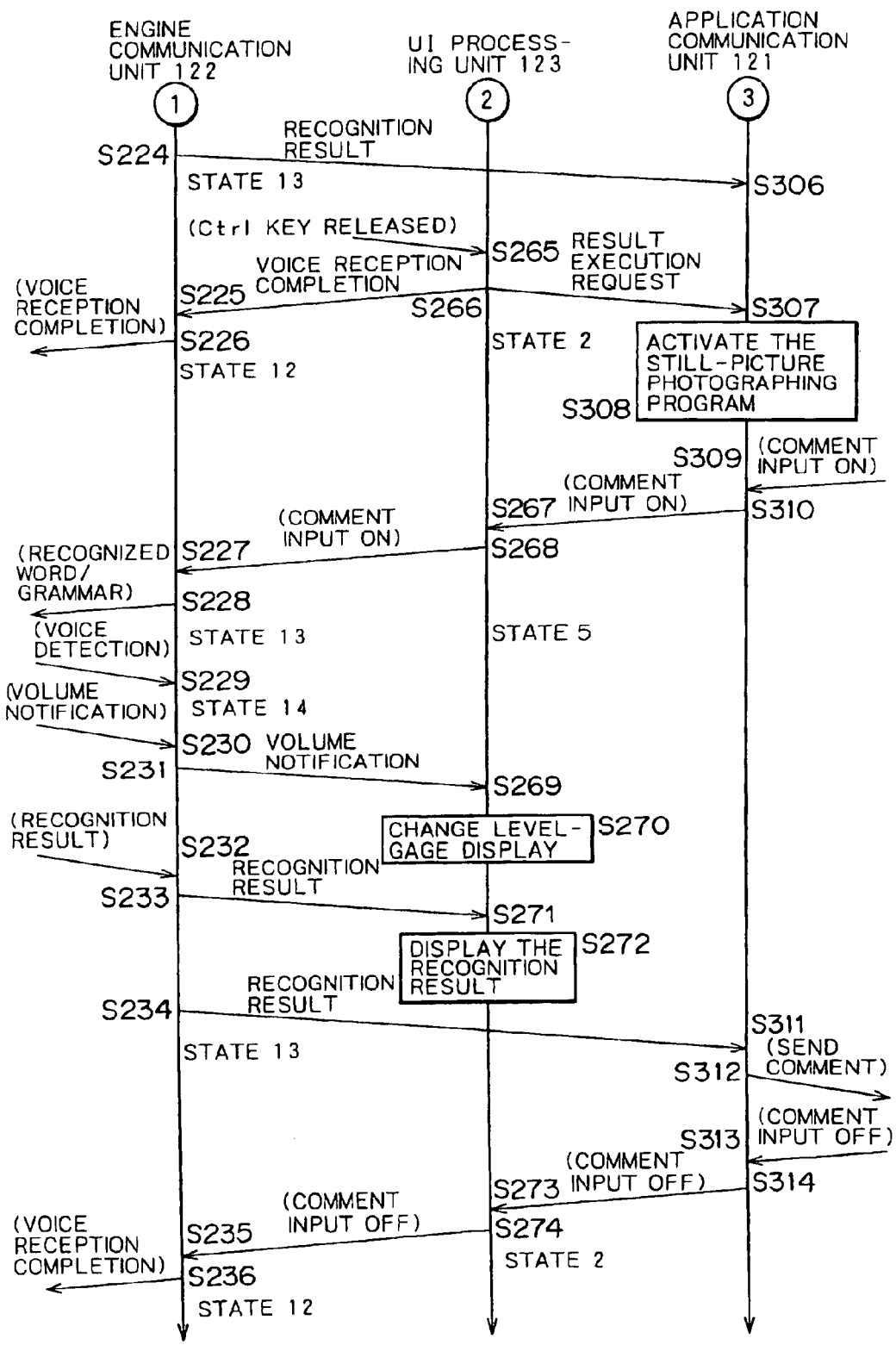
FIG. 55 shows a continued state transitions of the series of processes, from the activation of the still-picture photographing program till the operation to stick a comment on a still picture through the image-sensing of the still picture.

The following description explains a series of processes carried out by the CPU 52 executing the voice commander 102, from activation of the still-picture photographing program 103 to sticking a comment on a still picture through image-sensing of the still picture, by referring to state transition diagrams shown in FIGS. 54 and 55. At a step S211 shown in FIG. 54, the engine communication unit 122 activates the voice recognition engine 101 and transits to State 11. At a step S251, the UI processing unit 123 displays a message indicating that the voice recognition engine 101 is being activated and transits to State 1. At a step S301, the application communication unit 121 transits to State 21.

At a step S212, the engine communication unit 122 receives data for successful activation of the voice recognition engine 101 from the voice recognition engine 101 and supplies data indicating the successful activation of the voice recognition engine 101 to the UI processing unit 123. At a step S252, the UI processing unit 123 receives the data indicating the successful activation of the voice recognition engine 101 and transits to State 2.

At a step S253, the UI processing unit 123 displays a picture or a message indicating completion of the activation of the voice recognition engine 101 on the LCD panel 21.

At a step S254, the UI processing unit 123 forms a judgment as to whether or not the control key serving as a recognition key has been pressed. If the control key serving as a recognition key has been pressed, the flow of the processing goes on to a step S255 at which the UI processing unit 123 requests the application communication unit 121 to transfer data indicating which of the still-picture photographing program 103, the still-picture viewing program 104 and the electronic-pet program 105 is focused on, that is, data indicating which of the programs is active, or data indicating that none of the programs are active to the UI processing unit 123. At a step S302, the application communication unit 121 receives the request to transfer data indicating which of the still-picture photographing program 103, the still-picture viewing program 104 and the electronic-pet program 105 is focused on from the UI processing unit 123.

At a step S303, the application communication unit 121 transfers data indicating which of the still-picture photographing program 103, the still-picture viewing program 104 and the electronic-pet program 105 is focused on to the UI processing unit 123. At a step S256, the UI processing unit 123 receives the data indicating which of the still-picture photographing program 103, the still-picture viewing program 104 and the electronic-pet program 105 is focused on. At a step S257, the UI processing unit 123 displays a string of characters such as "Global Command" on the recognition-status display area 169 of the voice-commander window 151 to indicate that only a global command is accepted in case the received data indicates that none of the still-picture photographing program 103, the still-picture viewing program 104 and the electronic-pet program 105 are focused on.

At a step S258, the UI processing unit 123 requests the engine communication unit 122 to receive a voice, that is, to enter a state of being capable of receiving a voice input and then transits to State 3. At a step S213, the engine communication unit 122 receives the request to receive an input voice. At a step S214, the engine communication unit 122 requests the application communication unit 121 to transfer data indicating which of the still-picture photographing program 103, the still-picture viewing program 104 and the electronic-pet program 105 is focused on, that is, data indicating which of the programs is active or data indicating that none of the programs are active to the engine communication unit 122.

At a step S305, the application communication unit 121 transfers data indicating which of the still-picture photographing program 103, the still-picture viewing program 104 and the electronic-pet program 105 is focused on to the engine communication unit 122.

At a step S215, the engine communication unit 122 receives the data indicating which of the still-picture photographing program 103, the still-picture viewing program 104 and the electronic-pet program 105 is focused on. At a step S216, the engine communication unit 122 reads out data representing a presently acceptable word or grammar from the recognized-word & grammar data base 115, supplying the data to the voice recognition engine 101, and transits to State 13.

When the user starts entering a voice to the microphone 24, the flow of the processing goes on to a step S217 at which the engine communication unit 122 receives data indicating detection of a voice from the voice recognition engine 101 and transits to State 14.

At a step S218, the engine communication unit 122 receives data corresponding to the level of a signal representing a voice, that is, data representing the volume of the voice, from the voice recognition engine 101. At a step S219, the engine communication unit 122 passes on the data corresponding to the level of a signal representing a voice to the UI processing unit 123. At a step S259, the UI processing unit 123 receives the data corresponding to the level of a signal representing a voice. At a step S260, the UI processing unit 123 updates a display on the level gage 161 of the voice-commander window 151 in accordance with the data corresponding to the level of a signal representing a voice.

At a step S220, the engine communication unit 122 receives data corresponding to the level of a signal representing a voice, that is, data representing the volume of the voice, from the voice recognition engine 101. At a step S221, the engine communication unit 122 passes on the data corresponding to the level of a signal representing a voice to the UI processing unit 123. At a step S261, the UI processing unit 123 receives the data corresponding to the level of a signal representing a voice. At a step S262, the UI processing unit 123 updates a display on the level gage 161 of the voice-commander window 151 in accordance with the data corresponding to the level of a signal representing a voice.

In a state of being capable of receiving a voice, the processing to receive data corresponding to the level of a signal representing a voice from the voice recognition engine 101 and to update a display on the level gage 161 of the voice-commander window 151 in accordance with the data is readily repeated.

At a step S222, the engine communication unit 122' receives a code number such as 106, a recognized word or phrase such as "photographing" and a string of characters related to the recognized word from the voice recognition engine 101. The code number and the recognized word or phrase corresponds to a word uttered by the user. At a step S223, the engine communication unit 122 passes on the code number, the recognized word or phrase and the string of characters related to the recognized word to the UI processing unit 123. At a step S263, the UI processing unit 123 receives the code number, the recognized word or phrase and the string of characters related to the recognized word. At a step S264, the UI processing unit 123 displays the recognized word or phrase on the recognition-result display area 162 of the voice-commander window 151.

At a step S224, the engine communication unit 122 determines that the data received from the voice recognition engine 101 should be transferred also to the application communication unit 121 on the basis of the code number, supplying the code number, the recognized word or phrase and the string of characters related to the recognized word to the application communication unit 121. The engine communication unit 122 then transits to State 13. At a step S306, the application communication unit 121 receives the code number, the recognized word or phrase and the string of characters related to the recognized word.

At a step S265, the UI processing unit 123 forms a judgment as to whether or not a control key serving as the recognition key has been released. If the control key serving as the recognition key has been released, the flow of the processing goes on to a step S266 at which the UI processing unit 123 requests the engine communication unit 122 to end the reception of a voice. The UI processing unit 123 also requests the application communication unit 121 to carry out predetermined processing based on the code number, the recognized word or phrase and the string of characters related to the recognized word which have been received by the application communication unit 121 at the step S306. The predetermined processing is carried out typically by activating the still-picture photographing program 103. Then, the UI processing unit 123 transits to State 2.

At a step S225, the engine communication unit 122 receives the request to end the reception of a voice from the UI processing unit 123. At a step S226, the engine communication unit 122 requests the voice recognition engine 101 to end the reception of a voice and then transits to State 12.

At a step S307, the application communication unit 121 receives the request to carry out the predetermined processing from the UI processing unit 123. At a step S308, the application communication unit 121 activates the still-picture photographing program 103.

At a step S309, the application communication unit 121 receives a request for a comment input corresponding to an operation to press the shutter button 10 from the still-picture photographing program 103. At a step S310, the application communication unit 121 passes on the request for a comment input to the UI processing unit 123. At a step S267, the UI processing unit 123 receives the request for a comment input. At a step S268, the UI processing unit 123 passes on the request for a comment input to the engine communication unit 122 and then transits to State 5. At a step S227, the engine communication unit 122 receives the request for a comment input.

At a step S228, the engine communication unit 122 reads out data of a presently acceptable word and grammar from the recognized-word & grammar data base 115, supplies the data to the voice recognition engine 101 and then transits to State 13.

When the user starts entering a voice to the microphone 24, the flow of the processing goes on to a step S229 at which the engine communication unit 122 receives data indicating that a voice has been detected from the voice recognition engine 101, and then transits to State 14.

At a step S230, the engine communication unit 122 receives data corresponding to the level of a signal representing a voice from the voice recognition engine 101. The level of the signal represents the volume of the voice. At a step S231, the engine communication unit 122 passes on the data corresponding to the level of a signal representing a voice to the UI processing unit 123. At a step 5269, the UI processing unit 123 receives the data corresponding to the level of a signal representing a voice. At a step S270, the UI processing unit 123 updates a display of the level gage 161 of the voice-commander window 151 on the basis of the received data corresponding to the level of a signal representing a voice.

At a step S232, the engine communication unit 122 receives a code number such as 107, a recognized word or phrase such as "With. Papa in Hachijojima" and a string of characters related to the recognized word from the voice recognition engine 101. The code number and the recognized word or phrase correspond to a speech made by the user. At a step S233, the engine communication unit 122 passes on the code number, the recognized word or phrase and the string of characters related to the recognized word to the UI processing unit 123. At a step S271, the UI processing unit 123 receives the code number, the recognized word or phrase and the string of characters related to the recognized word. At a step S272, the UI processing unit 123 displays the recognized word or phrase on the recognition-result display area 162 of the voice-commander window 151.

At a step S234, the engine communication unit 122 determines that the data received from the voice recognition engine 101 should be transferred also to the application communication unit 121 on the basis of the code number, supplying the code number, the recognized word or phrase and the string of characters related to the recognized word to the application communication unit 121. The engine communication unit 122 then transits to State 13. At a step S311, the application communication unit 121 receives the code number, the recognized word or phrase and the string of characters related to the recognized word.

At a step S312, the application communication unit 121 sends the recognized word or phrase to the still-picture photographing program 103 as a comment and requests the still-picture photographing program 103 to stick the recognized word or phrase as a comment.

The pieces of processing carried out at the steps S232 to S312 are repeated as long as the shutter button 10 is not released and the voice recognition engine 101 recognizes a voice of the user.

At a step S313, the application communication unit 121 receives a request to terminate a comment input from the still-picture photographing program 103 in accordance with an operation such as an operation to release the shutter button 10. At a step S314, the application communication unit 121 passes on the request to terminate a comment input to the UI processing unit 123. At a step S273, the UI processing unit 123 receives the request to terminate a comment input. At a step S274, the UI processing unit 123 passes on the request to terminate a comment input to the engine communication unit 122. At a step S235, the engine communication unit 122 receives the request to terminate a comment input. At a step S236, the engine communication unit 122 requests the voice recognition engine 101 to terminate an operation to receive a voice and then transits to State 12. Finally, the processing is ended.

As described above, the voice commander 102 is capable of activating the still-picture photographing program 103 and entering a comment to a still picture taken by the still-picture photographing program 103 without a need for complex operations of the keyboard 4 and the stick-type pointing device 5.

It should be noted that the voice recognition engine 101 can also be provided with a function to recognize any word or any phrase in addition to cataloged words or cataloged phrases. Such a function is referred to as the so-called dictation function.

The sequence of processes described above can be carried out by hardware or software. If software is used for carrying out the sequence of processes, programs constituting the software are installed from a program storage medium into a computer built in dedicated hardware or typically into a general-purpose personal computer. By installing a variety of programs into a general-purpose personal computer, the personal computer is made capable of executing a variety of functions.

As shown in FIG. 7, typical program storage media for storing programs put in a state of being readily installable and executable by a computer include a magnetic disc 95 including a floppy disc, an optical disc 96 including a CD-ROM (Compact Disc Read Only Memory and a DVD (Digital Versatile Disc), a magneto-optical disc 97 including an MD (Mini Disc), package media such as a semiconductor device 98, a ROM 69 for storing programs temporarily or permanently and a hard disc 56. If necessary, a program can be stored into any of the program storage media by using wire or radio communication media by way of an interface such as a router or a modem 50. The communication media include a local area network, the Internet 92 and a digital satellite broadcasting system not shown in the figure.

In this specification, steps composing a program stored in a program storage medium are executed sequentially along the time axis one after another in accordance with an order the steps are described in the program. It should be noted that a program may of course comprise pieces of processing executed individually in parallel instead of steps to be executed sequentially along the time axis.

In this specification, a hardware & software system represents an entire apparatus comprising a plurality of units.

While a preferred embodiment of the present invention has been described using specific terms, such description is for illustrative purposes only, and it is to be understood that changes and variations may be made without departing from the spirit or scope of the following claims.

What is claimed is:

1. A communication apparatus comprising:
    a word-generating means for recognizing a voice and generating a first word and a second word, which correspond to said voice;
    a word-collating means for collating said first word generated by said word-generating means with pieces of information on a communication destination stored in advance and outputting a specific piece of information on a communication destination corresponding to said first word;
    a program-activating means for confirming that said second word generated by said word-generating means is a predetermined word, and activating a communication program corresponding to said predetermined word said program-activating means including status detecting means for determining whether a predetermined program is activated already and judging whether to issue a local command that is specific to controlling the predetermined program based on whether the predetermined program is already activated; and
    a communication-destination-setting means for adopting said specific piece of information on a communication destination output by said word-collating means as information on a communication destination of said communication program activated by said program activating means.

2. A communication apparatus according to claim 1 wherein said communication program is an electronic mail transmission program.

3. A communication apparatus according to claim 2 wherein said pieces of information on communication destinations are each a destination of an electronic mail transmitted by said electronic mail transmission program.

4. A communication method comprising:
    a word-generating step of recognizing a voice and generating a first word and a second word, which correspond to said voice;
    a word-collating step of collating said first word generated at said word-generating step with pieces of information on communication destinations stored in advance and outputting a specific piece of information on a communication destination corresponding to said first word;
    a program-activating step of confirming that said second word generated at said word-generating step is a predetermined word and activating a communication program corresponding to said predetermined word, said program-activating step including determining whether a predetermined program is activated and judging whether to issue a local command that is specific to controlling the predetermined program based on whether the predetermined program is already activated; and
    a communication-destination-setting step of adopting said specific piece of information on a communication destination output at said word-collating step as information on a communication destination of said communication program activated at said program-activating step.

5. A communication method according to claim 4 wherein said communication program is an electronic mail transmission program.

6. A communication method according to claim 5 wherein said pieces of information on communication destinations are each a destination of an electronic mail transmitted by said electronic mail transmission program.

7. A program storage medium for storing a program to be executed by a communication apparatus wherein said program comprises:
    a word-generating step of recognizing a voice and generating a first word and a second word, which correspond to said voice;
    a word-collating step of collating said first word generated at said word-generating step with pieces of information on communication destinations stored in advance and outputting a specific piece of information on a communication destination corresponding to said first word;

a program-activating step of confirming that said second word generated at said word-generating step is a predetermined word and activating a communication program corresponding to said predetermined word, said program-activating step including determining whether a predetermined program is activated and judging whether to issue a local command that is specific to controlling the predetermined program based on whether the predetermined program is already activated; and a communication-destination-setting step of adopting said specific piece of information on a communication destination output at said word-collating step as information on a communication destination of said communication program activated at said program-activating step.

8. A program storage medium according to claim 7 wherein said communication program is an electronic mail transmission program.

9. A program storage medium according to claim 8 wherein said pieces of information on communication destinations are each a destination of an electronic mail transmitted by said electronic mail transmission program.

* * * * *

UNITED STATES PATENT AND TRADEMARK OFFICE
CERTIFICATE OF CORRECTION

PATENT NO. : 6,879,958 B1  Page 1 of 1
DATED : April 12, 2005
INVENTOR(S) : Kiyonobu Kojima et al.

It is certified that error appears in the above-identified patent and that said Letters Patent is hereby corrected as shown below:

Column 36,
Line 17, change "5269" to -- S269 --
Line 26, change "With. Papa" to -- With Papa --

Signed and Sealed this

Ninth Day of August, 2005

JON W. DUDAS
*Director of the United States Patent and Trademark Office*